United States Patent
Tirman

(10) Patent No.: US 11,059,733 B2
(45) Date of Patent: Jul. 13, 2021

(54) VERMICOMPOSTING METHOD AND SYSTEM FOR CONVERSION AND TREATMENT OF ORGANIC WASTE STREAMS

(71) Applicant: Collin Tirman, Lonoke, AR (US)

(72) Inventor: Collin Tirman, Lonoke, AR (US)

( * ) Notice: Subject to any disclaimer, the term of this patent is extended or adjusted under 35 U.S.C. 154(b) by 0 days.

(21) Appl. No.: 16/134,900

(22) Filed: Sep. 18, 2018

(65) Prior Publication Data

US 2019/0084855 A1    Mar. 21, 2019

Related U.S. Application Data

(60) Provisional application No. 62/560,047, filed on Sep. 18, 2017.

(51) Int. Cl.
| | |
|---|---|
| *C02F 3/12* | (2006.01) |
| *C02F 9/00* | (2006.01) |
| *C02F 3/34* | (2006.01) |
| *C02F 3/32* | (2006.01) |
| *C02F 3/30* | (2006.01) |

(Continued)

(52) U.S. Cl.
CPC ............... *C02F 3/121* (2013.01); *C02F 3/30* (2013.01); *C02F 3/327* (2013.01); *C02F 3/34* (2013.01); *C02F 9/00* (2013.01); *C05F 17/05* (2020.01); *C05F 17/40* (2020.01); *C02F 1/66* (2013.01); *C02F 3/342* (2013.01); *C02F 2103/20* (2013.01); *C02F 2103/32* (2013.01); *C02F 2103/322* (2013.01); *C02F 2103/325* (2013.01); *C02F 2103/327* (2013.01); *C02F 2209/005* (2013.01); *C02F 2209/008* (2013.01); *C02F 2209/06* (2013.01); *C02F 2209/22* (2013.01)

(58) Field of Classification Search
CPC .. C02F 3/121; C02F 3/30; C02F 3/327; C02F 3/34; C02F 9/00; C02F 1/66; C02F 2209/22; C02F 2209/06; C02F 2209/008; C02F 2209/005; C02F 2103/327; C02F 2103/325; C02F 2103/322; C02F 2103/32; C02F 2103/20; C02F 3/342; C05F 17/0018; C05F 17/0009
USPC ........ 210/602, 605, 615, 630, 631; 71/9, 10, 71/11, 21
See application file for complete search history.

(56) References Cited

U.S. PATENT DOCUMENTS

| | | |
|---|---|---|
| 5,919,366 A | 7/1999 | Cameron |
| 7,361,268 B2 | 4/2008 | Ogden |

(Continued)

FOREIGN PATENT DOCUMENTS

EP        0936953 B1 *   4/2001

*Primary Examiner* — Fred Prince

(57) ABSTRACT

A vermicomposting system for treating waste water streams that includes a pretreatment stage for converting liquid or semi-liquid organic waste streams into a feedstock for vermicomposting; a vermicomposting digestion stage having populations of worms and beneficial bacteria which consume and break down organic material and nutrients present in the feedstock from the pretreatment stage to create worm castings, vermicompost, and a liquid compost tea that contains plant nutrients, plant growth promoting substances, and beneficial bacteria; and a post-treatment stage in which the liquid compost tea is removed for use as an soil amendment or inoculant, or is further treated in a separate containment tank where nutrients and oxygen levels are controlled to increase specific bacterial and fungal populations.

14 Claims, 47 Drawing Sheets

(51) Int. Cl.
  *C05F 17/05* (2020.01)
  *C05F 17/40* (2020.01)
  *C02F 1/66* (2006.01)
  *C02F 103/32* (2006.01)
  *C02F 103/20* (2006.01)

(56) References Cited

U.S. PATENT DOCUMENTS

| | | |
|---|---|---|
| 7,540,960 B2 | 6/2009 | Villagra Fuentes |
| 2003/0116488 A1 | 6/2003 | Cameron |
| 2004/0065610 A1 | 4/2004 | Shankar et al. |
| 2012/0187041 A1* | 7/2012 | Popa .................... A01K 67/033 |
| | | 210/602 |
| 2013/0263786 A1* | 10/2013 | Meisel, III .......... C05F 17/0205 |
| | | 119/6.7 |

* cited by examiner

Analog Settings

Enter new date and time and select Set Time

Set Time: 1/1/1999 12:00:00 PM

| | Zero | Span | Full Level | Xmtr Output | Value | Level |
|---|---|---|---|---|---|---|
| Holding Tank Scale | 0 Gal | 840 Gal | 12.0 In | 12.0 ma | 420.0 Gal | 6.0 In |
| pH Adjust Tank Scale | 0 Gal | 730 Gal | 52.5 In | 12.0 ma | 365.0 Gal | 26.3 In |
| Caustic Tank Scaling | 0 Gal | 30 Gal | 24.0 In | 12.0 ma | 15.0 Gal | 12.0 In |
| Bio React Tank 1 Scale | 0 Gal | 730 Gal | 18.0 In | 12.0 ma | 280.0 Gal | 9.0 In |
| Bio React Tank 2 Scale | 0 Gal | 730 Gal | 18.0 In | 12.0 ma | 280.0 Gal | 9.0 In |
| pH Value Scale | 0 pH | 14 pH | | 12.0 ma | 7.0 pH | |

VERMICOMPOSTING METHOD AND SYSTEM FOR CONVERSION AND TREATMENT OF ORGANIC WASTE STREAMS

CROSS REFERENCES TO RELATED APPLICATIONS

The present application claims the benefit of U.S. Provisional Patent Application Ser. No. 62/560,047, filed Sep. 18, 2017 (Sep. 18, 2017).

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

Field of the Invention

The present invention relates most generally to waste water treatment systems, and more particularly systems for treating waste streams, and still more particularly to a vermicomposting system and method for treating waste water streams.

Discussion of Related Art Including Information Disclosed Under 37 CFR §§ 1.97, 1.98

The management of organic waste of nearly all kinds is an increasing problem. Solutions range from waste disposal to recycling to re-use to waste stream reduction. Sustainable programs emphasize waste avoidance through economical resource use and conservation, waste recycling, and waste reuse. Within this latter category, proven biological reprocessing methods are highly favored, as are any technologies that convert waste into a valuable resource. Composting is one such method.

However, as with many sustainable technologies, urgent social needs are driving a rapid technical evolution in the field, particularly as data on various composting systems are collected and analyzed. One composting method showing considerable promise is vermicomposting, which in a few short decades has been adopted and practiced broadly in several countries, particularly for processing black water and graywater on site, and on large scales for processing agricultural waste and manure. Studies have shown vermicomposting to provide numerous advantages, including improved soil aeration when used as a soil conditioner, with correspondingly increased soil microorganisms, improved water holding capacity, improved plant growth, crop yield, and germination. Further, vermicomposting reduces waste volumes in landfills, is a simple technology available to people in undeveloped countries, and eliminates the need for transporting waste (insofar as it may be treated on-site).

The present invention advances the art by providing an improved vermicomposting system designed for the rapid and efficient conversion and treatment of waste streams having high water content and high nitrogen content, including winery waste water, brewery waste water, dairy lagoon water, swine waste water, slaughterhouse waste water, food processing waste water, residential and municipal sewage, industrial and commercial waste water, compost leachate, digestate, and other waste waters containing organic materials and/or nutrients.

BRIEF SUMMARY OF THE INVENTION

The inventive system and method provide an efficient means for converting organic waste streams to a suitable feedstock for vermicomposting to produce worm castings, vermicompost, and compost tea. The method can be performed using several different system configurations depending on the specific kinds of organic waste being treated and the intended use of the worm castings, vermicompost, and compost tea. The first two stages of the system control the environment and nutrient content of the waste stream to create a population of beneficial bacteria that convert the waste into a suitable feed for the live worm cultures. In the vermicomposting digester, the worms, beneficial bacteria, and other microorganisms further break down the material and create worm castings, vermicompost, and compost tea. The environment is controlled in the vermicomposting digester by controlling the flow rate of the treated liquid and oxygen levels to maximize the worm and microorganism populations. The post treatment of the compost tea in a containment tank further increases and adjusts the specific bacterial species in the populations of beneficial microorganisms to create a higher value product for use as a soil amendment or biological inoculant.

In an embodiment, the vermicomposting system and method of the present invention includes three fundamental stages. In a first and second stage, liquid or semi liquid organic waste streams are converted into a suitable feedstock for vermicomposting. In some embodiments, the first stage is a pretreatment system using a bio-solids separator system that includes containment tanks layered with a worm bed upper layer and an aerobic digester in a lower layer to break down the organic material, assist in separating the solids, and to inoculate the waste stream with a population of beneficial bacteria. The beneficial bacteria are specifically selected by controlling the environment in a containment tank by means of controlling oxygen levels, pH, and the addition of nutrients. In some cases the waste streams will be treated by reducing the oxygen levels in the organic waste stream containment tank to anaerobic conditions to shift the biological population to facultative and anaerobic bacteria. The facultative and anaerobic bacteria are capable of treating different waste streams than the aerobic bacteria and can convert various nutrients into different forms that aid in the treatment of the waste. The system is capable of cycling between aerobic and anaerobic conditions to convert the waste into a suitable feed for vermicomposting.

The run-off from the anaerobic digestion is collected and pumped to a pH adjustment tank, where pH and dissolved oxygen are measured and adjusted as necessary to ensure that the liquid composition is suitable as a feedstock for worms.

In embodiments, the pre-treated waste stream is now ready for use as a feedstock for a second, vermicomposting digestion stage. The vermicomposting digestion system consists of open containment tanks containing a solid mineral and high carbon organic substrate, live worm population, and beneficial bacterial population. An irrigation system is incorporated into the system for the distribution of the treated liquid waste stream to the vermicomposting digester containment tanks. At this stage, beneficial bacteria can again be dosed or introduced into the worm beds to assist in organic compound digestion. The worm and beneficial bacteria consume and break down the organic material and nutrients present in the pre-treated waste stream and create worm castings, vermicompost, and a liquid compost tea. The solid worm castings and vermicompost are removed periodically for use as soil amendment or fertilizer.

The liquid compost tea contains beneficial amounts of nutrients, plant growth promoting substances, and beneficial bacteria, and may be used as a soil amendment, inoculant, or in a third, post-treatment stage, it may be further treated to increase the levels of beneficial bacteria by transferring to a separate containment tank where nutrients and oxygen levels are controlled to increase specific bacterial and fungal populations.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

Also, it is to be understood that the terminology and phraseology employed herein are for descriptive purposes only, and not limitation. Where specific dimensional and material specifications have been included or omitted from the specification or the claims, or both, it is to be understood that the same are not to be incorporated into the appended claims.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein:

FIG. 43 shows the common elements on the Settings Screens;

FIG. 44 shows Analog Settings where the pH tank level and pH analog transmitters are scaled;

DETAILED DESCRIPTION OF THE INVENTION

Figure 1:
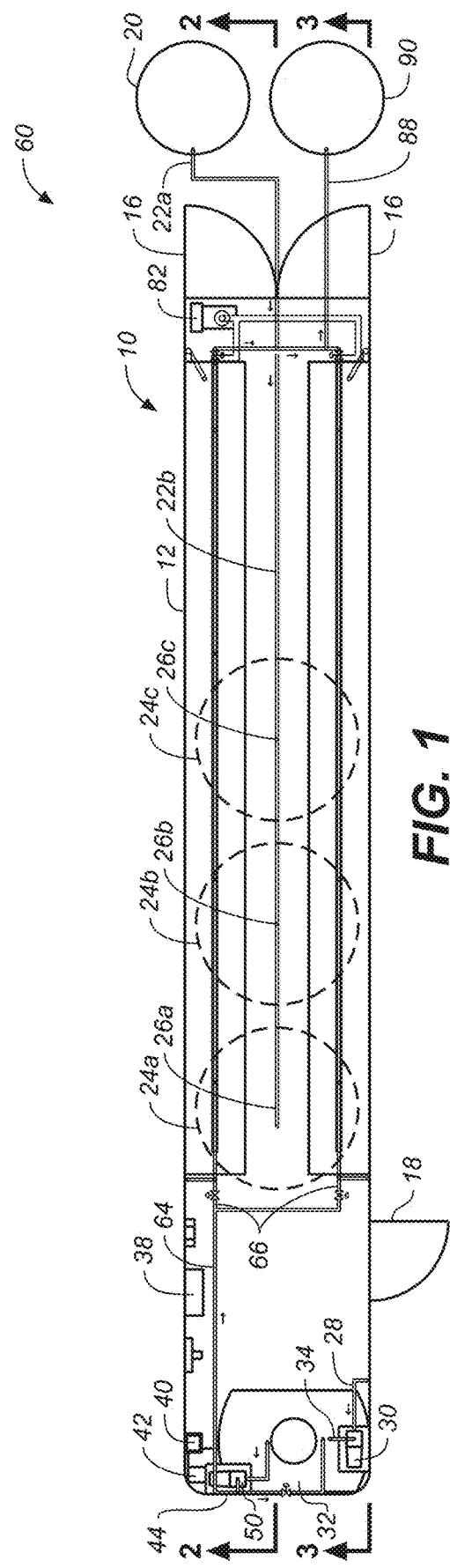
FIG. 1 is a cross-sectional top plan view showing the organic waste stream treatment and conversion system of the present invention embodied in a system housed in a mobile trailer.
Figure 2:
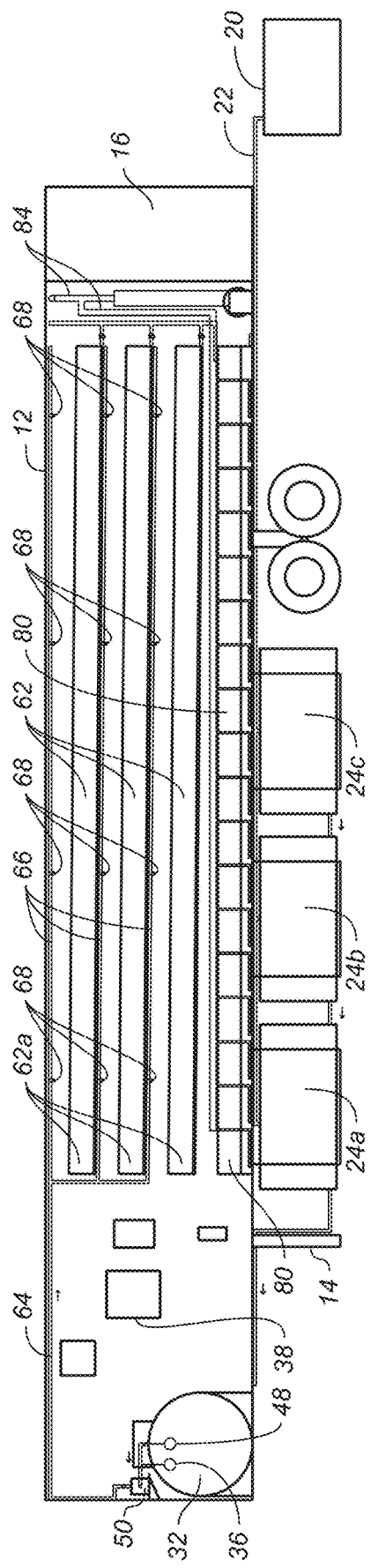
FIG. 2 is a cross-sectional side view in elevation thereof, taken generally along the longitudinal midline, section 2-2 of FIG. 1.
Figure 3:
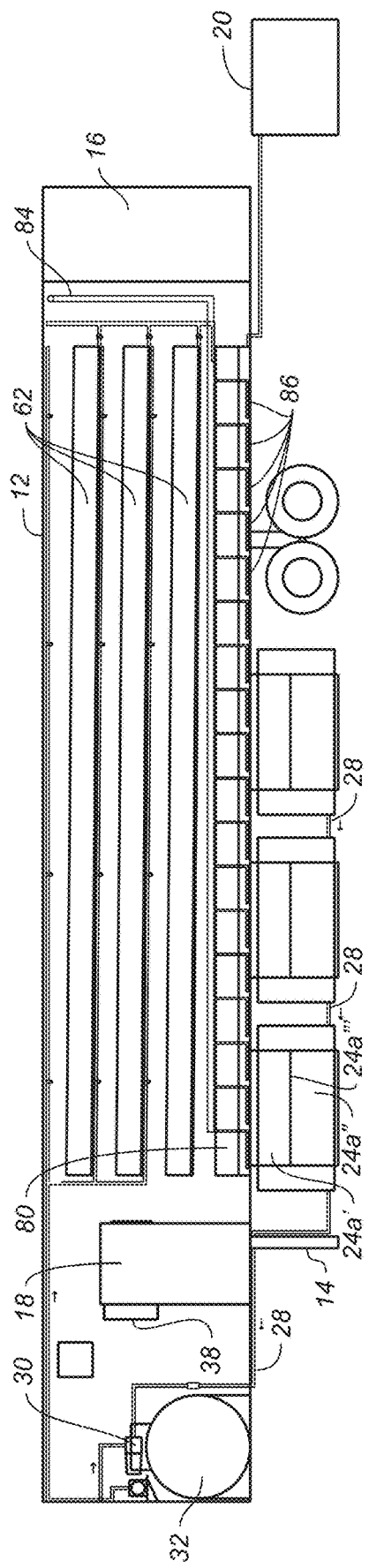
FIG. 3 is a cross-sectional left side view in elevation taken along section line 3-3, with select elements remaining for orientation and an appreciation of scale.

Referring first to FIGS. 1-3, collectively there is shown the primary components comprising a transportable (trailer-based) embodiment 10 of the treatment and conversion system of the present invention. In its most essential aspect, the system includes an organic waste storage containment tank, vermicomposting digestion containment tanks, an irrigation system, vermicomposting digestion structure, and a compost tea bioreactor. In the views, it will be appreciated that FIG. 3 includes a few elements not otherwise visible in the section taken, most notably including the front door of the trailer.

The inventive treatment and conversion process can be practiced using several system configurations to convert many different types of waste streams into feedstock for vermicomposting, and then to produce worm castings, vermicompost, and compost tea. The types of waste streams that may be treated include, among others: winery waste water, brewery waste water, dairy lagoon water, swine waste water, slaughterhouse waste water, food processing waste water, residential and municipal sewage, industrial and commercial waste water, compost leachate, digestate, and other waste waters containing organic materials and/or nutrients.

Many of these waste water streams are very difficult to process and are not suitable for standard vermicomposting systems. Standard vermicomposting systems are not designed to treat high liquid streams, do not control oxygen levels, and do not have the capacity to convert nutrients that are harmful to worm culture into a form that is less harmful. The treatment and conversion system 10 is capable of safely and effectively processing these liquid and semi-liquid waste streams and of producing high quality worm castings, vermicompost, and compost tea.

In an embodiment, the treatment and conversion system may be housed in a trailer or semi-trailer 12 of any suitable size, scaled according to the intended uses and the volume of the waste stream and the rate at which it must be treated. A single trailer may be combined in any of a number of ways with other trailers to form larger systems or with some system components on site. In an embodiment, however, essentially all treatment and conversion system equipment is housed within the enclosed trailer cargo space defined by the trailer cargo box. If a semi-trailer of the kind shown is employed, an adjustable length landing gear 14 is provided for supporting the trailer when uncoupled from a tractor and for leveling the trailer from front to rear. This will enable drain basins and piping inside the trailer to be set at slopes optimal for system function. To any degree that the landing gear adjustability is insufficient, shimming and blocks may be employed as a supplement. Rear doors 16 provide access to the rear portion of the cargo box and also provide means to shut out light during operations, as it is well-known that light exceeding 40-50% of daytime light levels will paralyze worms exposed to it more than an hour, disabling them from burrowing back into dark substrate. Thus, some suppression of light for daytime operations is essential to maximize worm mobility. If the rear doors must remain open for equipment deployment, opaque curtains can be provided to darken the cargo space. In addition to the rear door, a side door 18 provides access to the front portion of the trailer.

In this embodiment of the inventive system, a pretreatment system includes a waste water containment tank 20 to store the liquid and semi liquid organic waste streams. This tank may be provided with a recirculation line and pump so that its contents are continually circulated, and thereby oxygenated, before introduction into the next pre-treatment stages. A fluid line or hose 22a is extended from the trailer and coupled to the containment tank, and the contained liquid or semi-liquid waste stream is pumped from the waste water containment tank through the fluid line 22a into and along a main line 22b interior to the cargo area to a plurality of anaerobic vermicomposting and solid separation tanks 24a, 24b, 24c, into which the waste water is introduced through nozzles or other terminal fluid distribution fittings 26a, 26b, 26c, respectively, over each tank. Next, and taking a single solid separation tank as an example, each solid separation tank includes two levels: an upper composting level 24a' comprising wood shavings and worms, and a lower anaerobic digesting level 24a" comprising a contained culture of anaerobic bacteria and enzymes. The upper and lower levels of the solid separators are divided by a mesh screen 24a''', which supports the wood shavings and an earthworm bed, captures a portion of solids in the waste stream, as well as vermicompost and worm castings, yet is configured to permit passage of the liquid run off or leachate through the screen and into the lower level. The lower level may also include dosing ports for introducing or inoculating the lower level substrate or solution with an optimal bacterial flora for digesting suspended and dissolved solids and organic compounds in the waste stream.

In this anaerobic digester stage of the process, nitrate is denitrified to atmospheric molecular nitrogen ($N_2$). This reduces the stress on the worm cultures, as suitable compositing worm species (e.g., *Eisenia fetida*) are exquisitely sensitive to ammonia and nitrogen content. Ideal ammonia content for vermicomposting is less than 1 mg/g. Pretreatment of the waste stream thus allows treatment and conversion of waste streams having higher concentrations of nitrogen and ammonia without risking harm to the worm cultures. The pretreatment stage also enables the addition of specific nutrients, enzymes, and vitamins that shift the biological populations to beneficial microbes to aid the worm cultures in breaking down the organic matter, reduce particle size, reduce the volatile organic acid content, and reduce the biological oxygen demand, thereby creating a more suitable feed for the worm cultures. Consequently, the pretreatment also enables a higher loading rate and a lower retention time.

Leachate from the anaerobic portion of the process trickles down through the solid separators and is directed into a continuous fluid line 28 where it is pumped by pump 30 into a pH adjustment tank (or buffer tank) 32 through an influent line 34. Here the physical and chemical composition of the waste stream and several process parameters may be modified as necessary to ensure optimal conditions for aerobic vermicomposting. For instance, pH may be sampled by a pH sensor 36 coupled to a controller 38 running process control software based on the industry standard 4-20 mA analog current loop or a comparable electrical signaling system (the controller discussed in detail below). If the pH of the waste water in the pH adjustment tank is outside a predetermined optimal range, a signal can be sent by the controller to a caustic tank metering pump 40, which injects a metered dose of caustic, such as sodium hydroxide, potassium hydroxide, or calcium hydroxide, drawn from a caustic tank 42, and injected into a recirculation line 44 through a may be added to the unbuffered influent in the pH adjustment tank.

Further, dissolved oxygen may be tested using a DO sensor (not shown, but well known). An aeration system comprising a blower and fluid lines (and discussed more fully below) may be provided and put into fluid communication with the fluid flow through at any point, including internal to the pH adjustment tank. This controls the oxygen levels of the liquid so as to enable fine tuning of the dissolved oxygen in the liquid stream, both early and late in the processing, and thus to control the biological oxygen demand ("BOD"). As is well known, this enables the operator to adjust the BOD to ensure that the optimal amount of dissolved oxygen is available for complete microbial metabolism of the organic compounds in the waste stream once it reaches the aerobic digesters (discussed more fully below). The system is therefore configured with an oxygen sensor (not shown) and an aeration system including a blower, main air lines, and perforated diffusers 82, 84, 86 discussed later in connection with a post-treatment stage. The blower and fluid lines may be put into fluid communication with the fluid flow in the first stage to automatically control the dissolved oxygen content in the waste stream in both the pretreatment stage and the vermicomposting state, such that the system can cycle between aerobic and anaerobic conditions. This allows the system to perform a nitrification and denitrification cycle where specific bacteria convert the nitrogen present in the organic waste streams from organic nitrogen into ammonia and then to nitrite and then to nitrate in the aerobic stage. As will be appreciated, other parameters, such as electrical conductivity, may be tested to ensure an optimal composition for further vermicomposting processing.

The pH adjustment tank also includes level sensor 48 coupled to the controller 38. A level sensor signal showing a sufficient volume in the tank (i.e., within the useable pump suction height) causes the controller to power on pump 50, which draws the waste water in the pH tank and sends it through an irrigation system to the next stage of processing, viz., the aerobic vermicomposting stage 60. Thus, when the liquid level in the tank is sufficiently high and the conditions in the pH adjustment tank are within optimal ranges for continued vermicomposting, controller 38 may automatically send a start signal to pump 50. Alternatively, controller 38 may send a signal to a visual display, either on the controller housing itself or to a network-connected device in communication with the controller, to enable an operator to manually initiate the aerobic vermicomposting stage. Waste water pumped from the pH adjustment tank may be further filtered or screened to prevent clogging or fouling of outlets by sizable solids that may have passed into the tank from the first digesting stage.

The aerobic vermicompost digester stage 60 includes a series of containment tanks (in the embodiment shown, six containment tanks in two stacked rows of three containers each) 62 that contain a mineral and solid high carbon media that support populations of worm, bacteria, and other microorganisms. The worm beds comprise an uppermost layer within the tanks. The treated liquid waste streams are distributed over the tops of the worm beds at the upper portion of the containment tanks 62a through an irrigation system connected to pump 50 and having a main line 64 that branches into lateral lines 66, either directly or through a manifold, and delivers pretreated waste water to a plurality of spray nozzles 68 disposed along the length of the lateral lines 66 throughout each level of the stacked containers. Automated irrigation system monitoring equipment can be used to minimize labor and maximize production.

During aerobic digestion the worm cultures, bacteria, and other microbes consume the organic matter and nutrients and produce a solid material consisting of worm castings, vermicompost (mixture of worm casting and composted substrate), and compost tea. Leachate (liquid run-off or "compost tea") drains from the bottom containment tanks and into bioreactor containers 80, one each positioned immediately below the stacked containment tanks and on the floor of the trailer. Here the leachate may be subjected to a post-treatment stage to increase the value of the compost tea or to further breakdown reduce the nutrient content of the liquid. The resulting products are highly valued in the agriculture, horticulture, landscaping, and retail markets for use as a soil amendment and biological inoculant.

The bioreactor containers 80 are sloped at a gentle 1-degree slope toward the rear of the trailer to facilitate collection and drainage. In addition to the bioreactor containers, the post-treatment stage includes an aeration system that oxidizes the liquid sufficiently to maintain aerobic conditions. The aeration system includes a blower 82 in fluid communication with two air main air lines 84, which feed fresh air to a plurality of diffusers 86 disposed along the length of the bioreactor containers near the bottom of the containers. One or more oxygen sensors coupled to the controller 38 or to an independent control system may be incorporated to automate the aeration system. Additional nutrients and vitamins may also be added to increase the levels of beneficial bacteria, fungi, protozoa, and nematodes. This allows for the production of high quality compost tea for use as a soil amendment and biological inoculant. The product of the process is directed through a fluid outlet line 88 to a compost tea storage tank 90 outside the trailer.

Figure 4:
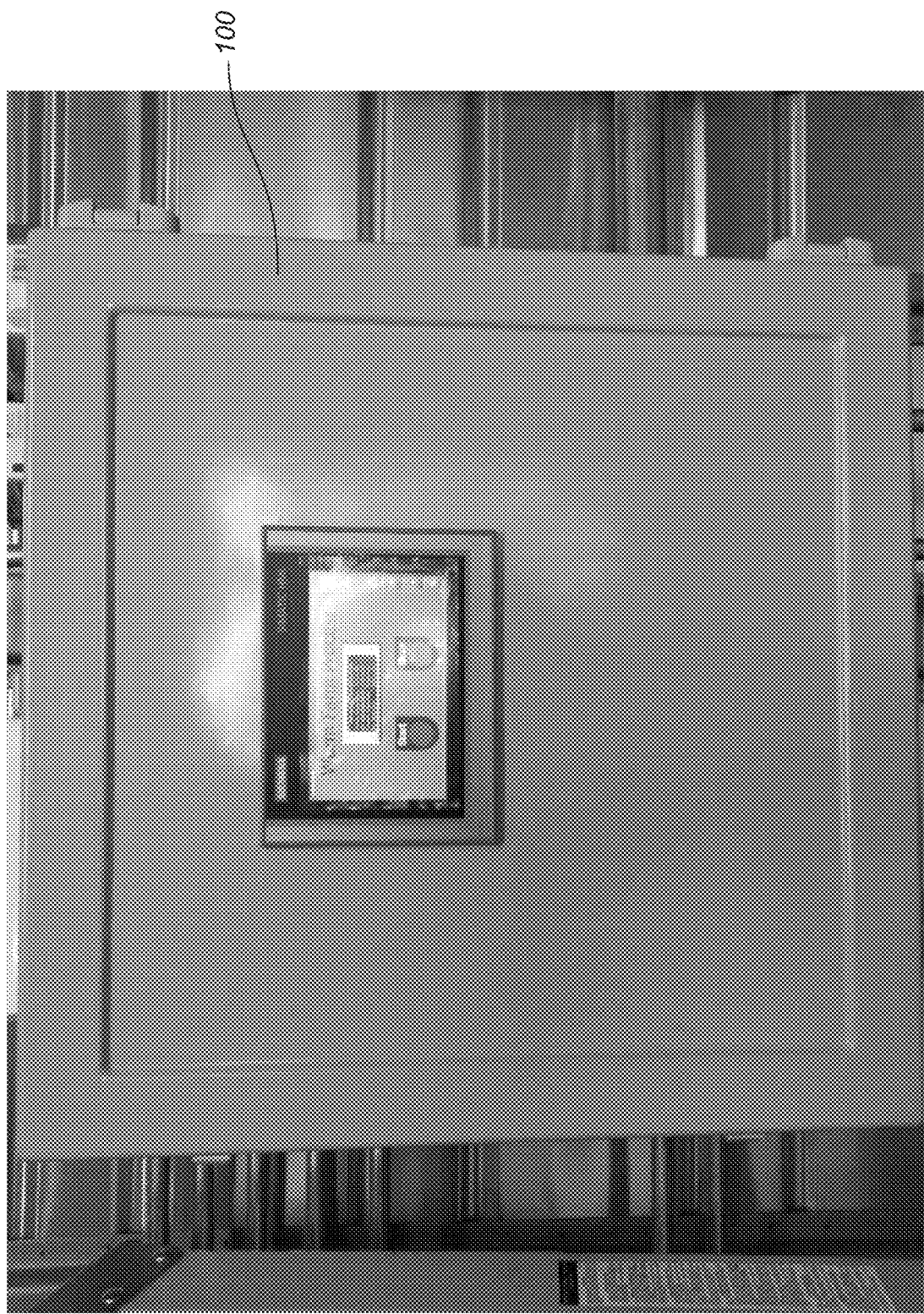
FIG. 4 is a front view in elevation showing the control cabinet and features the HMI touch screen for an operator to view system information and provide control inputs.

Looking next at FIGS. 4-47, there is shown the process control system for operating an embodiment of the inventive system for converting and treating waste streams. At the heart of the inventive system is a control cabinet 100, shown in in FIG. 4, which houses the electronics and human machine interface (HMI) for controlling the system. An exemplary HMI is the Siemens 7-Inch Comfort Panel Human Machine Interface (HMI), which is designed and manufactured by Siemens AG of Berlin, Germany. Control system software is network enabled so as to enable both local and remote access to the system, and thus to monitor and control the system process by engaging either directly (physically) with the HMI or remotely through a remote connected device, such as a smart phone, tablet, or personal computer.

The control system is a "set-it-and-forget-it" system. That is, when commissioning of the system is completed, all that it necessary for system operation is to press the Start or Stop buttons.

The following narrative covers the many HMI screens presented to an operator, including screens to view and assess system status, as well as screens for troubleshooting, testing, maintaining, and adjusting the system and the treatment process.

Figure 5:
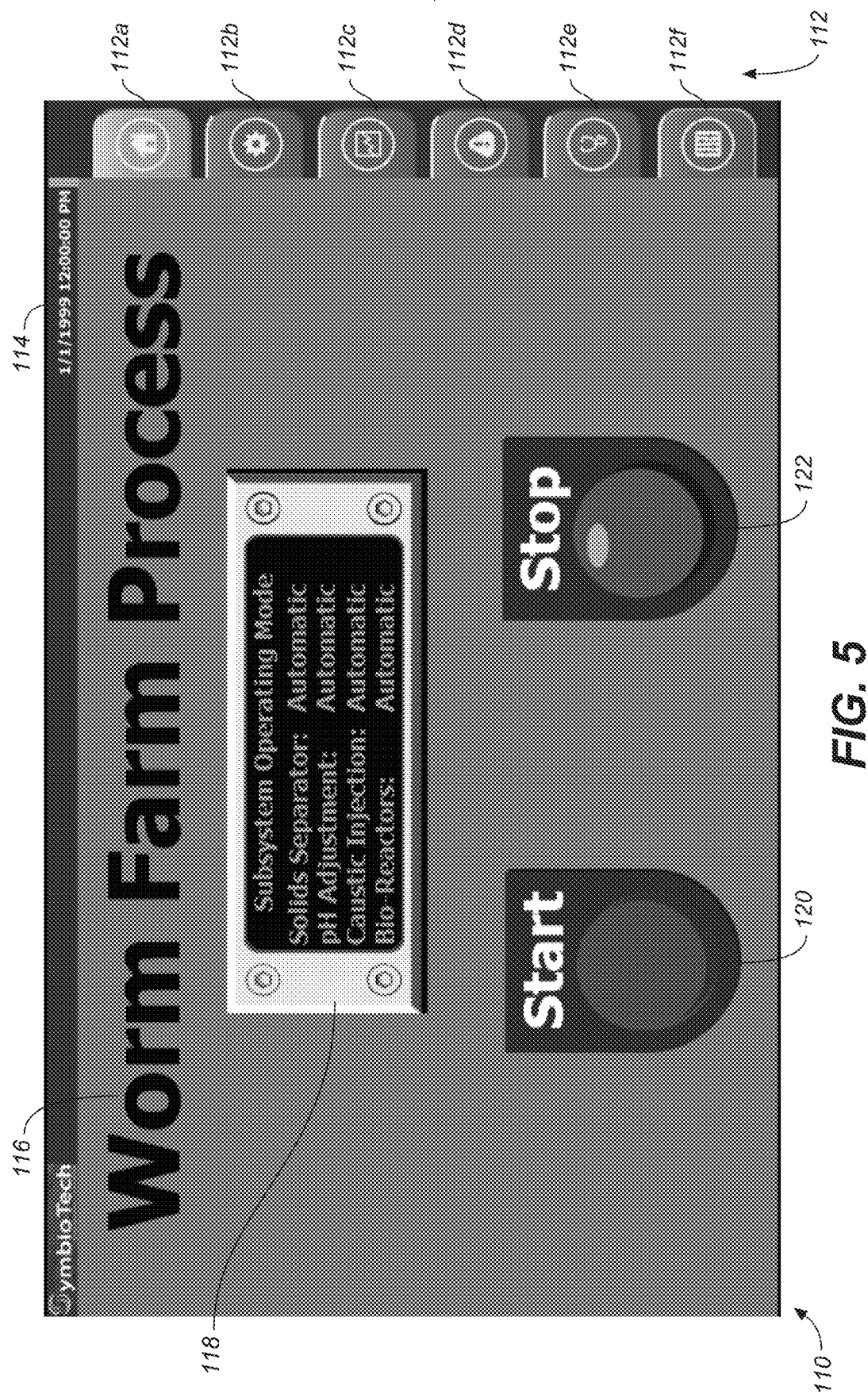
FIG. 5 shows the controller HMI Home Screen displayed when power is provided to the Control Cabinet, with navigation buttons displayed on the right of the screen.

FIGS. 5-47 show how an operator interacts with the HMI to provide process control inputs. FIG. 5 shows the process control Home Screen 110, the first screen displayed after power is provided to the Control Cabinet 100. This is the main screen to start and stop the vermicomposting process, hereinafter referred to as the "Worm Farm Process."

The Home Screen includes navigation buttons 112 on the right side of the screens. The active screen is displayed in a visually distinctive color, such as orange. Pressing a navigation button directs the operator to the main screen for the selected section. The navigation buttons include a button to return to the Home Screen 112a, a button 112b to navigate to (and display) process screens, a button 112c to navigate to a process trends, a button 112d to navigate to alarms and warnings, and a button 112e to navigate to system diagnostics, and a button to navigate to system settings pages.

The current operating system date and time 114 are shown in the upper right corner of the Home Screen, while the screen title 116 is prominently displayed in the upper center of the screen. A status display window 118 is displayed in the center of the screen and shows any pertinent information for the screen displayed.

A start button 120, when pressed, activates the alarms and warnings for each subsystem in the process. The stop button 122 stops alarms and warnings for each subsystem.

If the Worm Farm Process is stopped and there are no warnings or alarms active in the subsystems, the operator will see a Home Screen as shown in FIG. 5. When the operator wishes to begin processing a waste stream, he or she presses the Start Button 120 on the HMI touch panel. If the pH Adjustment subsystem is in automatic, and the pH Adjustment tank is sufficiently full (e.g., at least ¼ full), and if there are no pH or Bio-Reactor alarms, the operator will see the pop-up 130 in FIG. 6.

Figure 6:
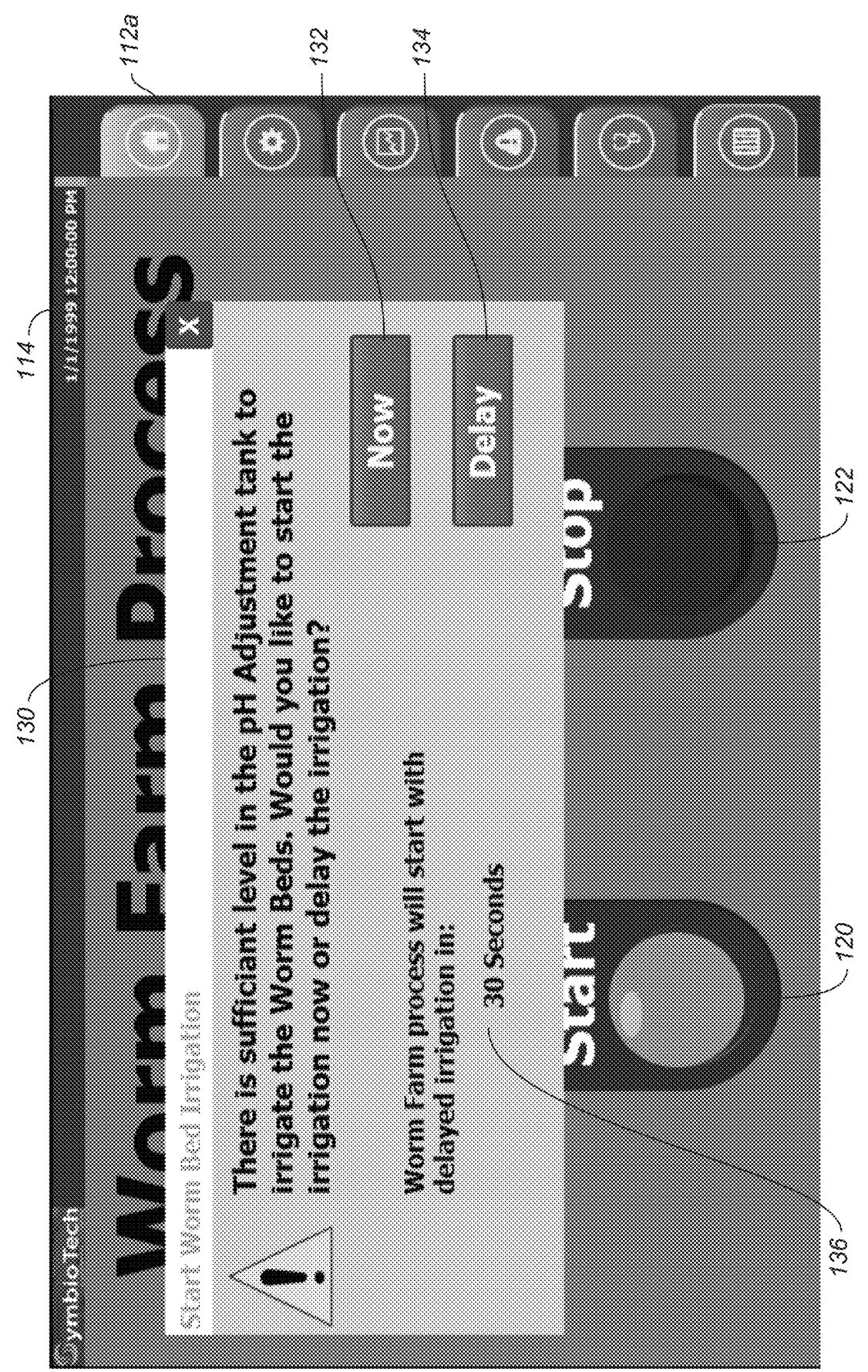
FIG. 6 is the same view showing a sufficient pH tank level for operation of the irrigation system and seeking operator input.

Thus, and referring now to FIG. 6, still on the Home Screen as shown in the 112a navigation button selection, the operator is notified 130 that conditions exist for beginning worm bed irrigation. Selecting "Now" 132 will cause the controller to start the worm bed irrigation immediately. Selecting "Delay" 134 will allow the operator to wait for the contact timer for the worm beds to expire before irrigation is started. The pop-up 130 will close upon a selection of either "Now" 132 or "Delay" 134. If a selection is not made within 30 seconds of the pop-up appearance, and if the Count Down Timer 136 expires, the pop-up window will close and delayed irrigation will be initiated.

Figure 7:
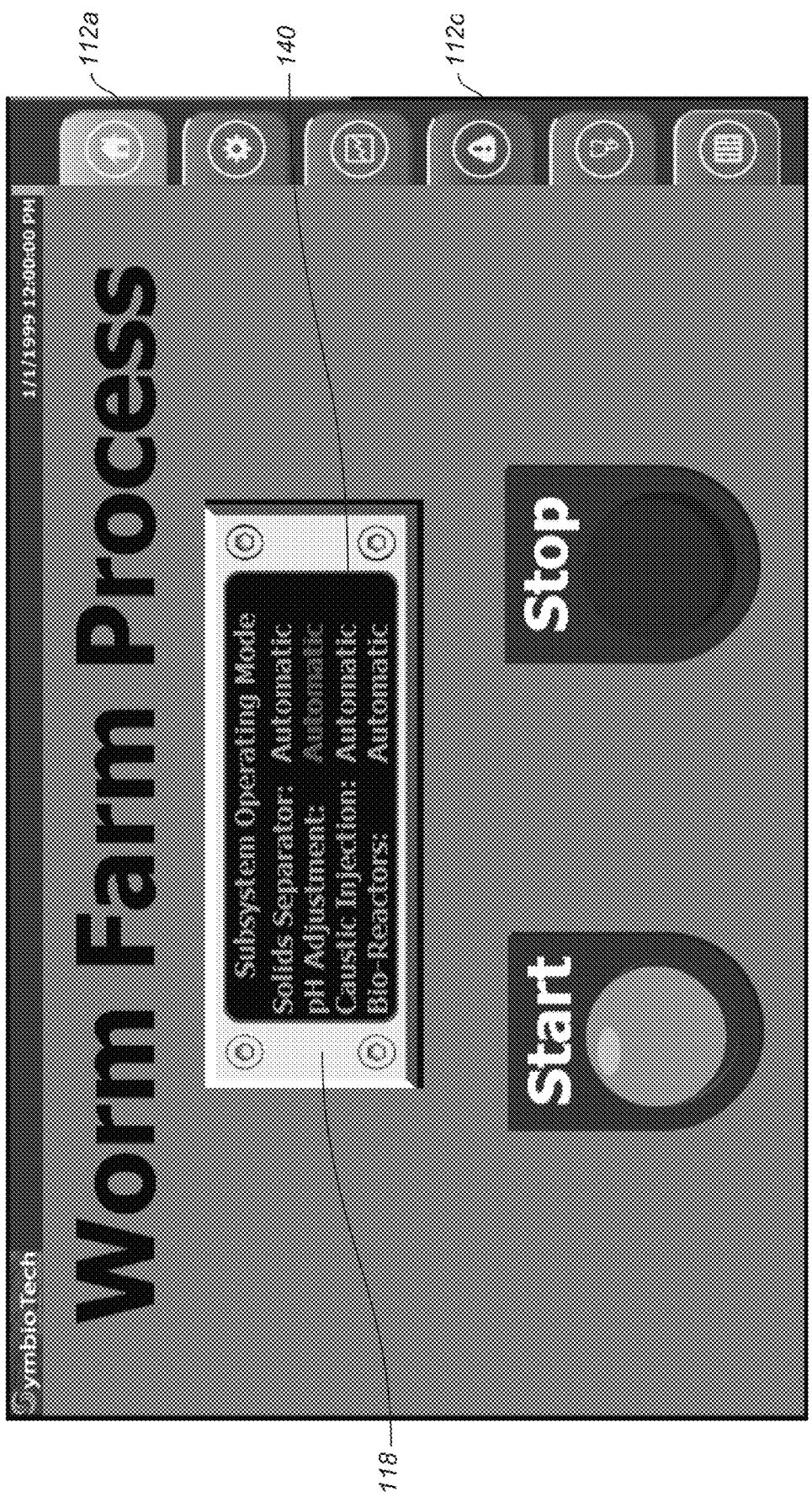
FIG. 7 is the same view showing process systems, with one system in an alarm condition.
Figure 8:
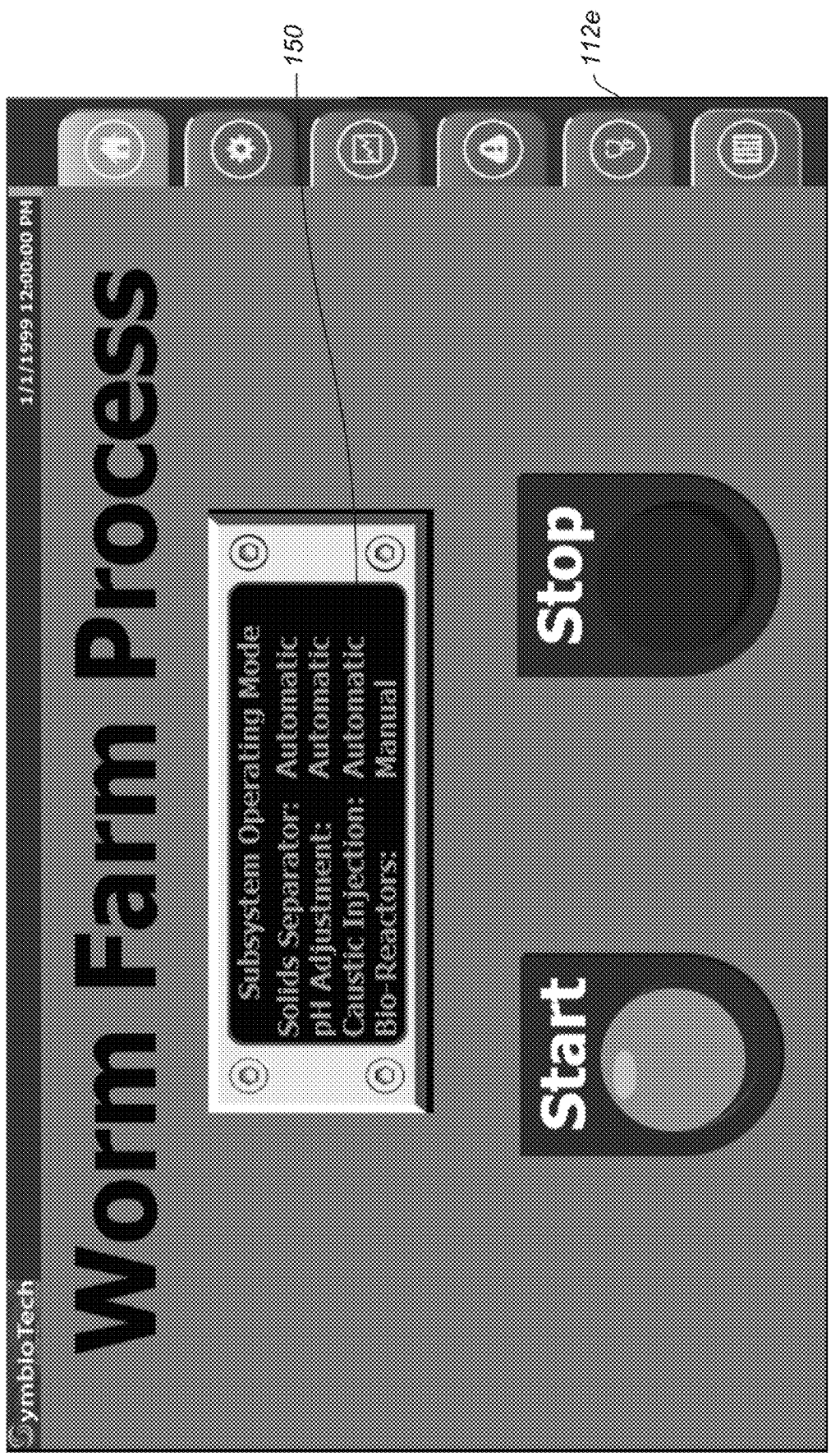
FIG. 8 is the same view highlighting a subsystem in manual mode.

Referring next to FIG. 7, if an alarm is present and displayed at the Home Screen (navigation button 112a still selected)—e.g., pH adjustment 140, as shown—the Worm Farm Process can still be started. The subsystem in alarm is displayed in a prominent color (preferably red) in the Home Screen status display window 118, and the Alarm navigation button 112d will also be red. All other subsystems not in alarm will start. Using conventional color coding for warnings and alerts, warnings are displayed in yellow and are self-correcting.

If a subsystem is in Manual operating mode—the example here being the Bio-Reactor subsystem 150—the Worm Farm Process can still be started. Any automatic features of that subsystem are suspended; that is, the pH adjustment tank fill or discharge can only be initiated from the Diagnostics screens, by first selecting the Diagnostics navigation button.

If the "Manual" indication 150 is displayed in yellow (Warning Condition) or red (Alarm Condition), the Worm Farm Process can still be started.

Looking next at FIGS. 9-12, there are shown various Process Overview screen displays 160. The Process Overview Screen 160, called by selecting navigation button 112b, shows the overall operation and health of the Worm Farm Process and visually displays system components and subsystems, including the solids separating subsystem 162, the pH adjustment tank 164, the caustic tank 166 provided with caustic for adjusting pH as needed, the worm bed irrigation system 168, the worm beds 170, the bio-reactor subsystem 172, and the blower for the bio-reactor aeration system 174. Various pumps and valves are also illustrated and will be considered in due course below.

Figure 9:
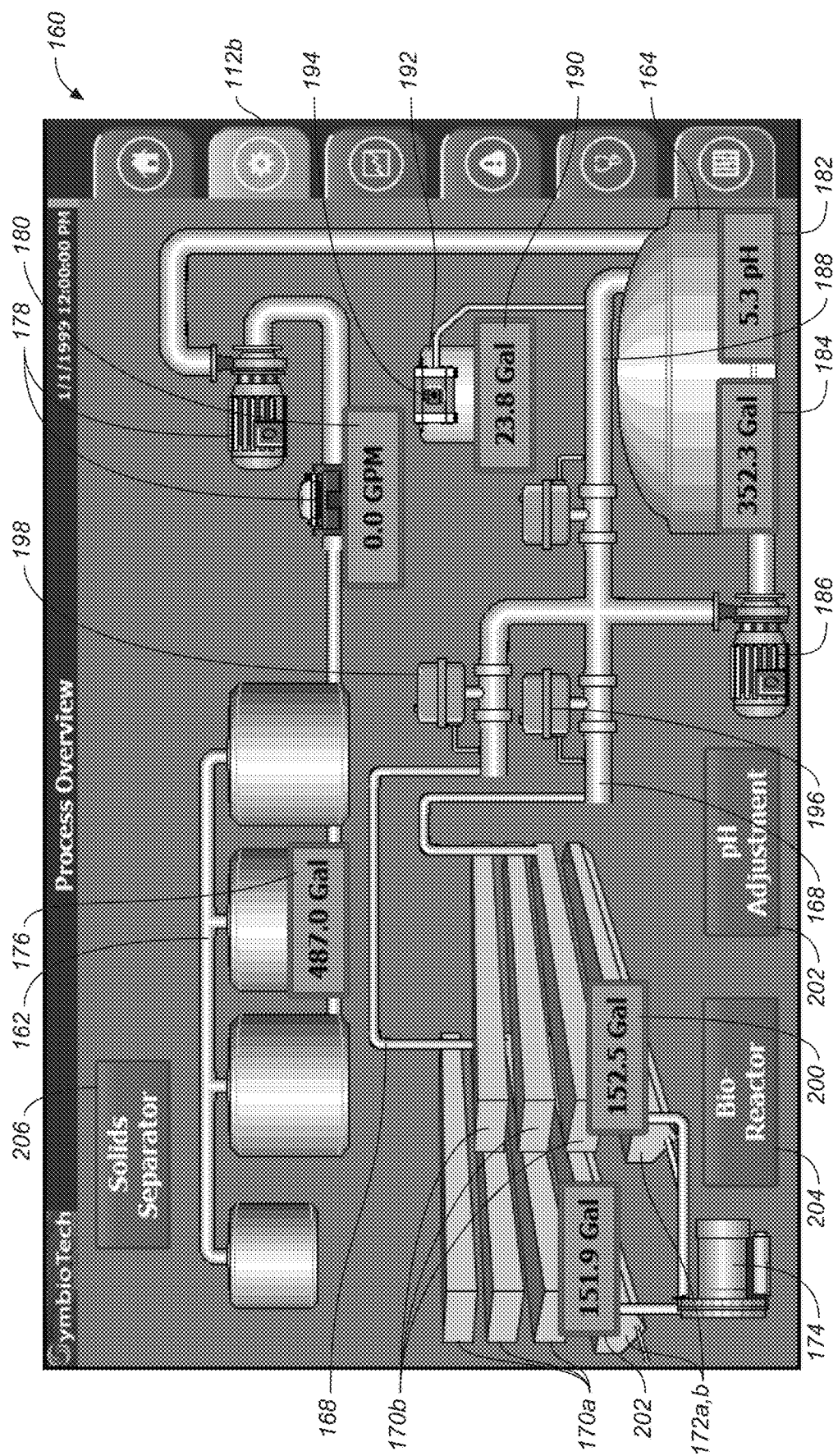
FIG. 9 shows the HMI displaying the Process Overview Screen displayed when the process overview button is selected among the navigation buttons.

Turning next to FIG. 9, it is seen that the Process Overview screen indications include: the level 176 in the bio-solids separator tanks; the ON/OFF condition 178 of the pump from the bio-solids separator to the pH adjustment tank (indicated with a color code, e.g., blue for an ON condition); the flow rate 180 into the process, that is, for waste water pumped from the bio-solids separator to the pH adjustment tank; the pH 182 and the level 184 of the water in the pH adjustment tank 164; the ON/OFF condition of the pH adjustment tank discharge pump 186; the OPEN/SHUT condition of the recirculation valve and line 188; the level 190 of caustic in the caustic tank 192; the ON/OFF condition (color coded) of the peristaltic discharge pump 194 in fluid communication with the caustic tank; the condition of the Left and Right Worm Bed irrigation system valves 196, 198, respectively; the recirculation system valve 199; and the leachate levels 200, 202 in the two bio-reactor system containers 172.

Selecting any of the three subsystem navigation buttons 204, 206, 208, will enable the operator to view additional details of that subsystem.

Figure 10:
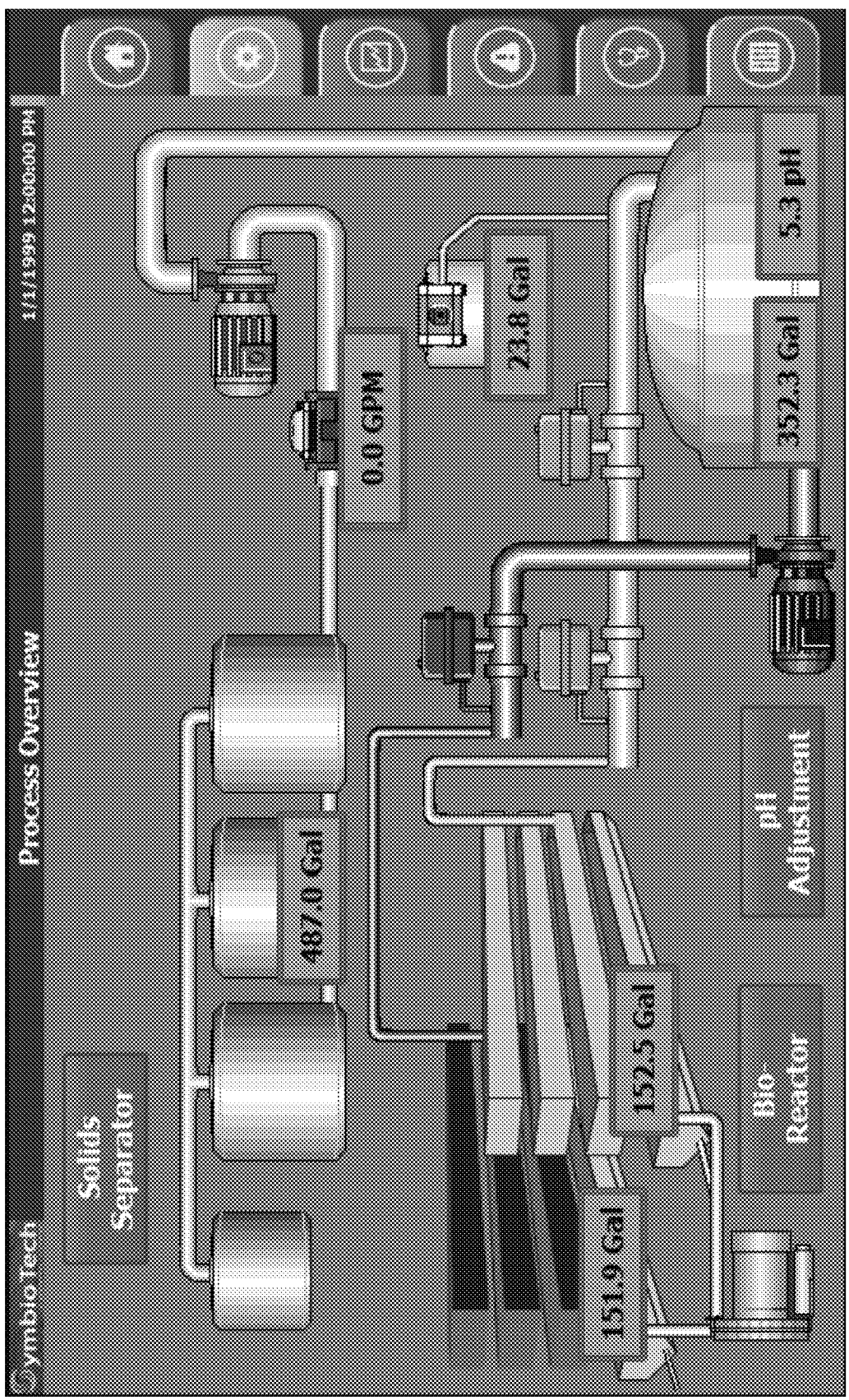
FIG. 10 shows how the process overview screen highlights a process subsystem in a called to run state.

If a subsystem process is called to run, the Process Overview will display an animation to show what operation is being initiated. In FIG. 10, the Left Worm Beds 170a are called to irrigate. When water is being moved, the pump 186, discharge piping 210, and valve 198 turn blue. When the water in the pH Adjustment tank is being neutralized, the caustic tank 192, its peristaltic pump 194, piping 212, and the pH adjustment tank 164 are highlighted in a coded color, preferably orange. When the bio-reactor blower 174 is running, the blower and bio-reactor tanks 172 are highlighted in a conspicuous color, preferably green.

Figure 11:
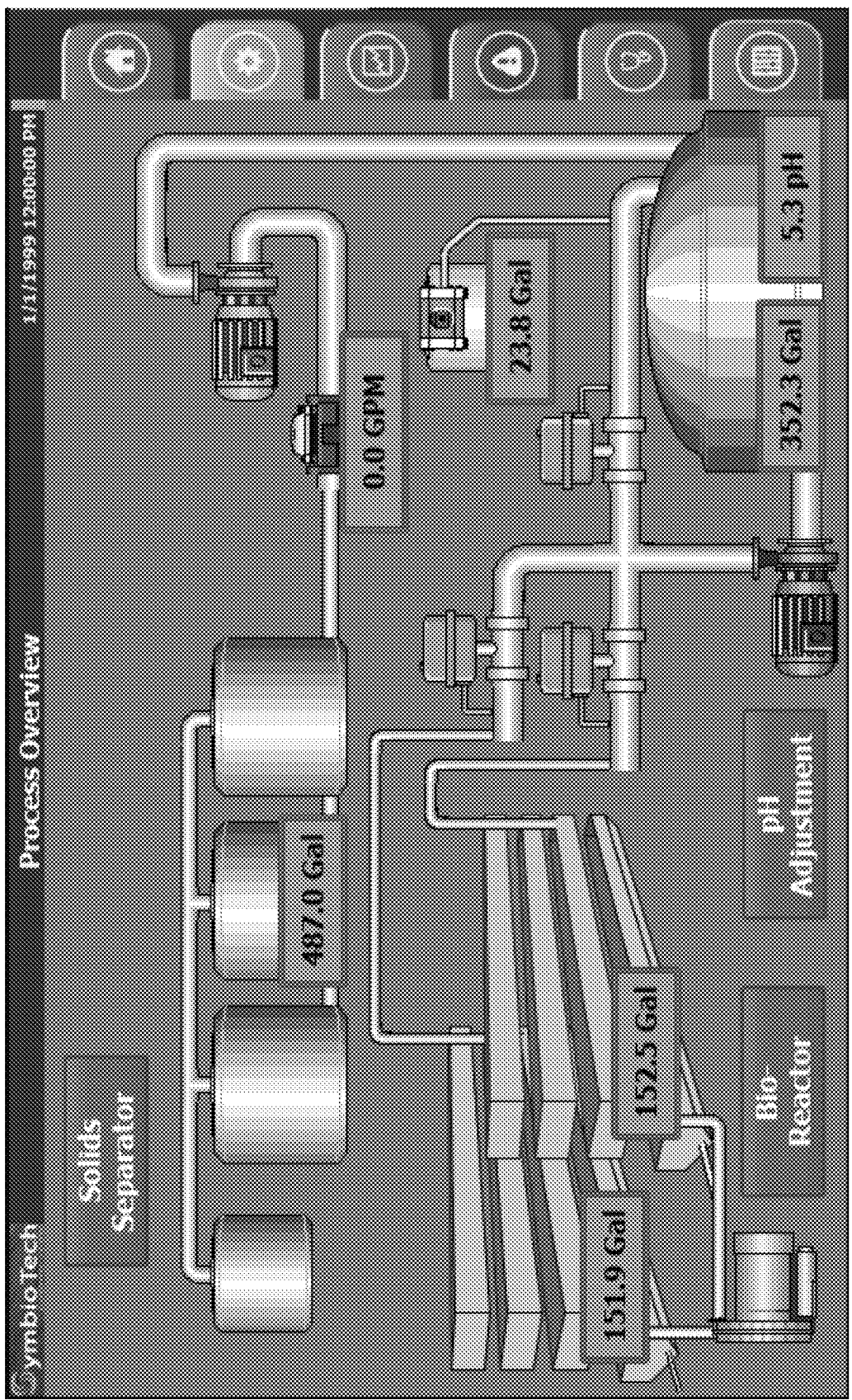
FIG. 11 shows how the Process Overview Screen displays subsystems in an alarm state.

Turning next to FIG. 11, if an alarm is present, the associated components of the subsystem are displayed in red (here shown as the pH tank 164 and discharge pump 186. As in FIG. 11 below, the pH adjustment subsystem is in Alarm, and the corresponding Alarm navigation button 112d is also highlighted.

Figure 12:
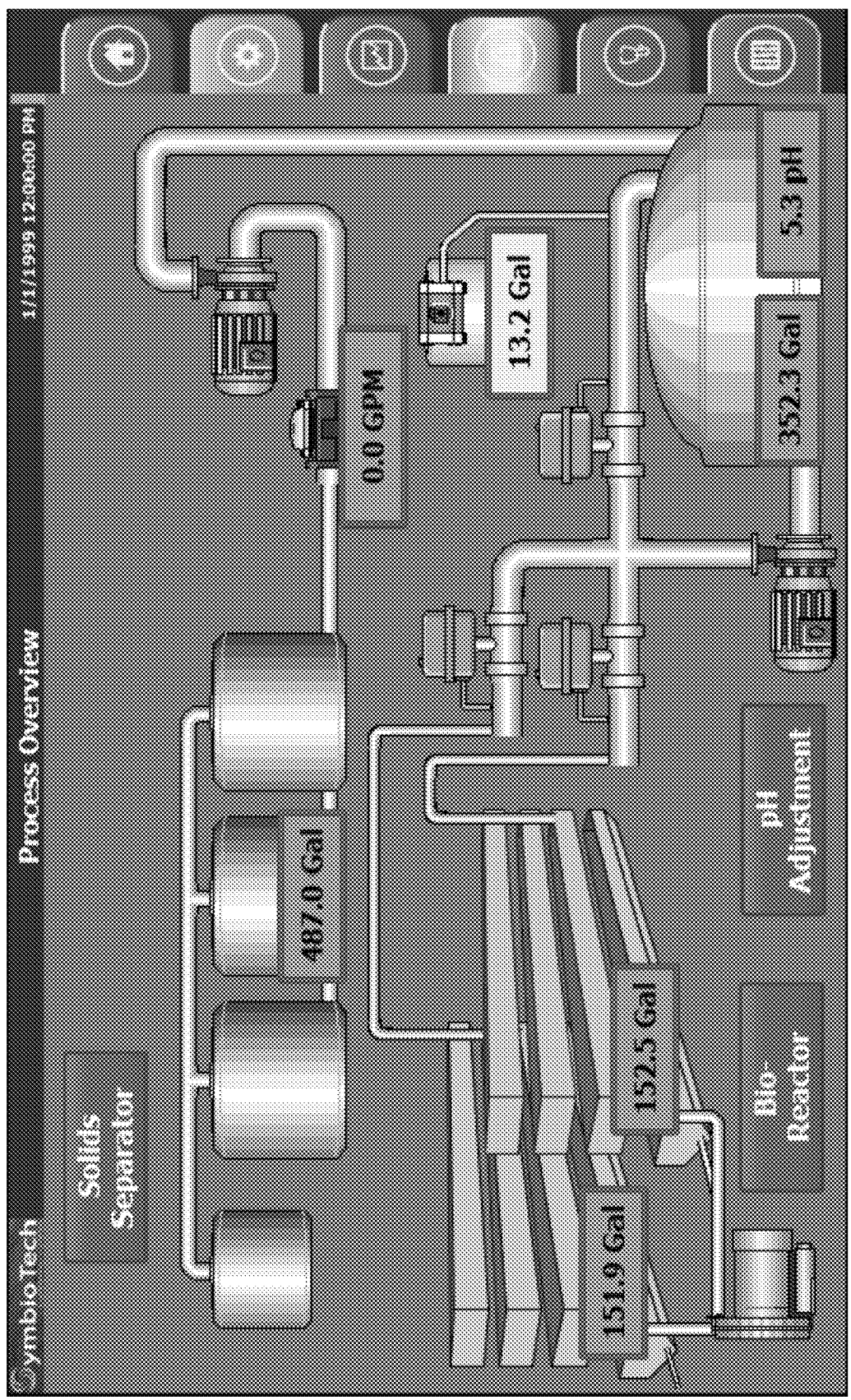
FIG. 12 shows how the Process Overview Screen displays subsystems in a warning state.

If, by contrast, a warning is present, shown in FIG. 12, both the system parameter with a warning (here the caustic tank level 190) and the Alarm Navigation Button 112d flash yellow.

Figure 13:
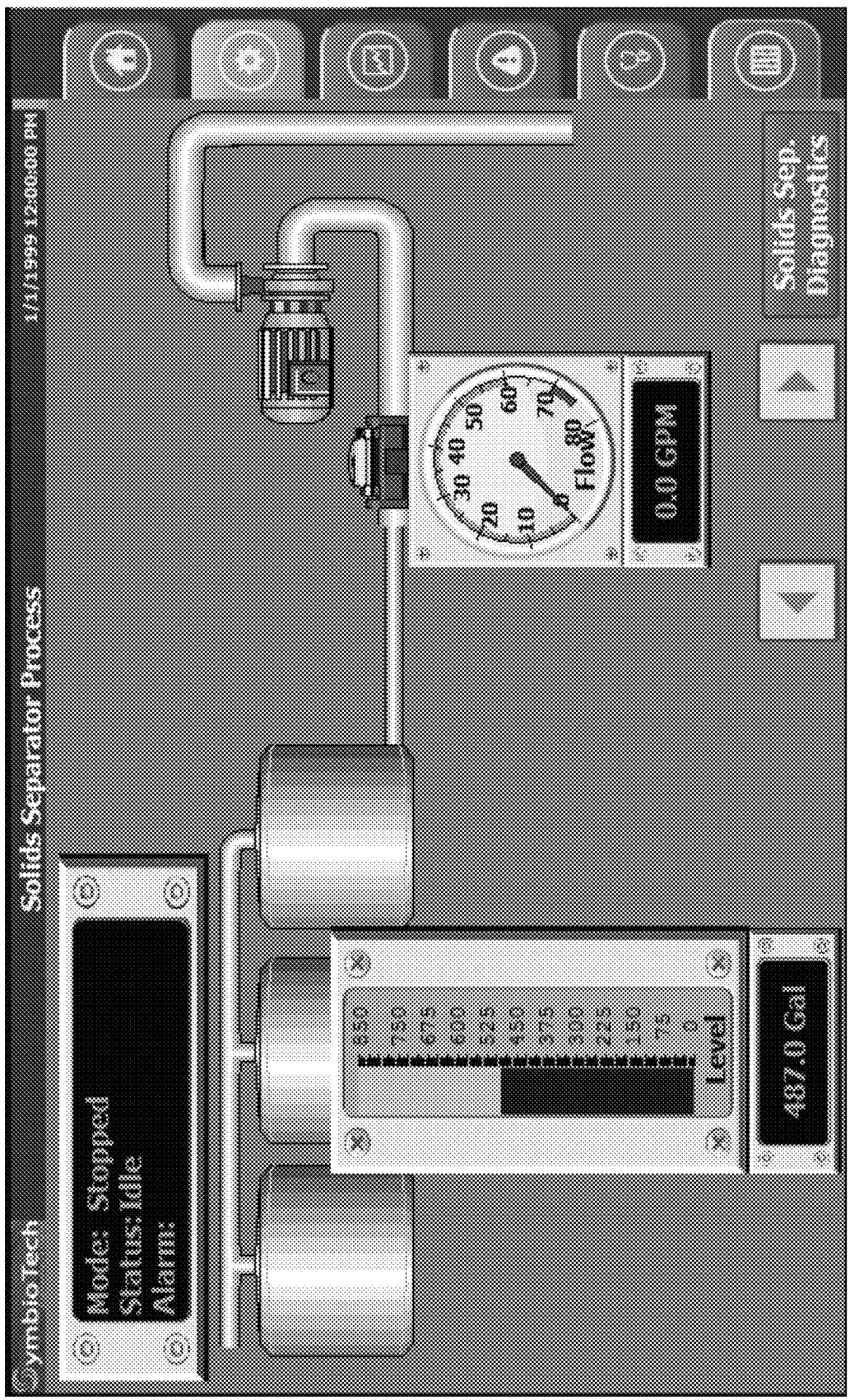
FIG. 13 illustrates a status display for a particular subsystem, in this instance the solids separator subsystem.

FIGS. 12-16 feature common elements of the subsystem process control. The process control screens are accessed by touching or clicking on the subsystem navigation buttons 202, 204, 206 on the Process Overview screen. FIG. 13 shows a first subsystem process status screen, in this instance the Solids Separator Process 220. Elements in FIG. 13 carry forward in the various views with common element bearing the same reference numbers. These include: the Status Display 222, which consists of three lines of information for the subsystem, including a Mode indicator line 224, a Status indicator line 226, and an Alarm indicator line 228; The Mode line has three options—Stopped, Automatic, or Manual. A "Stopped" mode indication shows that the Worm Farm Process is in a stopped condition. An "Automatic" mode indication signifies that the Worm Farm Process is currently started and the subsystem is in Automatic. A "Manual" mode indication signifies that the subsystem is in Manual and will be displayed whether the Worm Farm Process is stopped or running.

The Status indictor 226 displays information that varies according to the subsystem process then in view and depending on the part of the subsystem process that is running. "Idle" indicates that no process is currently called in that subsystem.

The Alarm indicator has three conditions; "Blank", "General Area Alarm," and "Level Warning". The "Blank" indication signifies that there are no alarms or warnings then present in that subsystem. A "General Area Alarm" indication signifies that an alarm is present in the subsystem and is accompanied with a red Alarm navigation button 112d.

The "Level Warning" indication may be either a Low Level Warning or a High Level Warning and is displayed concurrently with a flashing yellow Alarm navigation button 112d.

"Previous" and "Next" navigation buttons 230, 232, left and right arrows, respectively, navigate to the previous step in the Worm Farm Process or to the next step in the process. When there is no "next" step in one direction or the other, the selection takes the operator back to the Process Overview screen. Thus, the left arrow in the Solids Separator Process and the right arrow in the Bio-Reactor Process to open the Process Overview screen.

Figure 14:
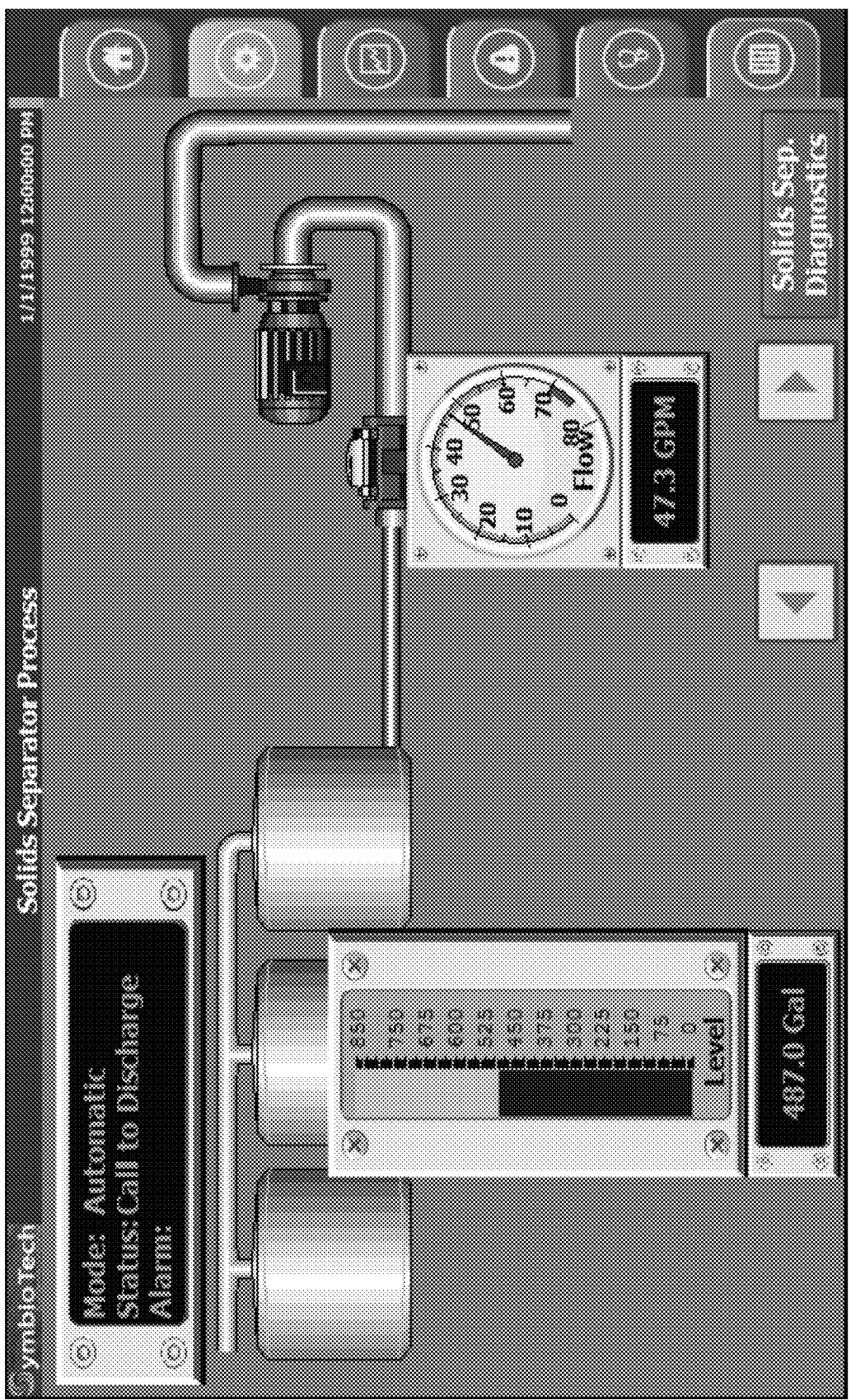
FIG. 14 illustrates the elements included in the solids separator process screen.

As seen in FIGS. 13-14, selecting the Subsystem Diagnostics Navigation Button 112e opens the subsystem diagnostics screen for the process then displayed. Thus, when viewing the Solids Separator Process, selecting the Subsystem Diagnostics Navigation Button 112e takes the operator to the Solids Separator Process Diagnostics screen 240. This screen consists of three detailed elements earlier shown in the Process Overview screen, including the Solids Separator Holding Tanks 162, the Worm Farm Process Flow Meter 180, and the Solids Separator Holding Tank Discharge Pump 178. If waste water is being moved, the associated piping 242 and pumps 178 are color highlighted, e.g., in blue. The Status conditions of the Solids Separator Process are "Idle", "Call to Fill", "Call to Discharge", or "Call to Fill/Disch".

Figure 15:
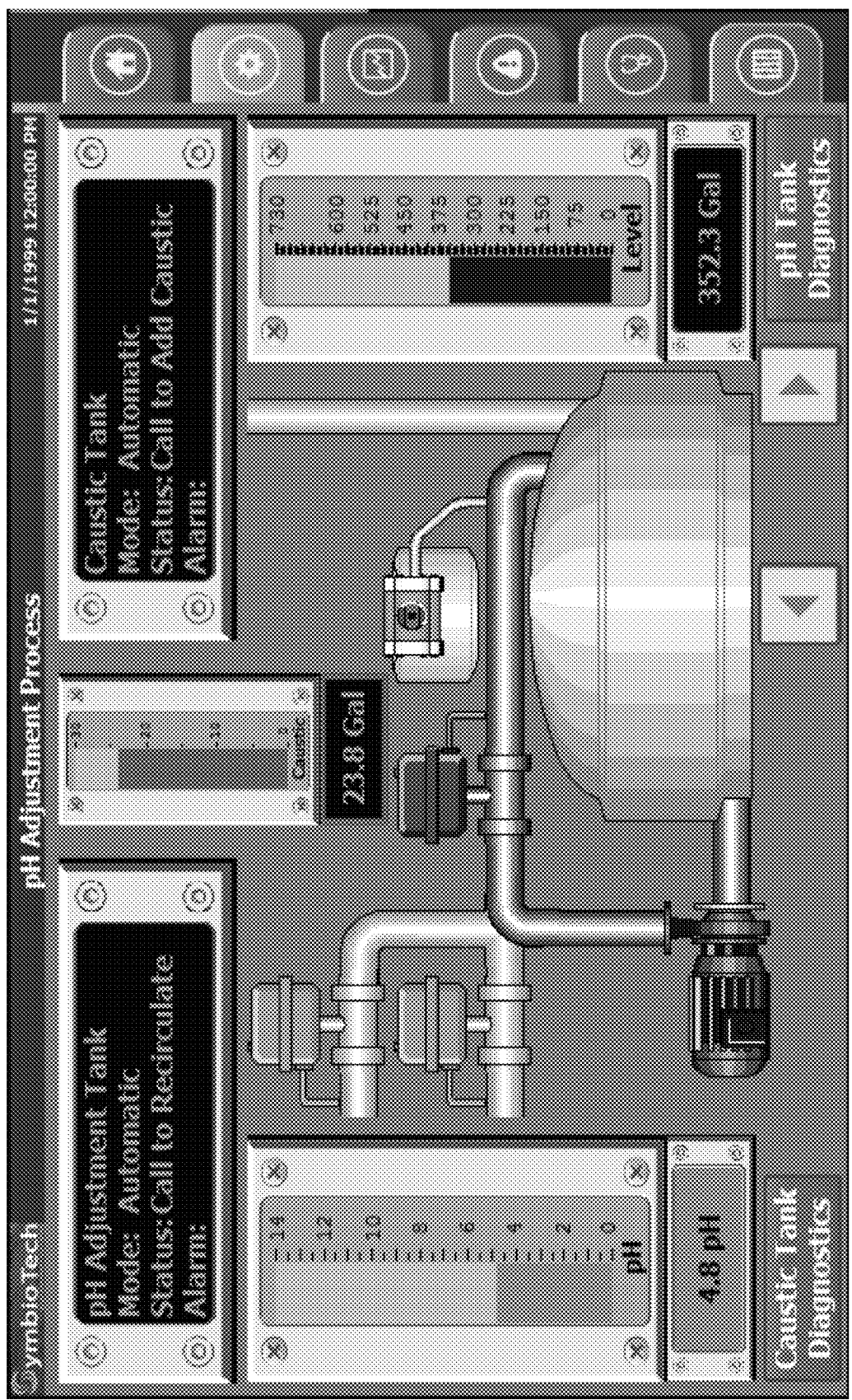
FIG. 15 illustrates the elements included in the pH adjustment process screen.

Turning next to FIG. 15, the pH Adjustment Process screen 250 is shown. The pH Adjustment Process screen consists of seven elements: the pH Adjustment Tank 164, the pH Adjustment Tank Discharge Pump 186, the Right Worm Bed Irrigation Valve 196, the Left Worm Bed Irrigation Valve 198, the pH Adjustment Tank Recirculation Valve 199, the Caustic Tank 192, and the Caustic Tank Peristaltic Discharge Pump 194. There, status condition indications for the pH Adjustment Tank include: "Idle", "Call to Fill", "Irr Beds 1,3,5", "Call to Fill/Irr", "Irr Beds 2,4,6", or "Call to Fill/Recirc". The Caustic Tank has three status conditions: "Idle", "Call to Neutralize "pH", or "Call to Add Caustic". If water is being moved, the associated pumps 194 and 186, and piping 188, 212 and pumps are displayed in blue. If the pH of the pH Adjustment Tank should fall below the pH neutralization start set point, any Worm Bed irrigation is paused and the "Call to Add Caustic" is initialized for a set time. During the mixing process of pH neutralization, the status of the Caustic Tank will display "Call to Neutralize pH". The Caustic Tank Peristaltic Discharge Pump 194 its and piping 212 and the pH Adjustment Tank 164 will display in orange, and the pH measure value will flash orange when the pH adjustment is active and includes a numeric indication 182a and an analog level indicator 182b.

Figure 16:
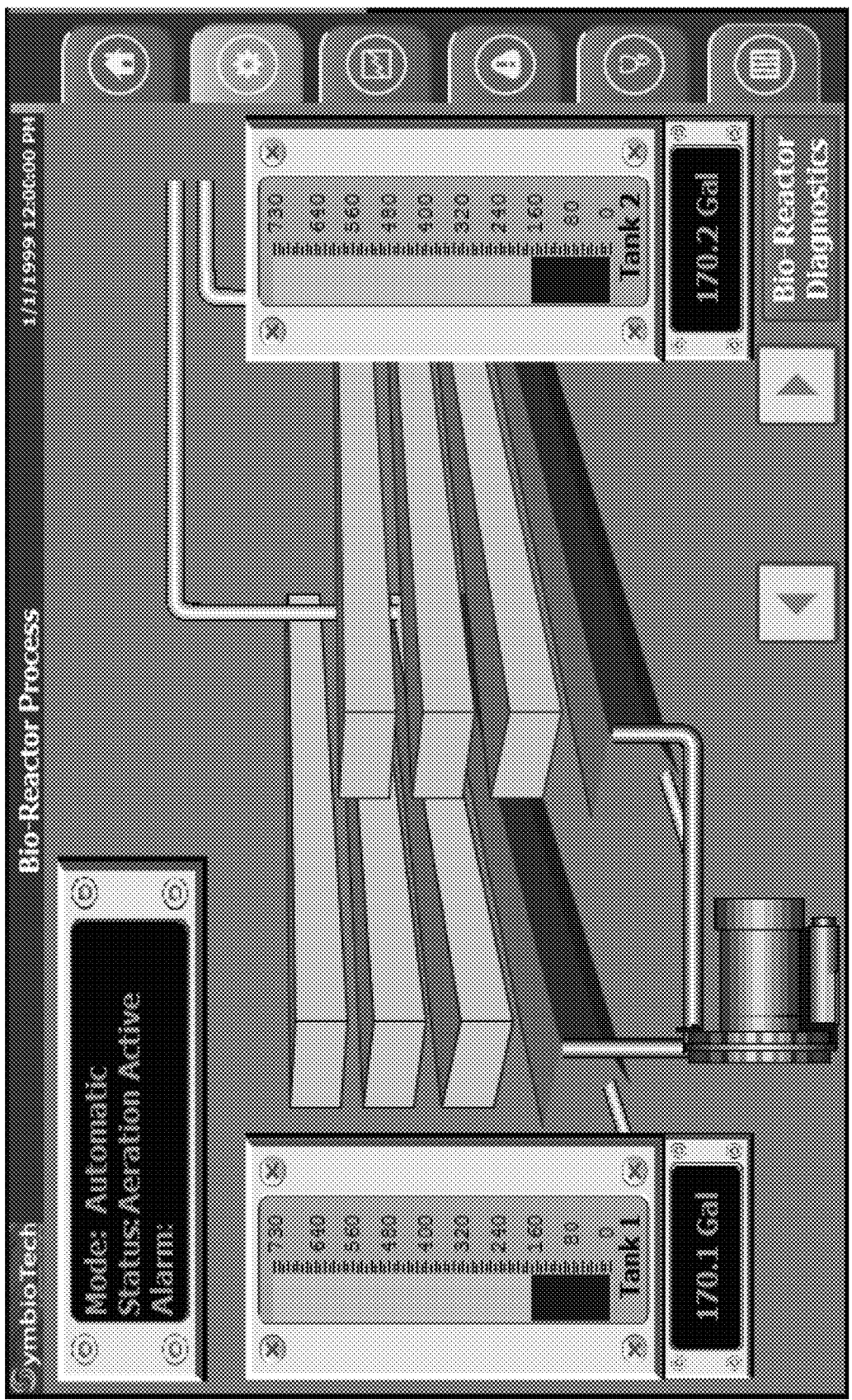
FIG. 16 illustrates the elements included in the bio-reactor process screen.

Now referring to FIG. 16, the Bio-Reactor Process screen 260 consists of five elements, including: the Left Worm Beds 170a, the Right Worm Beds 170b, the Bio-Reactor Tank 1 (Left) 172a, the Bio-Reactor Tank 2 (Right) 172b; and the Bio-Reactor Aeration Blower 174. The Bio-Reactor has five status conditions: "Idle", "Aeration Active", "Drain Tank 1", "Drain Tank 2", and "Drain Tank 1&2". If the Left or Right Worm beds are being irrigated, the associated Worm Beds 170a, 170b and piping 168a, 168b are displayed in blue. If a Bio-Reactor tank 172a, 172b is being drained, the associated piping for that tank is displayed in blue. If the aeration is active, the Aeration Blower and Bio-Reactor Tanks are displayed in green.

Figure 17:
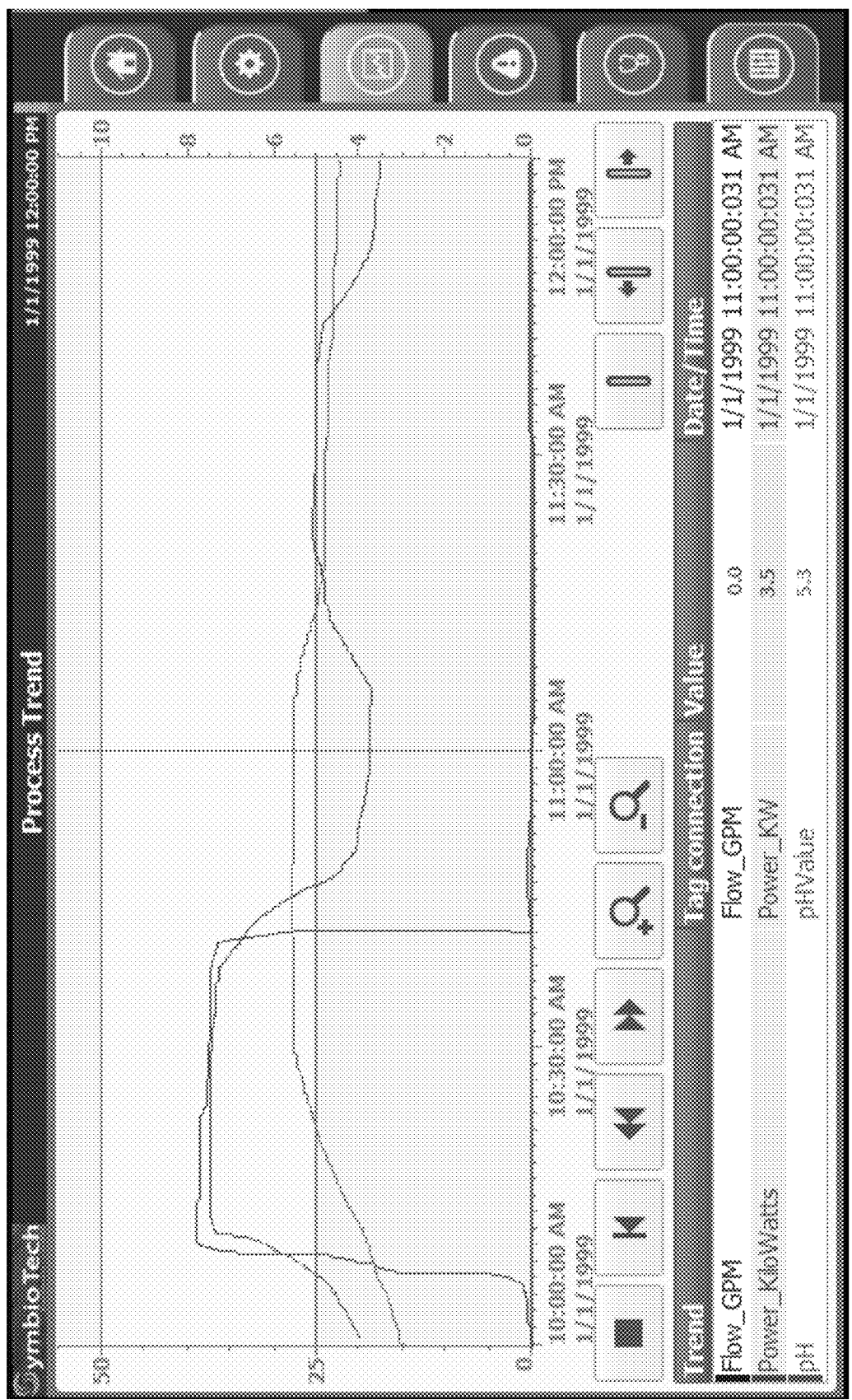
FIG. 17 shows the Process Trend Screen with data from three system sensors graphically displayed.
Figure 18:
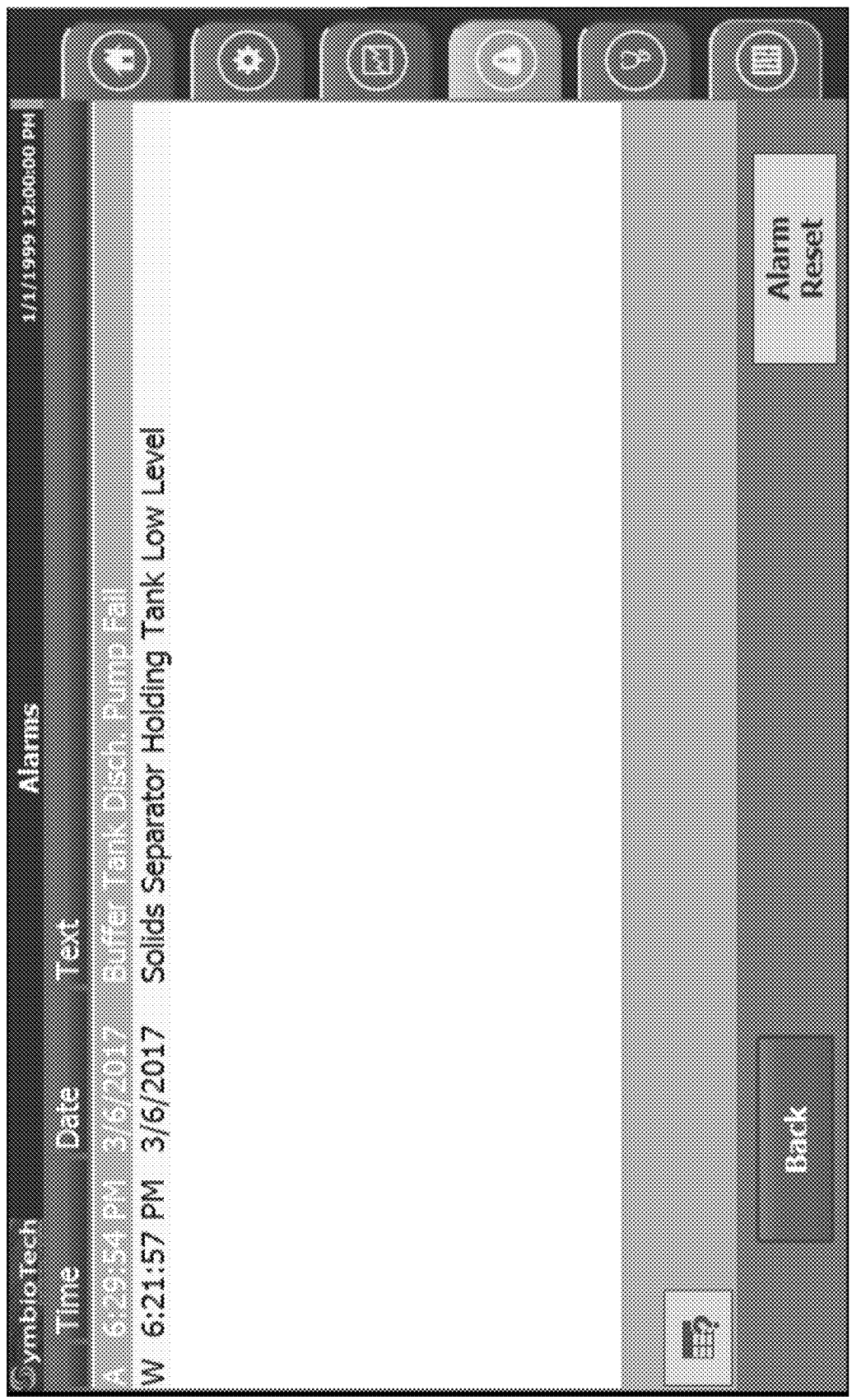
FIG. 18 shows the Alarms Screen in which systems in an alarm condition are identified.
Figure 19:
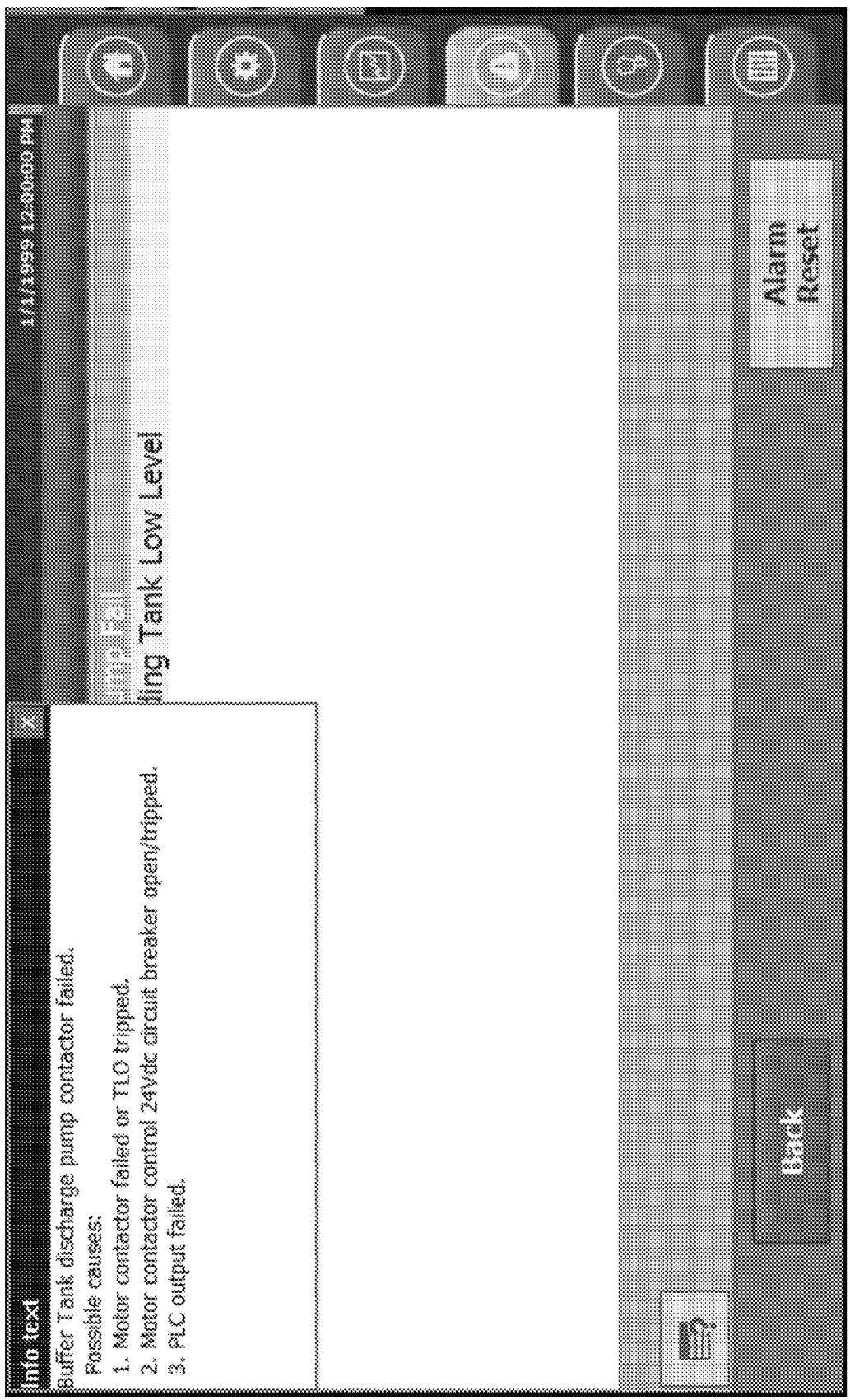
FIG. 19 shows the Tool Tip button on the Alarms Screen that provides access to detailed alarm condition information.

FIG. 17 shows the Process Trend Screen 270, which displays process data taken from the Flow Meter (Blue trend line) 272, Watt-Hour Meter (Red trend line) 274, and pH Meter of the pH Adjustment Tank (Green trend line) 276, and creates a graph of values over time. Time is displayed on the X axis of the graph 278, and values are displayed on the left and right Y axis 280, 282, respectively. On the left Y axis is the scale of Flow in Gallons per Minute (0 to 50 GPM). On the right, the Y axis indicates the scale of Power being consumed in Kilowatts (0 to 10 KW) and the scale of pH (0 to 10 pH). Portions of the time under study can be viewed by zooming in or out on the graph to display a minimum time duration of the most recent 15 minutes to a maximum time duration of the last 8 hours. This is a live trend and cannot be stopped or scrolled back or forward in time.

Still referring to FIG. 17, the table 284 at the bottom of the Process Tend Screen consists of four columns and three rows. Each row's text color corresponds to the trend color. The Trend column names each trend pen. The Tag connection column states where the data is coming from. The Value column displays the pen value at the cursor location. The Date/Time column displays the date and time of the cursor location. The default location of the cursor is in the center of the trend area. The operator can move the cursor by placing a finger on the cursor line on the touch screen and sliding the finger right or left. The cursor can also be moved touching the buttons on the right side. To hide the cursor, the operator selects the left hand cursor button with an arrow. The value displayed on the table is the current value of the tag.

FIGS. 18-21 show an Alarms screen 290. As indicated previously Alarms are indicated by a Red Alarm Navigation button 112*d* and Warnings are indicated by a flashing Yellow Alarm Navigation button. Alarms take precedence over Warnings, such that if an Alarm and Warning are both active, the Alarm navigation button is Red. When the red Alarm navigation button is selected, the button turns Orange to indicate that it is the current screen. Each Warning and Alarm event present will display the date and time the event happened and a short text description of the event. In this instance, the buffer tank discharge pump is in an alarm state, indicating a pump failure 292, and the solids separator holding tank is in a warning state, indicating a low level 294. At the bottom right of the Alarms screen is a Back button 296, the selection of which takes the operator back to the previous selected screen. Once the Alarms are addressed, they can be reset by pressing the Alarm Reset button 298.

In the lower left corner of the Alarms screen is a Tool Tip button 300, which is a help button on the Alarms screen and is used to obtain a more detailed explanation of the alarm conditions indicated. To use the Tool Tip function, an alarm or warning needs to be present. First selecting the alarm or warning and then selecting the Tool Tip button produces a popup 302 is displayed with possible causes of the alarm or warning.

Figure 20:
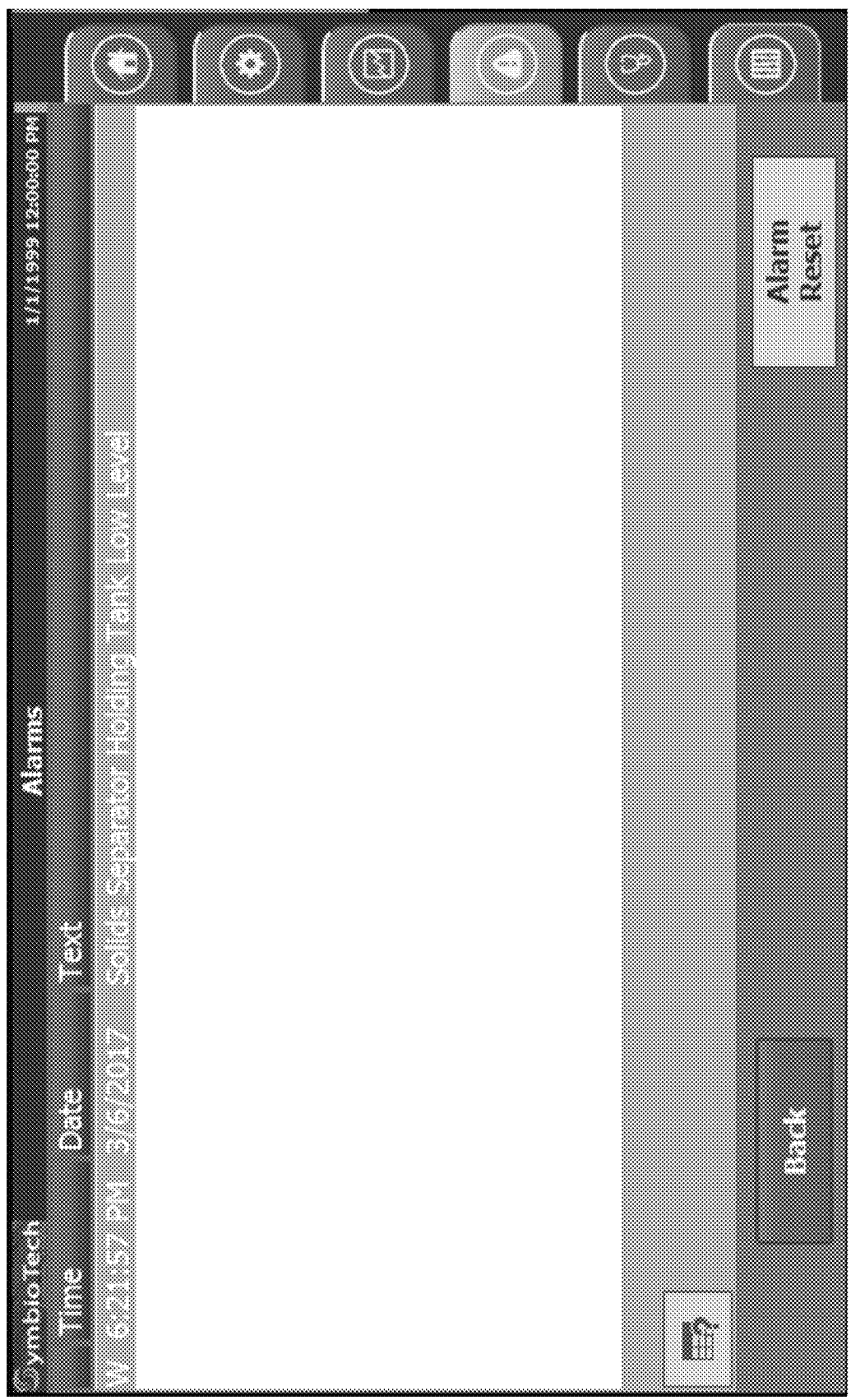
FIG. 20 shows how subsystem "warnings" are displayed.

Looking at FIG. 20, it is seen that warnings are displayed with the letter "W" 304 in the left hand column. Warnings do not need to be reset; they are self-clearing and are meant to be advisory. Warnings will not stop the Worm Farm Process.

Figure 21:
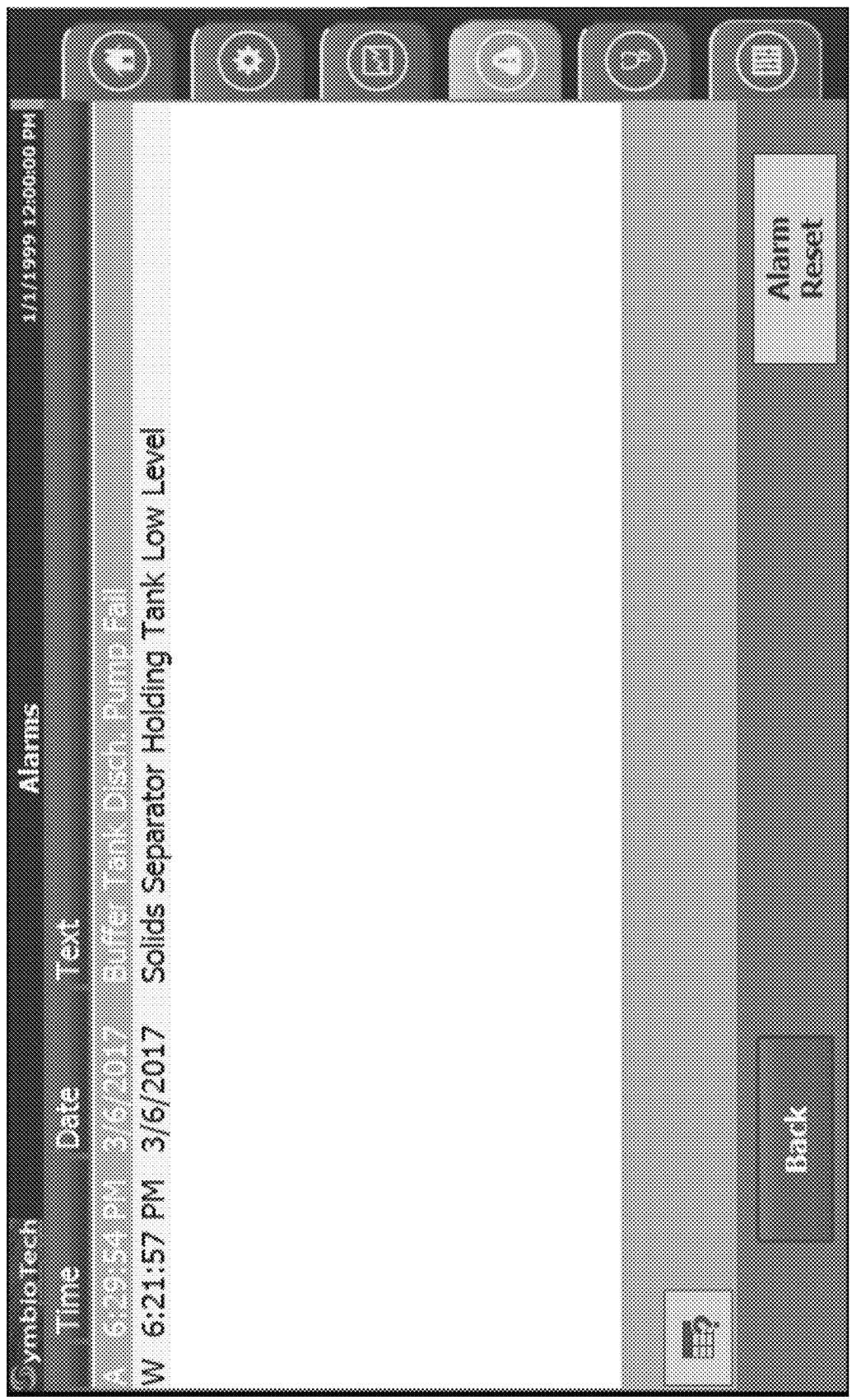
FIG. 21 show how subsystem alarms are displayed and provides an option for resetting the arm after the alarm condition is addressed or corrected.

Looking next at FIG. 21, Alarms are displayed with the letter "A" 306 in the left hand column. Active alarms cause portions of the Worm Farm Process to stop. If alarms are not corrected and cleared in a timely manner, additional alarms in other subsystems may occur. Because of the critical nature of an alarm, alarms must be reset after the alarm condition is corrected.

Figure 22:
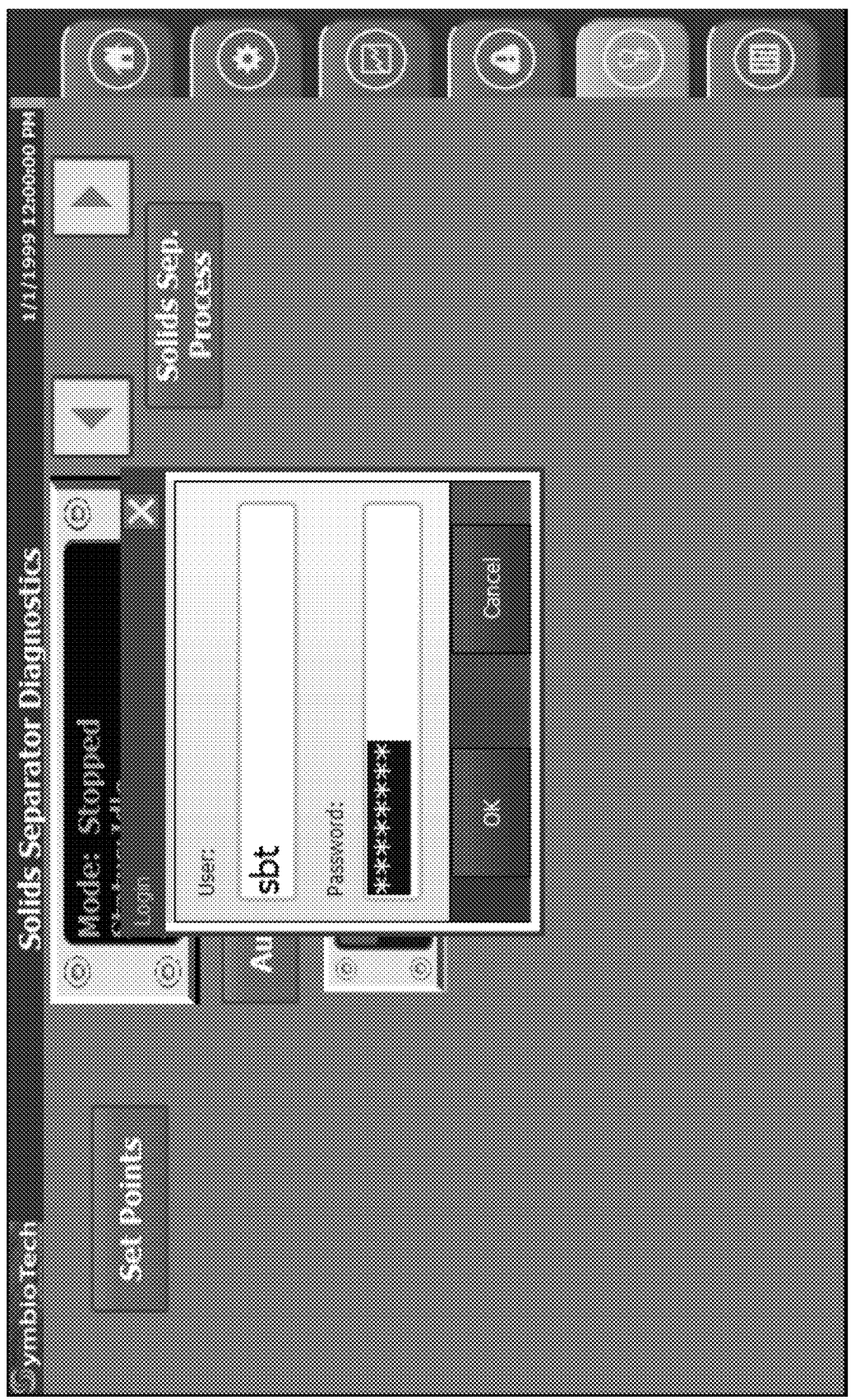
FIG. 22 shows password protection for access to advanced user Diagnostics Screens, which are displayed when the diagnostics button is selected among the navigation buttons and access is granted.

FIGS. 22-41 show general and particular system diagnostics screens. Diagnostics inputs are intended to be made by advanced users only. The controller permits operator access to some functions, such as manual operation of equipment and changing set points, only through use of log-in, calling for a user name and password. FIG. 22 shows a user name of "sbt" 310 and a concealed six character password 312. A keyboard is displayed on the touch screen for inputting the user name and password. Once logged in correctly, selecting the function again accesses the function. If a mistake was made during the log-in process, the operator is prompted again to log in. After 15 minutes of no activity on the touch screen, log out is automatic.

Figure 23:
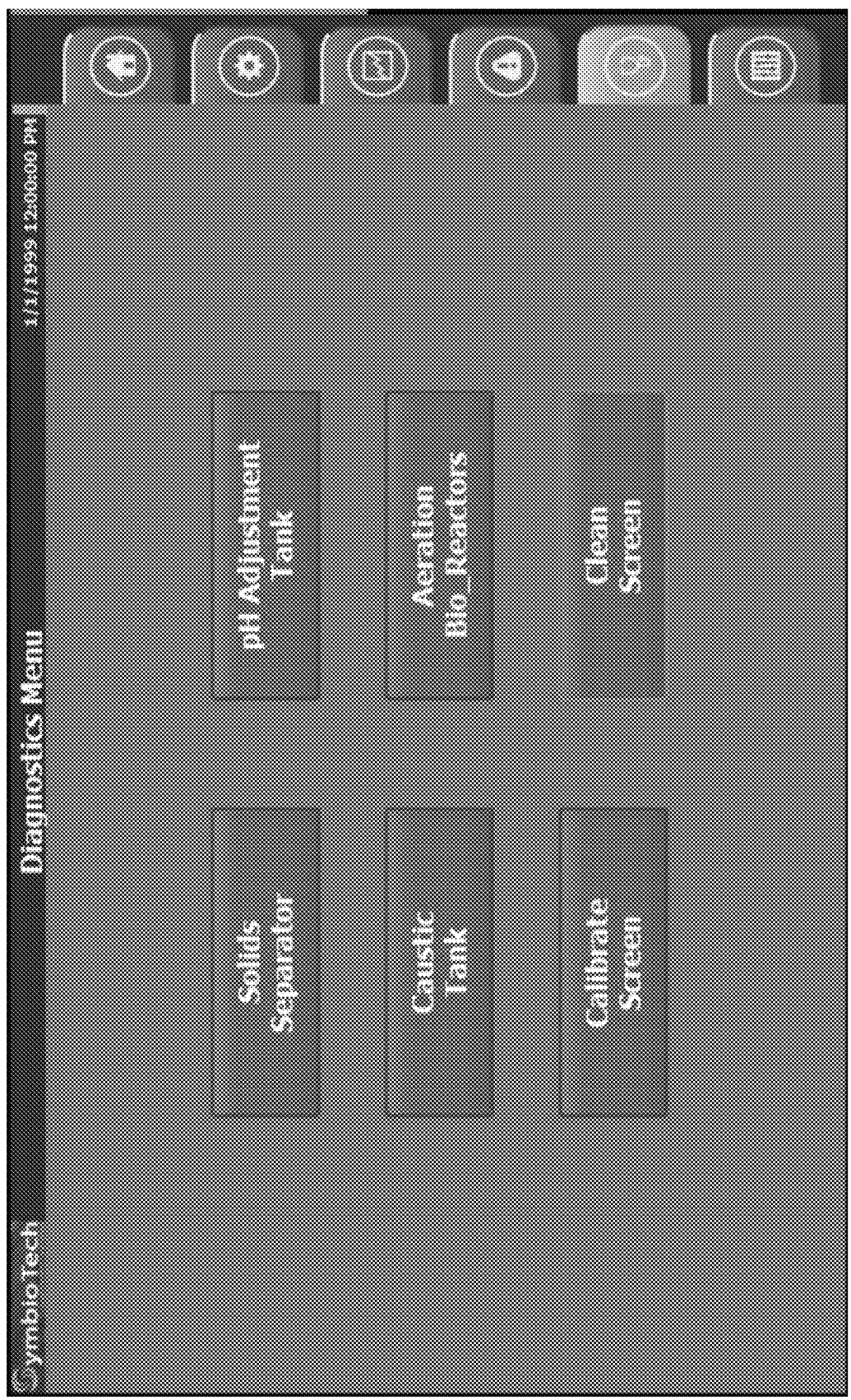
FIG. 23 shows the Diagnostics Screen menu.

FIG. 23 shows the Diagnostics Menu screen 320, which consists of six buttons, four comprising navigation buttons 322, 324, 326, 328, the selection of each of which leads the operator to detailed diagnostics for the sub-system selected; and two touch screen maintenance buttons 330, 332. Selecting the Calibrate Screen button 330 will start a subroutine to adjust the touch functions of the screen. On screen prompts are followed to carry out the calibration. Selecting the Clean Screen button 332 pauses the touch function of the screen for 30 seconds. This facilitates the removal of protective film on the screen, cleaning the screen, and replacing the protective film on the screen without activating any functions from the touch screen. During the pause time of the touch function, a time bar illustrates how much time remains in the pause before the touch screen functions return to normal operation.

Selecting one of the subsystem diagnostic navigation buttons 322, 324, 326, 328, will bring up the diagnostics screen for the selected subsystem. Looking at FIG. 24 as an example, when the Solids Separator navigation button is selected, the Solids Separator Diagnostics screen appears 340, and this screen includes elements shared in common with all other subsystem diagnostics screens. For instance, each subsystem diagnostic screen includes a Set Points button 342 on the upper left, a Status Display 344 in the upper center, and navigation buttons 346, 348 in the upper right of the screen. Below the Status Display are buttons 350, 352 to place the subsystem in Automatic or Manual Modes.

Figure 25:
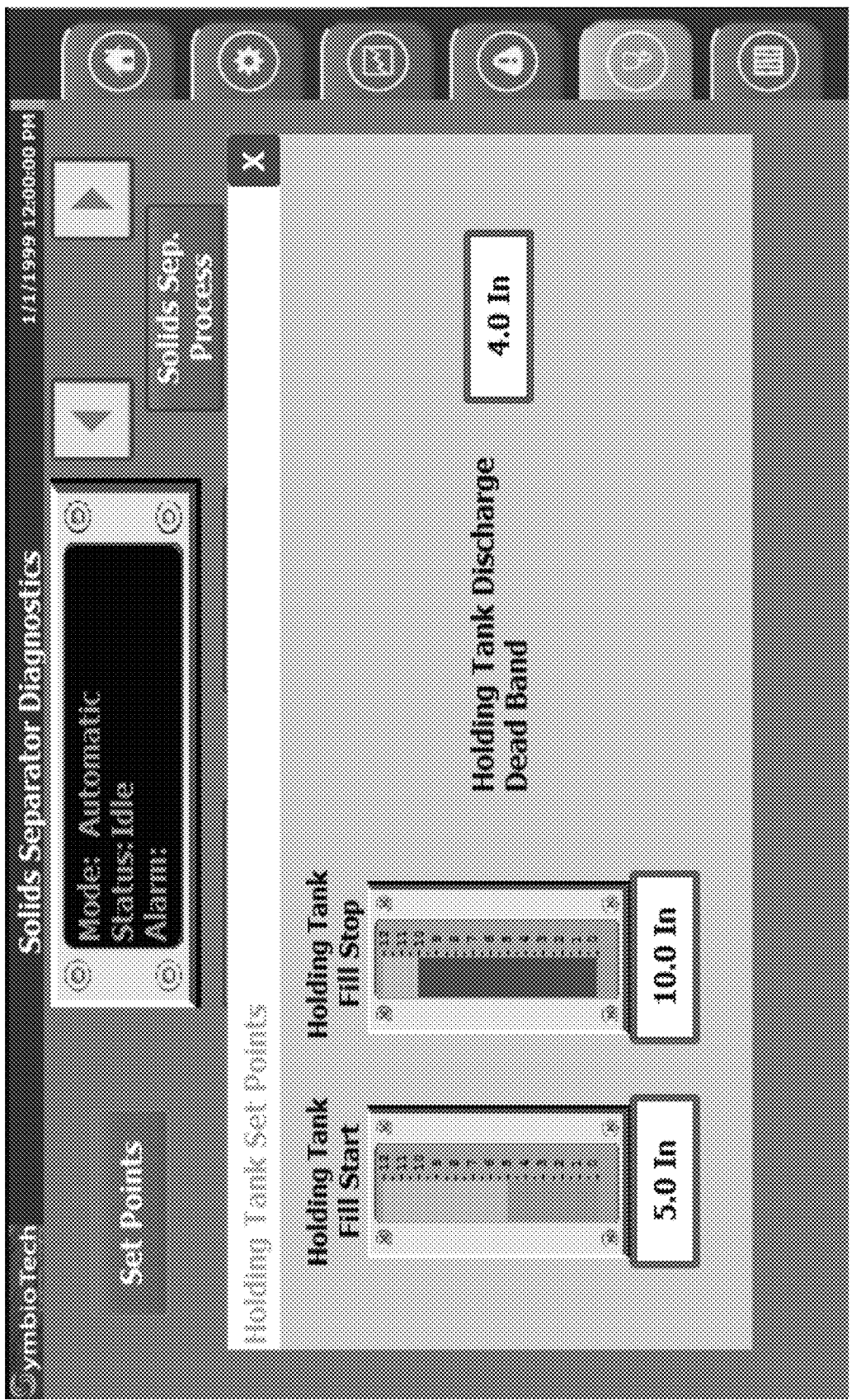
FIG. 25 shows the screen presented when "Set Points" button is selected on the Solids Separator Diagnostics screen.

Referring next to FIG. 25, selecting the Set Points button 342 opens a popup box 354, which is particular to the subsystem being actively monitored by the operator. Access to set points is protected by the user and password protected log-in function. The Status Display 344 and the Right and Left navigation buttons 346, 348 function identically on the subsystem Process screens. Below the Right and Left navigation buttons is a navigation button 356 that returns the operator to the subsystem Process screen. The Manual button 352 switches the subsystem to manual mode and is protected by the log in function. Selecting the Manual button and logging in allows additional elements to be displayed on the subsystem Diagnostics screen. The additional elements vary by subsystem.

Still referring to FIG. 25, while in Manual mode, the subsystem automatic features, such as maintaining tank level are suspended and the Status Display mode will change to "Manual" (not shown in this view). Any normally automatic features will need to be initiated manually from the subsystem Diagnostic screen. With few exceptions, Alarms and other safety features are not disabled in manual mode. The additional elements on the subsystem Diagnostics screens are the same regardless if the Worm Farm Process has been started or stopped. Once Manual mode is entered, all of the manual operation functions remain active until the subsystem is placed back into Automatic mode. No additional logins are necessary.

Figure 24:
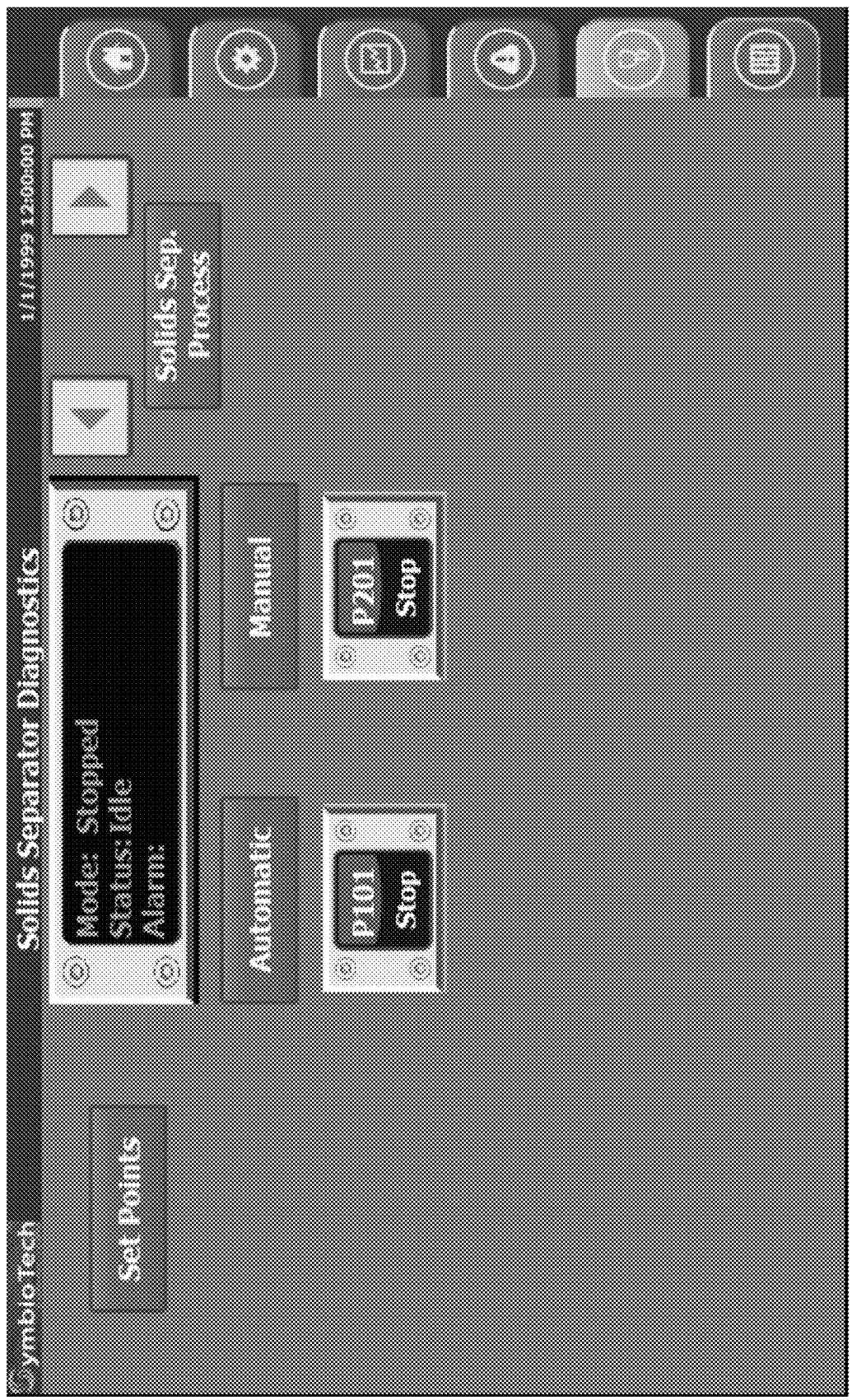
FIG. 24 shows options presented to the operator when a particular process subsystem is selected on the Diagnostics Screen menu, in this instance the Solids Separator Diagnostics.

Selecting the Automatic button 350 will return the subsystem back to automatic mode. Log in is not necessary to return to automatic mode. Automatic-Stopped mode will show the least amount of elements per subsystem Diagnostic screen. If the Worm Farm Process is started and is in automatic mode, additional control elements are displayed and will vary per subsystem. In FIG. 24, below, the Worm Farm Process is stopped and the Solids Separator is in automatic mode. However, FIG. 25 et seq. and corresponding narrative assume the Worm Farm Process is running.

The term "Holding Tank" refers to the bottom 12 inches of each of the Solids Separator Tanks. This portion of the tanks is used as collection and holding area for the water that has passed through the wood shaving medium of the tanks. Selecting the Set Points button 342 opens the popup 354 shown in FIG. 25. In most instances, the proper settings are selected and entered during the commissioning the Worm Farm and should not be changed thereafter, unless done so by knowable operators, as improper settings may result in equipment damage.

Again referring to FIG. 25, the liquid level indicator labeled Holding Tank Fill Start 358 displays the tank level at which the Buffer Tank Discharge Pump is called to spray water on the wood shavings in the Solids Separator Tanks, and it includes both an analog read out 358*a* and a numerical display for the level indication 358b. The liquid level indicator labeled Holding Tanks Fill Stop 360 displays the level of the tank at which the Buffer Tank Discharge Pump is stopped, and it too includes an analog portion 360a, and a liquid level numerical display 360b.

The Holding Tank Discharge Dead Band setting 362 is the minimum level the tank must contain before the Solids Separator Holding Tank Discharge Pump can be called to run. When the Solids Separator Holding Tank Discharge Pump is called to run and the level in the holding tank is above the dead band setting, the holding tank discharge pump runs until the pH Adjustment Tank is at its fill stop set point or until the Solids Separator Holding Tank level is drained to the Low Level Warning set point. If the Solids Separator Holding Tank is drained to the Low Level Warning set point, the filling of the pH Adjustment Tank is paused until the holding tank level is above the dead band set point. This minimizes the starts/stops on the Solids Separator Holding Tank Discharge pump during commissioning and after maintenance.

Figure 26:
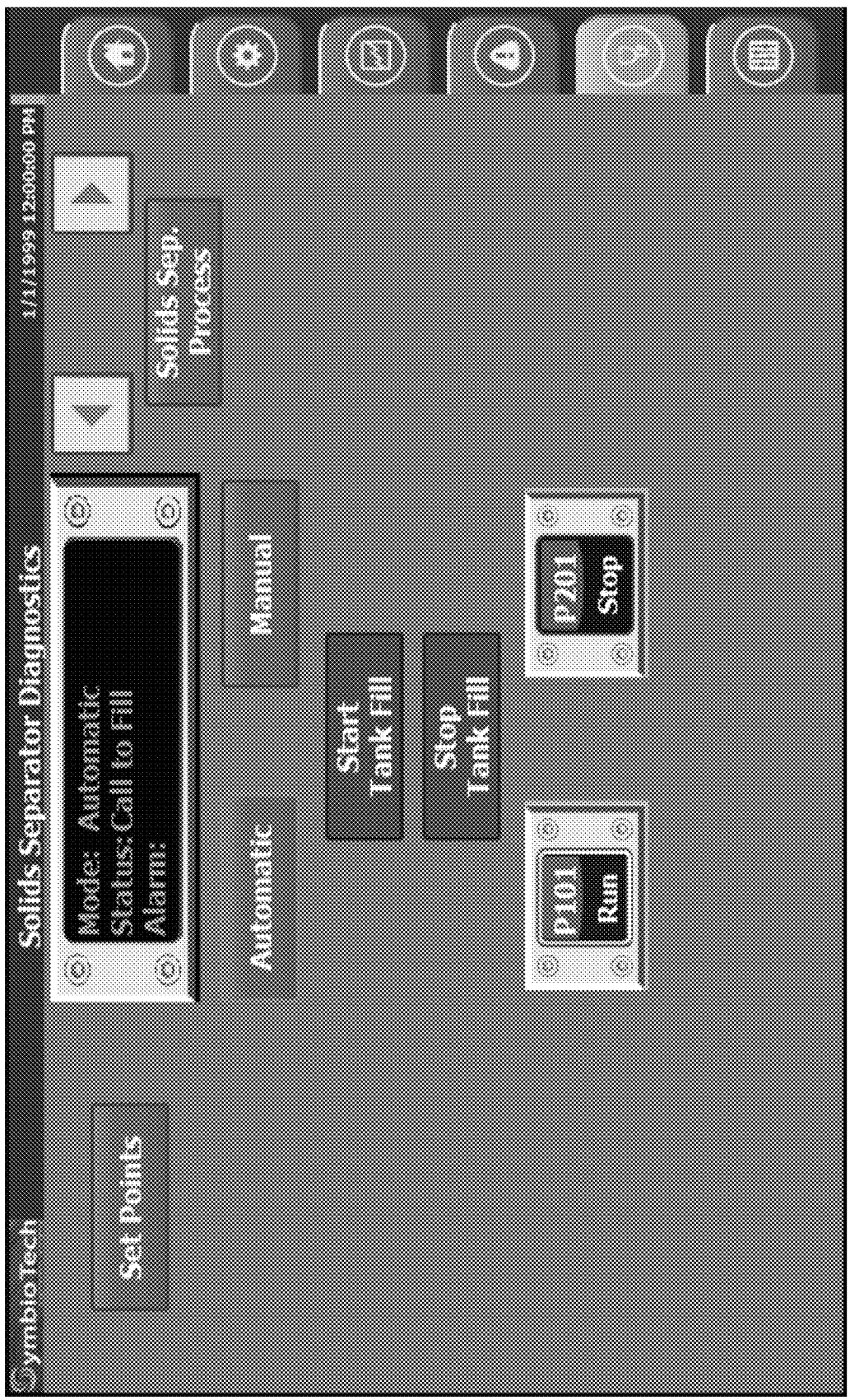
FIG. 26 shows the status of the first two pumps in the Worm Farms Process on the Solids Separator Diagnostics screen, as shown when the system is in automatic mode.

Turning next to FIG. 26, the Holding Tank Set Points popup is removed to again show the full Solids Separator diagnostics screen 340. The indicating lamps 370, 372 show the status of the first two pumps in the Worm Farm Process. P101 is the Buffer Tank Discharge Pump and P201 is the Solids Separator Holding Tank Discharge Pump. The pump status lamps show the state of the motor contactors. A dark stop lamp indicates that the motor contactor is de-energized. A bright run lamp indicates that the motor contactor is energized. The contactor status showing FIG. 26 indicates that the Solids Separator Holding Tank is filling and will continue to fill until the Holding Tank Fill Stop level set point is met.

Two Start/Stop buttons 374, 376 are also shown. Selecting the red Stop Tank Fill button 376 stops pump P201 if the holding tank level is above the fill start set point. If the operator wishes to top off the holding tank, this is achieved by selecting the Start Tank Fill button 372, and pump P201 is then called to run until the holding tank fill stop level set point is reached.

Figure 27:
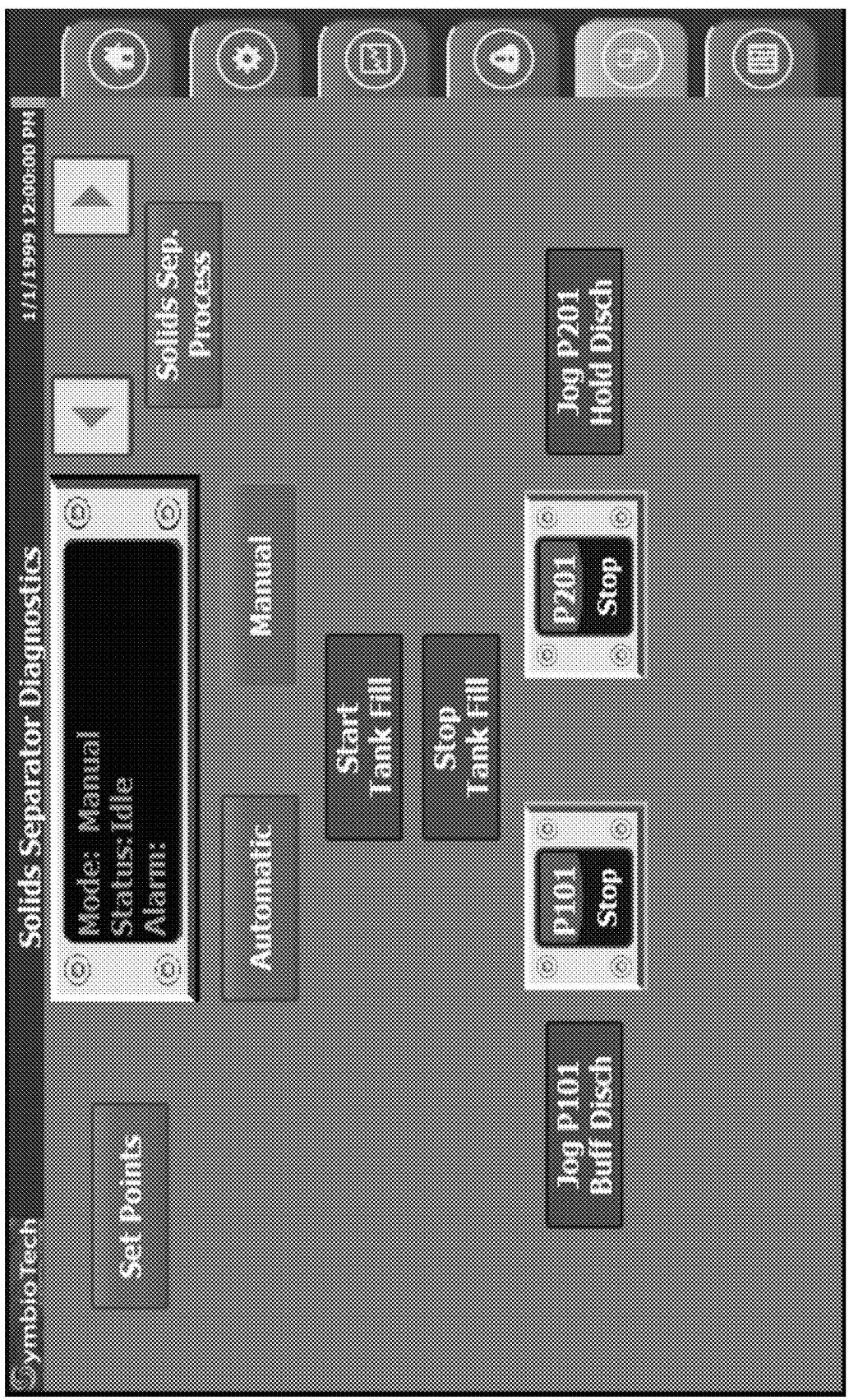
FIG. 27 shows the status of the first two pumps in the Worm Farms Process on the Solids Separator Diagnostics screen, as shown when the system is in manual mode.

In Manual mode, shown in FIG. 27, start tank fill and stop tank fill set points are ignored. The holding tank fills only when the Start Tank Fill Button 374 is pressed. The holding tank will fill until the fill stop level set point is met or the Stop Tank Fill button 376 is pressed. Two additional buttons are visible in this mode: Jog P101 Buff Disch 378 and Jog P201 Hold Disch 380. Each of these two new buttons will call a popup to manually run the pumps.

Figure 28:
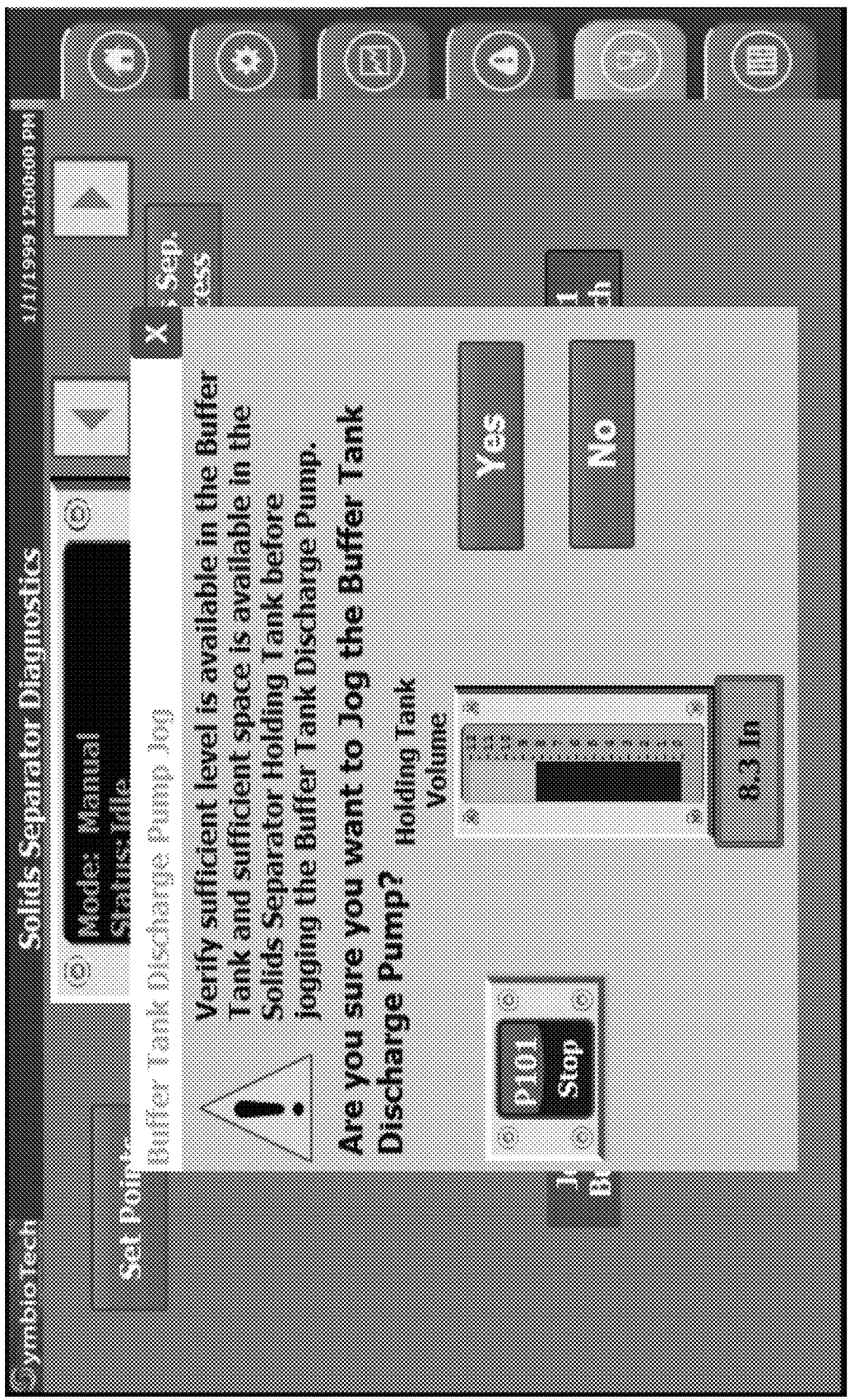
FIG. 28 shows a pop up called when the Jog P101 button of FIG. 27 is selected by the operator.

Selecting the Jog P101 Buff Disch button 378 calls the popup 400 shown in FIG. 28. The P101 lamp operates identically as on the diagnostics screen (see FIG. 24). The Yes button 402 is a momentary action button, specifically relating to the prompt displayed and is a call to run the Buffer Tank Discharge Pump. The call to run condition will remain active only as long as the Yes button is pressed. The Buffer Tank Discharge Pump is a sump pump with an integrated low level stop float. If the level in the Buffer Tank is too low, the Buffer Tank Discharge Pump may not run, even if the P101 lamp is on and indicates "Run". Selecting the No button 404 will close the popup 400.

Figure 29:
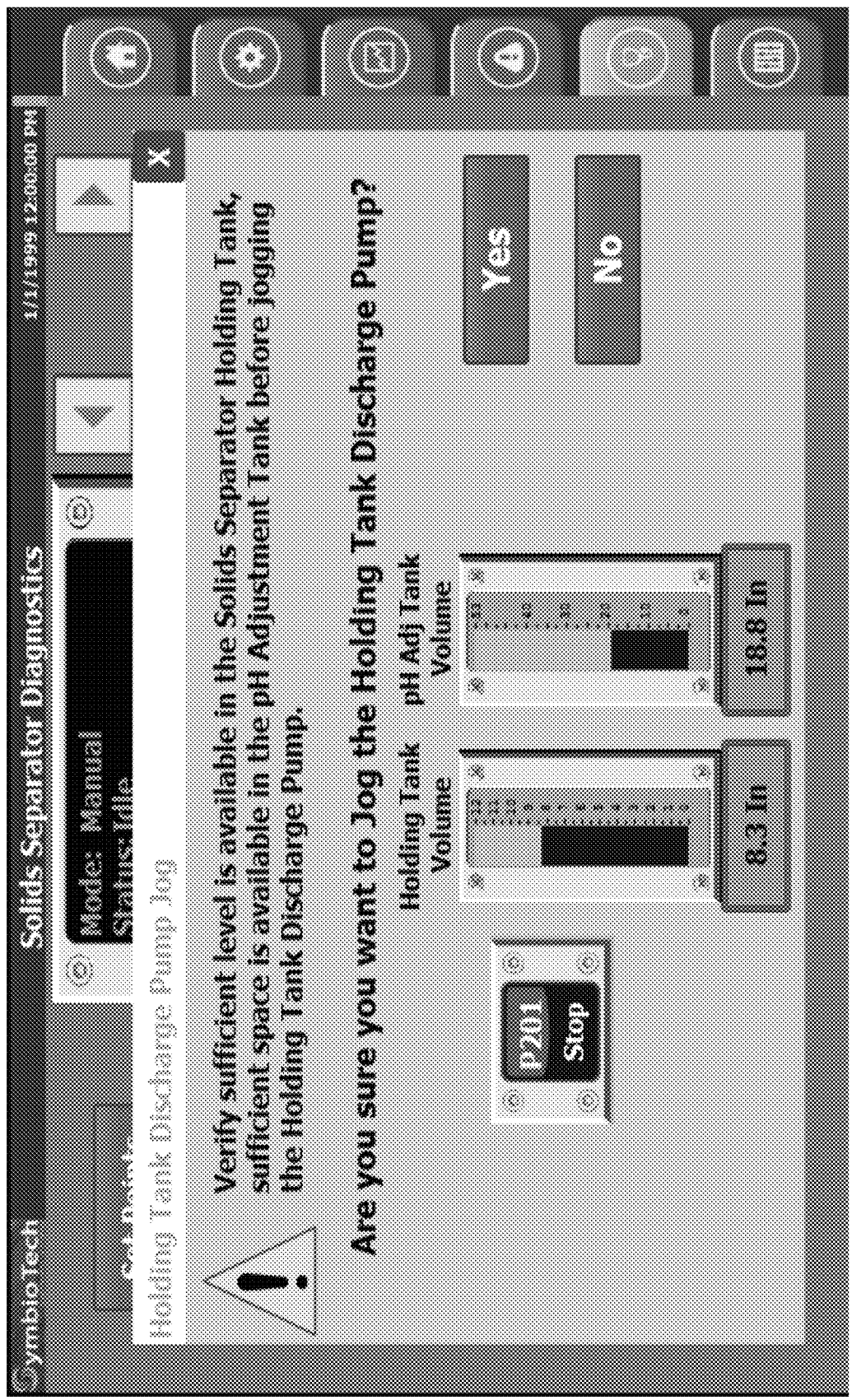
FIG. 29 shows a pop up called when the operator taps YES to show pH Adj Tank Volume.
Figure 30:
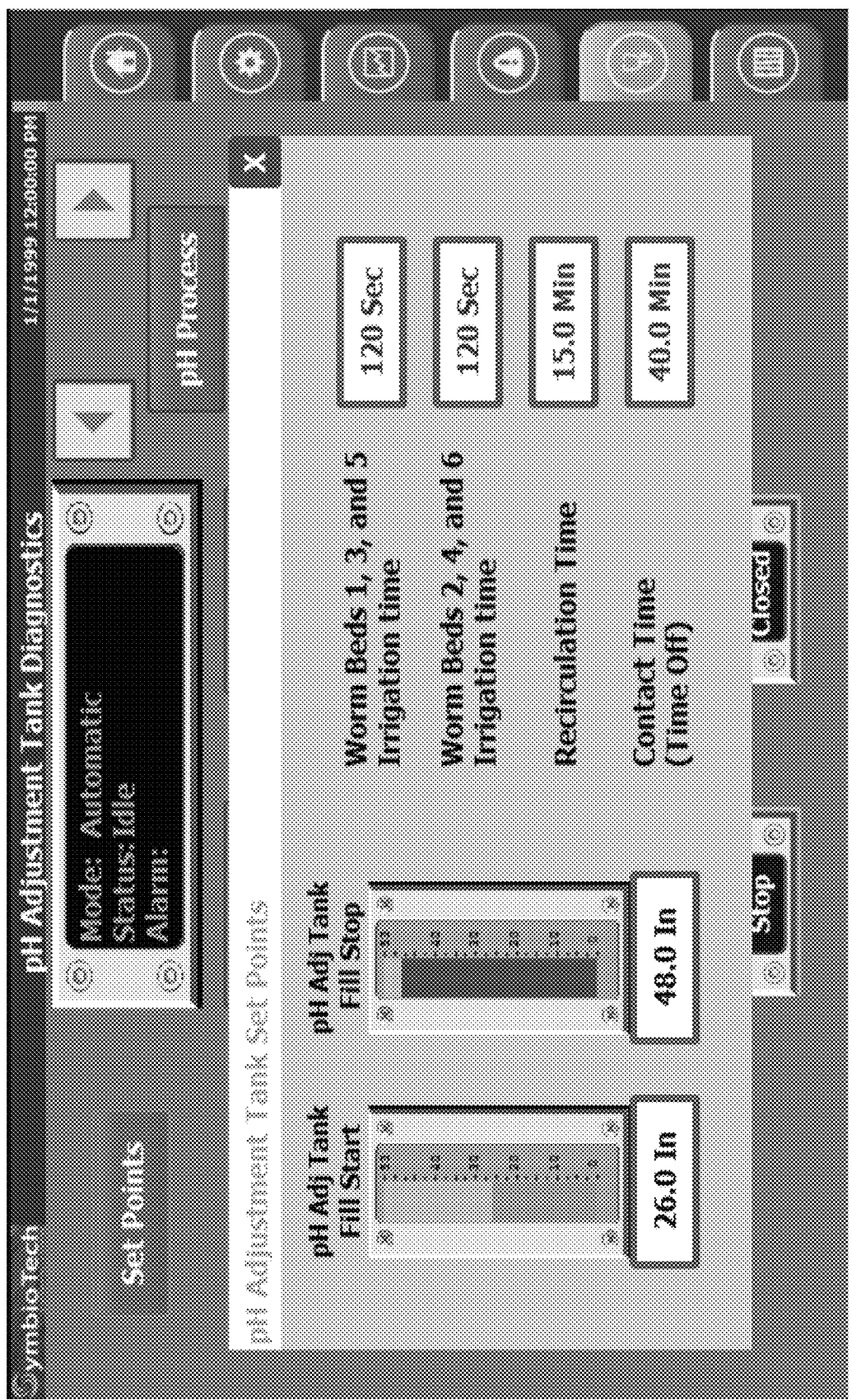
FIG. 30 shows the HMI displaying the pH Adjustment Tank Diagnostics set points.

Selecting the P201 button 372 (FIGS. 24-25) calls the popup 410 shown in FIG. 29. Operation of the Solids Separator Holding Tank Discharge pump is the same as the Buffer Tank Discharge Pump. Pressing the Yes button 412 will call the holding tank discharge pump to run regardless of tank levels and active Alarms or Warnings. Releasing the Yes button will terminate the call to run. The P201 lamp 416 monitors the condition of the holding tank discharge pump motor contactor. Selecting the No button 414 will close the popup.

Referring next to FIGS. 30-33, there are shown a series of pH Adjustment Tank Diagnostics screens 420. The pH Adj Tank Fill Start button 422 and pH Adj Tank Fill Stop button 424 function in the same way as the Solids Separator Holding Tank fill start and fill stop functions. However, in this instance there is no need for a dead band because a smaller quantity of water is used at any one time for the Worm Bed irrigation.

In addition the fill start and fill stop set points, there are four timers for the Worm Bed, two for the irrigation time 426, 428, and one each for the recirculation time 430, and the contact time 432. Depending on the size of the pH Adjustment Tank Discharge pump, either half or all of the Worm Beds may be irrigated at a time. After the irrigation sequence, water is recirculated to keep the pH Adjustment tank contents from becoming anaerobic, and the recirculation time is displayed in timer display 430. The last timer 432 is the contact time the pH Adjustment Tank Discharge pump is off. The total time of the four timers together results in the total cycle time of the discharge of the pH Adjustment Tank.

Whenever the measured pH is out of permissible ranges, or if caustic is being added and mixed, the Worm Bed irrigation is paused. The recirculation and contact timers continue normally.

Figure 31:
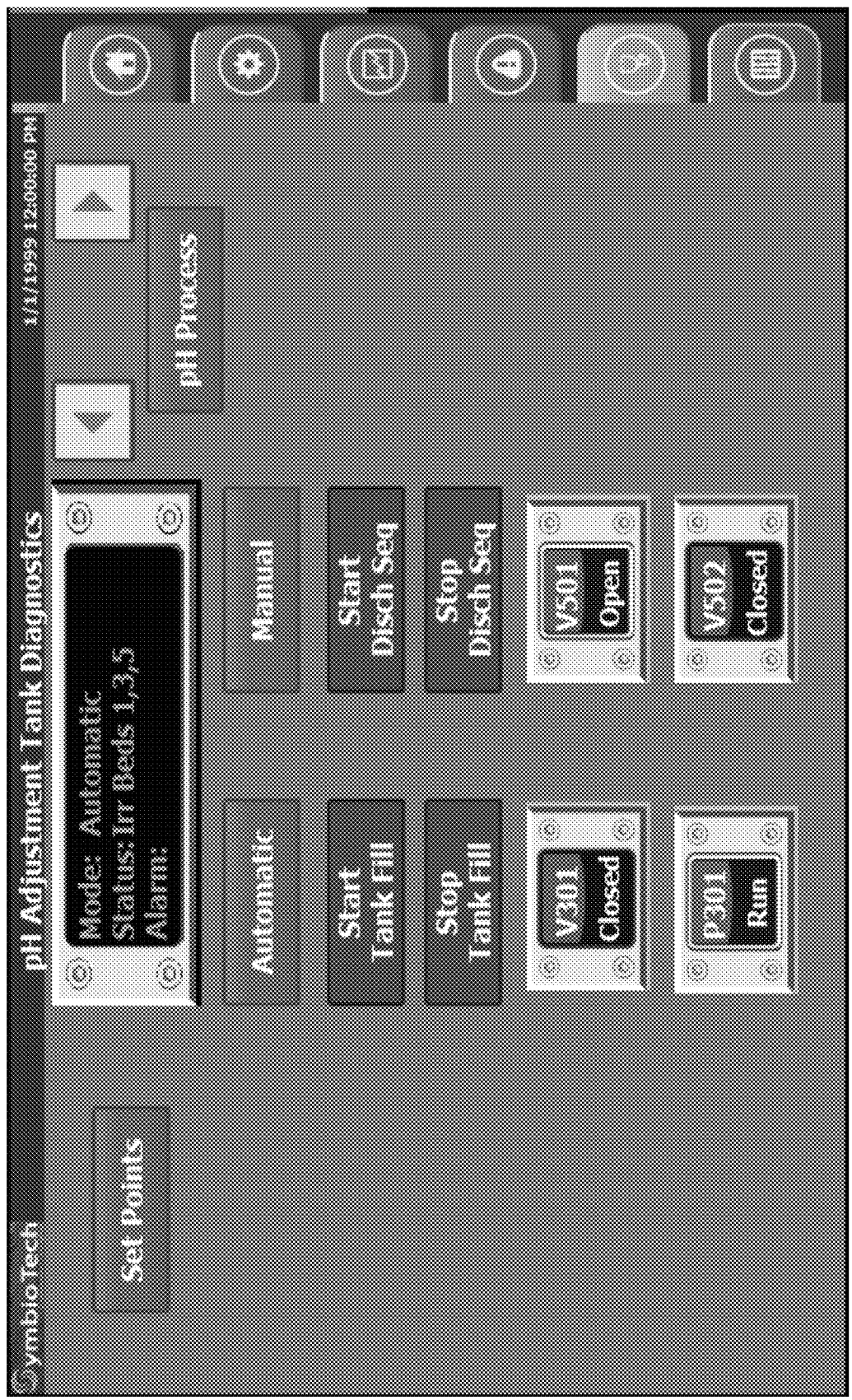
FIG. 31 shows the indicating lamps and options available on the pH Adjustment Tank Diagnostics menu when the system is operating in automatic mode.

Turning next to FIG. 31, when the Worm Farm Process is started and the pH Adjustment Tank controls are in Automatic, four buttons are visible on the pH Adjustment Tank Diagnostics screen 420. These include the pH Adjustment Start Tank Fill button 422 and the Stop Tank Fill button 424, to initiate or stop tank filling. In addition a pH Adjustment Tank Start Discharge Seq[ence] 426 (aka Worm Bed irrigation) button and Stop Disch Seq button 428 are used to initiate or terminate Worm Bed irrigation from the pH Adjustment Tank.

There are four indicating lamps on the pH Adjustment Tank Diagnostics screen, including: indicating lamp P301 434, which is for the pH Adjustment Tank Discharge Pump and indicates the condition of the discharge pump motor contactor. The remaining three lamps indicate if any of the three valves for the pH Adjustment Tank Discharge Pump are being called to open. V301 436 is the recirculation valve. V501 438 is the Left Worm Beds (Worm Bed 1, 3, and 5) irrigation valve. V502 440 is the Right Worm Beds (Worm Bed 2, 4, and 6) irrigation valve. The indication in FIG. 31 shows that the Left Worm Beds are being irrigated.

Figure 32:
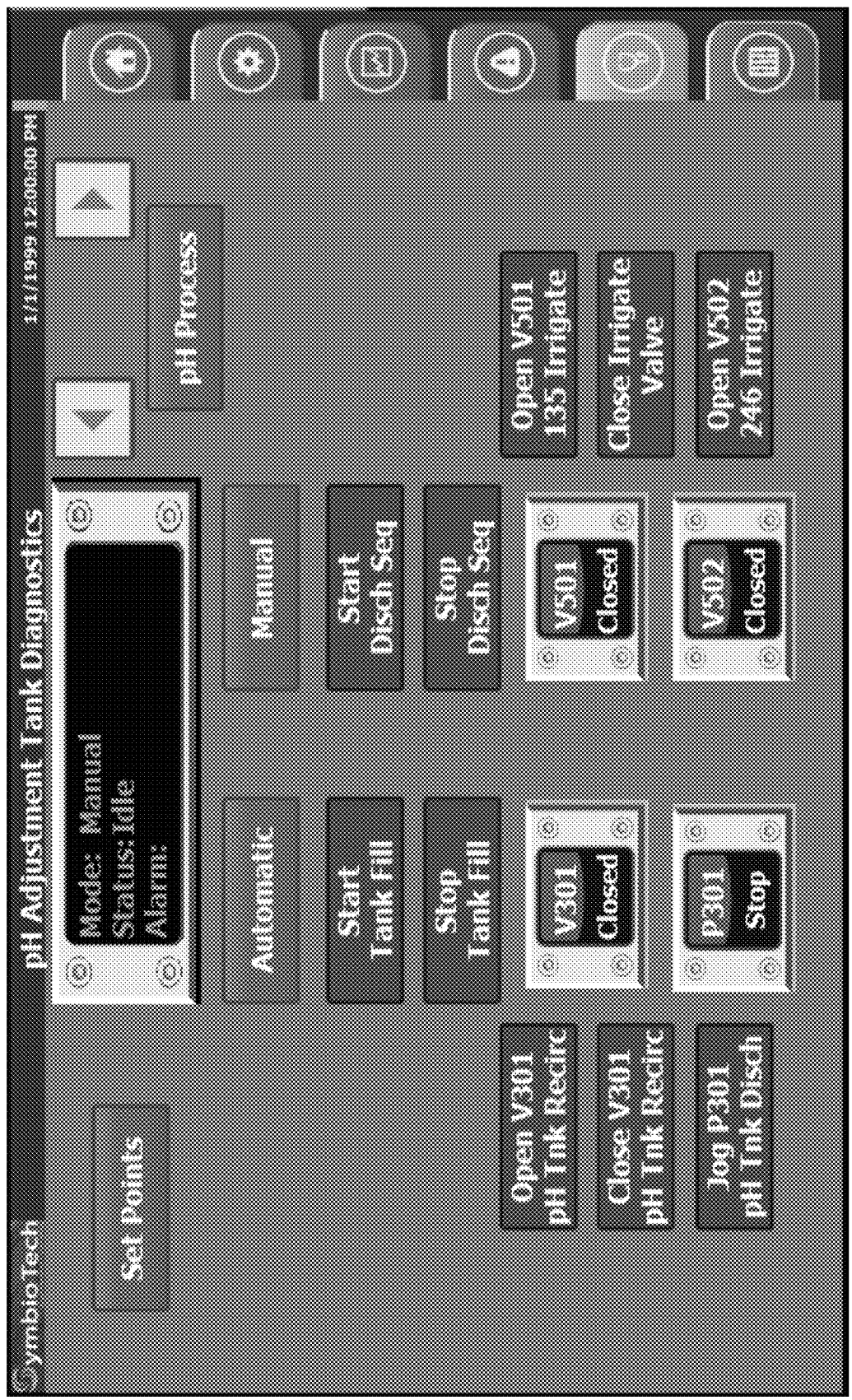
FIG. 32 is the same view showing the display when the system is in manual mode.

In Manual mode, FIG. 32, the fill start and fill stop set points are ignored. The pH Adjustment Tank will fill only when the Start Tank Fill Button 422 is pressed. The tank will fill until the fill stop level set point is met or the Stop Tank Fill button 424 is pressed. Six additional buttons are visible in manual mode: Open V301 pH Tnk Recirc 450, Close V301 pH Tank Recirc 452, Jog P301 pH Tnk Disch 454, Open V501 135 Irrigate 456, Close Irrigate Valve 458, and Open V502 246 Irrigate 460.

Selecting Open V301 pH Tnk Recirc 450 latches V301 pH Adjustment Recirculation Valve open. The V301 indicating lamp 436 changes states to show that logic has been initiated to open the valve.

Selecting Close V301 pH Tnk Recirc 452 unlatches V301 pH Adjustment Recirculation Valve.

Selecting Jog P301 pH Tnk Disch 454 opens the pH Adjustment Tank Discharge Pump Jog popup.

Selecting Open V501 135 Irrigate 456 latches V501 Left Worm Bed Irrigation Valve open. The V501 indicating lamp 438 will change states to show that logic has been initiated to open the valve. Only one irrigation valve may be open at a time. As V501 is latched open, V502 will unlatch and close if it was previously latched open.

Selecting Open V502 246 Irrigate 460 latches V502 Right Worm Bed Irrigation Valve open. The V502 indicating lamp 440 will change states to show that logic has been initiated to open the valve. Only one irrigation valve may be open at a time. As V502 is latched open, V501 will unlatch and close if it was previously latched open.

Selecting Close Irrigate Valve 458 unlatches the open Worm Bed irrigation valve.

Returning to Automatic mode unlatches any latched open valves. Valves will then be opened and closed automatically as necessary.

Figure 33:
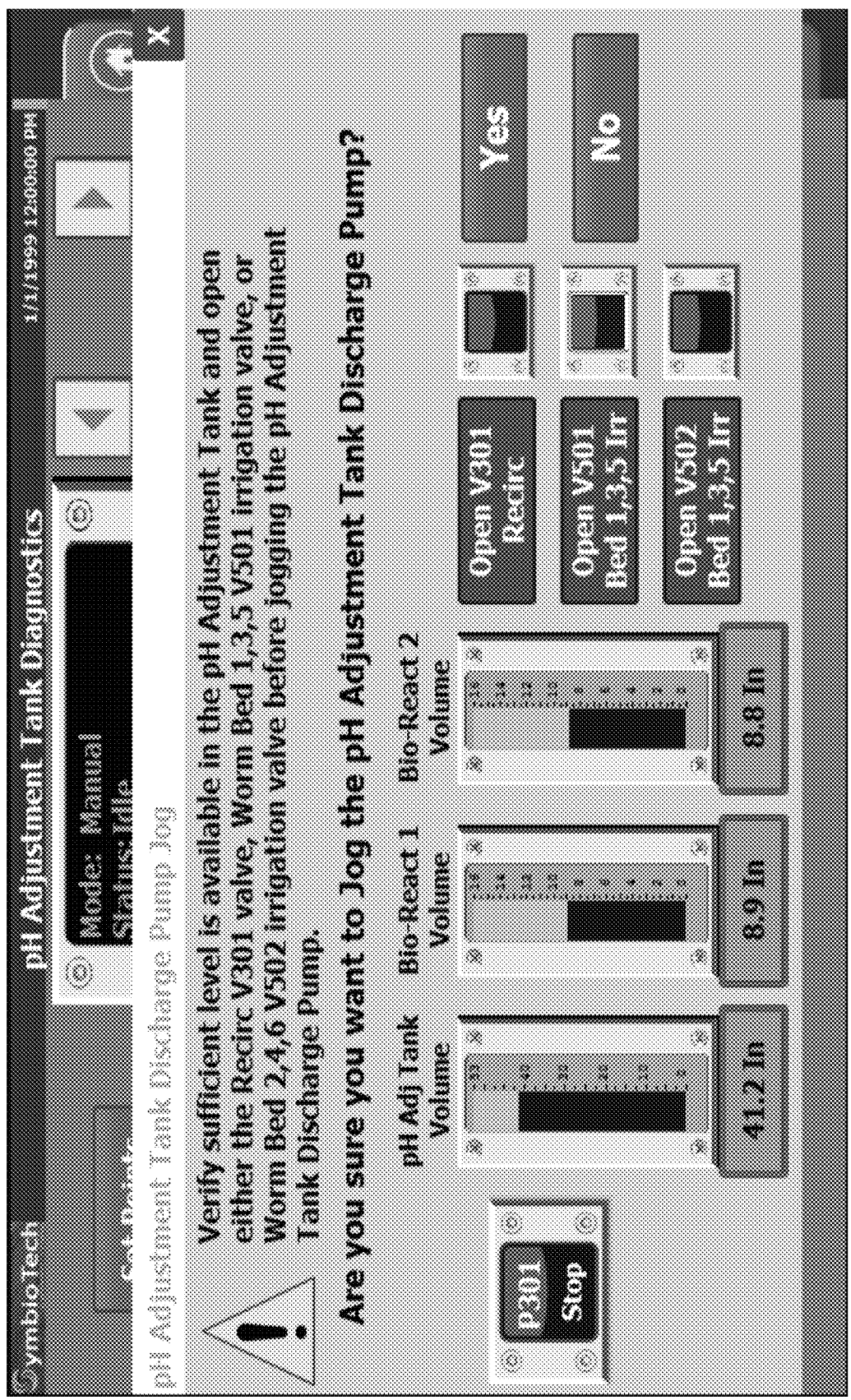
FIG. 33 shows the screen presented for operation of the pH adjustment tank discharge pump.
Figure 34:
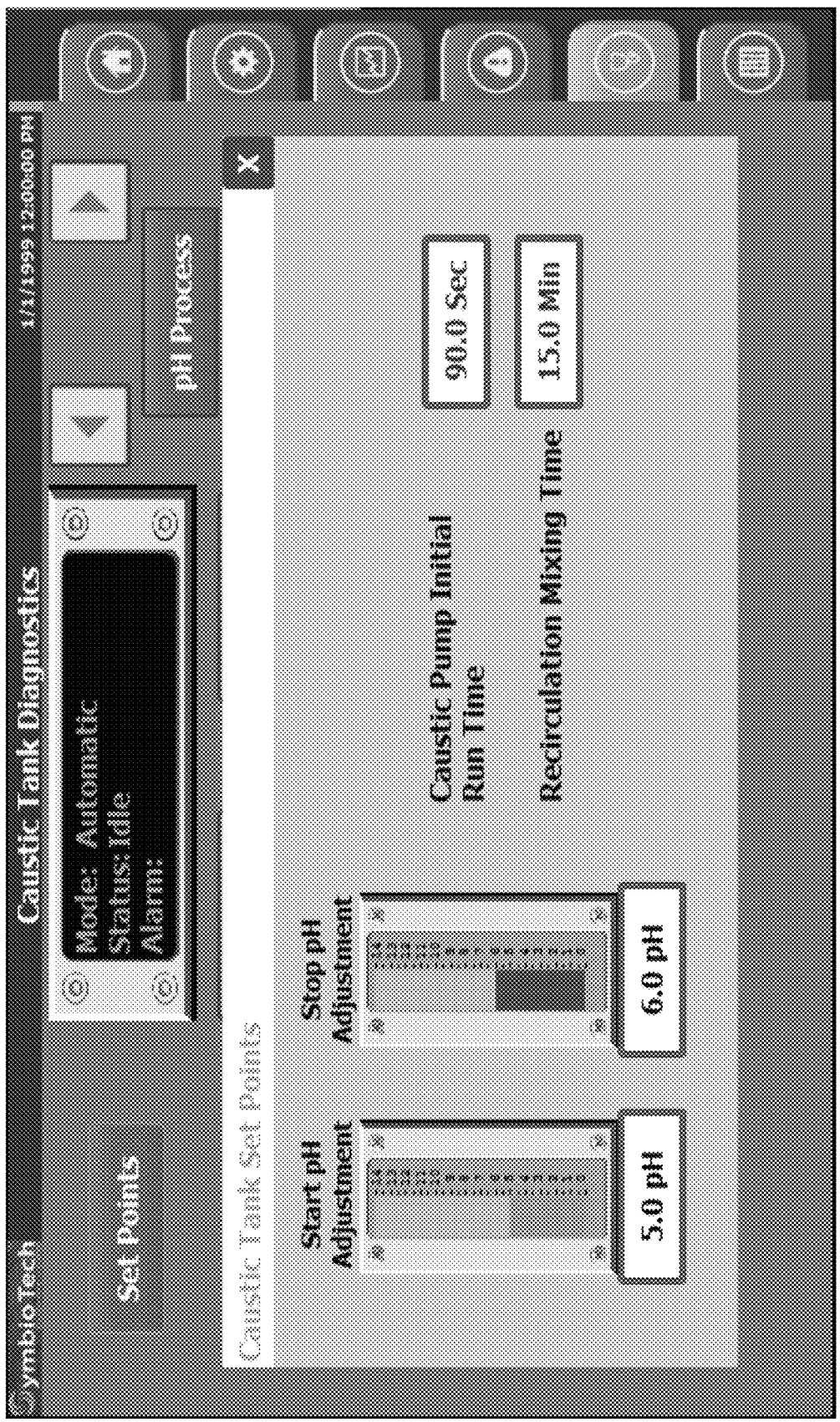
FIG. 34 shows the display when the Caustic Tank Set Points popup is called by the operator.

FIG. 33 shows a Jog P301 Popup 470. Operation of the pH Adjustment Tank Discharge Pump is done in the manner as operating the other discharge pumps. That is, pressing the Yes button 472 will call the pH Adjustment Tank Discharge Pump to run regardless of tank levels, dead head operation, and active Alarms or Warnings. The operator must ensure that one of V301, V501, or V502 are opened before pressing the Yes button 472. Only one valve can be opened at a time. Selecting another valve to open will unlatch and close the previous valve that was latched open. Releasing the Yes button will terminate the call to run. The popup P301 lamp 476 monitors the condition of the holding tank discharge pump motor contactor. Selecting the No button 474 will close the popup. When the popup closes, the latched open valve will unlatch and close. FIG. 33 shows V501 is shown in the latched open condition.

Turning now to FIGS. 34-37, there are shown a set of Caustic Tank Diagnostics screens 480. Similar to the fill start and fill stop set points of the other tanks, the Caustic Tank Set Points popup 482 has Start pH Adjustment and Stop pH Adjustment set points 484, 486, respectively. The measured pH in the pH Adjustment Tank must fall below the Start pH Adjustment set point before caustic will be added to the pH Adjustment Tank. The Stop pH Adjustment set point is the minimum value the measured pH must be after the recirculation timer has expired.

In addition there are two timer set points, including a Caustic Pump Initial Run Time 490. The Caustic Pump will run for a time after the measured pH falls below the Start pH Adjustment set point. When the Caustic Pump is called to run, the pH Adjustment Tank call to recirculate is initiated. The second timer set point is the Recirculation Mixing Time 490, which indicates the time the pH Adjustment Tank Discharge Pump will continue to be recirculated after the caustic pump has stopped. At the end of the Recirculation Mixing Time, the measured pH is reevaluated. At that point, the measured pH needs to be a minimum of the Stop pH Adjustment set point value, and at that time the pH Adjustment cycle is complete. If the measured pH is below the Stop pH Adjustment set point value, then a new Caustic Pump Run Time is calculated and the pH Adjustment cycle repeats.

Figure 35:
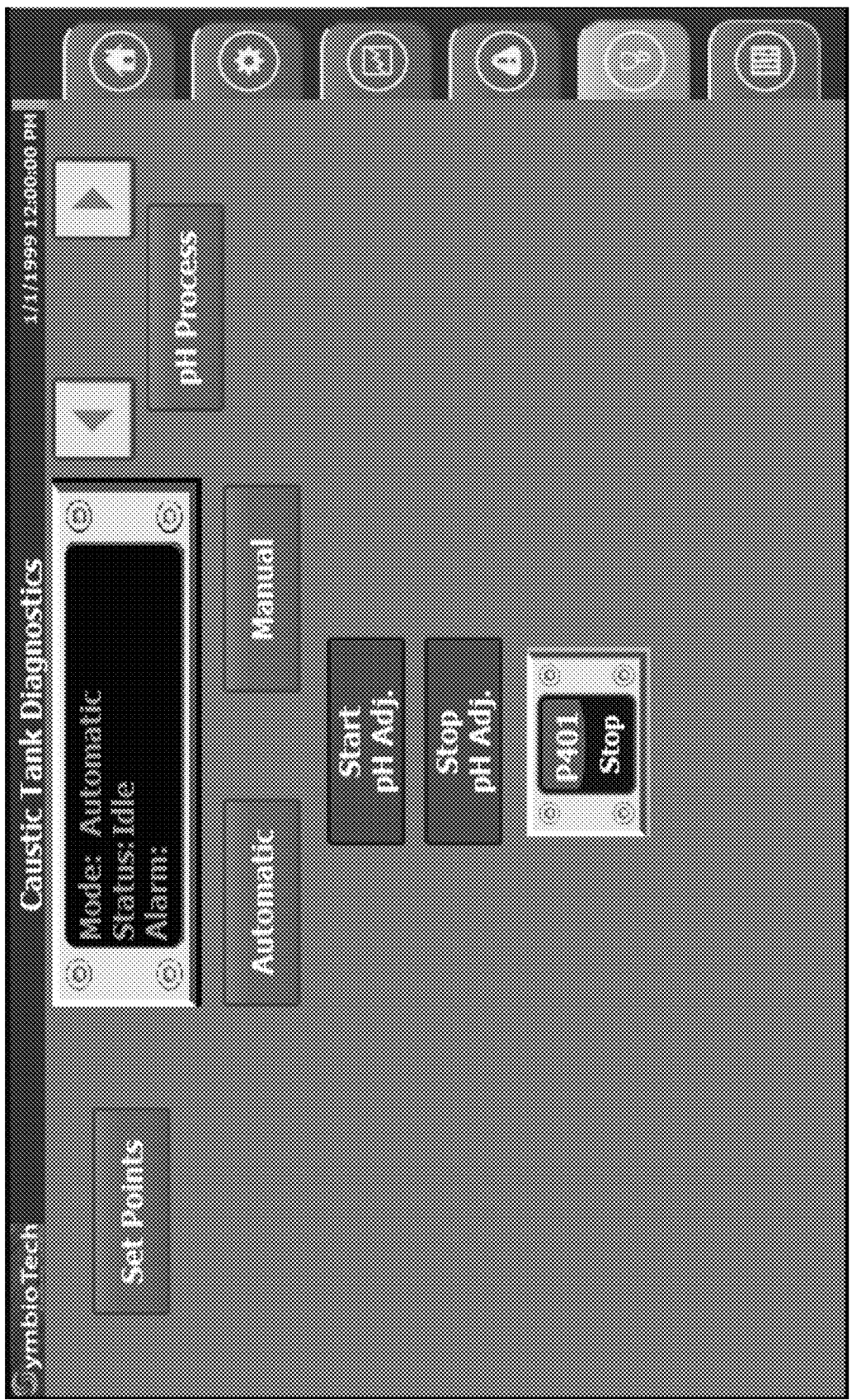
FIG. 35 shows the Caustic Tank Diagnostics screen when the Worm Farm Process is in automatic mode.

When the Worm Farm Process is started and the Caustic Tank is in Automatic mode, FIG. 35, two buttons become visible. Similarly to the tank fill start and stop buttons on the other subsystem diagnostic, selecting the Start pH Adj. button 492 starts the caustic addition cycle if the measured pH is below the Stop pH Adjustment set point. Selecting the Stop pH Adj. button 494 stops the caustic addition cycle, if already started.

There is no feedback from the caustic pump motor contactor. The P401 lamp 496 indicates that a caustic pump call to run has been initiated.

Figure 36:
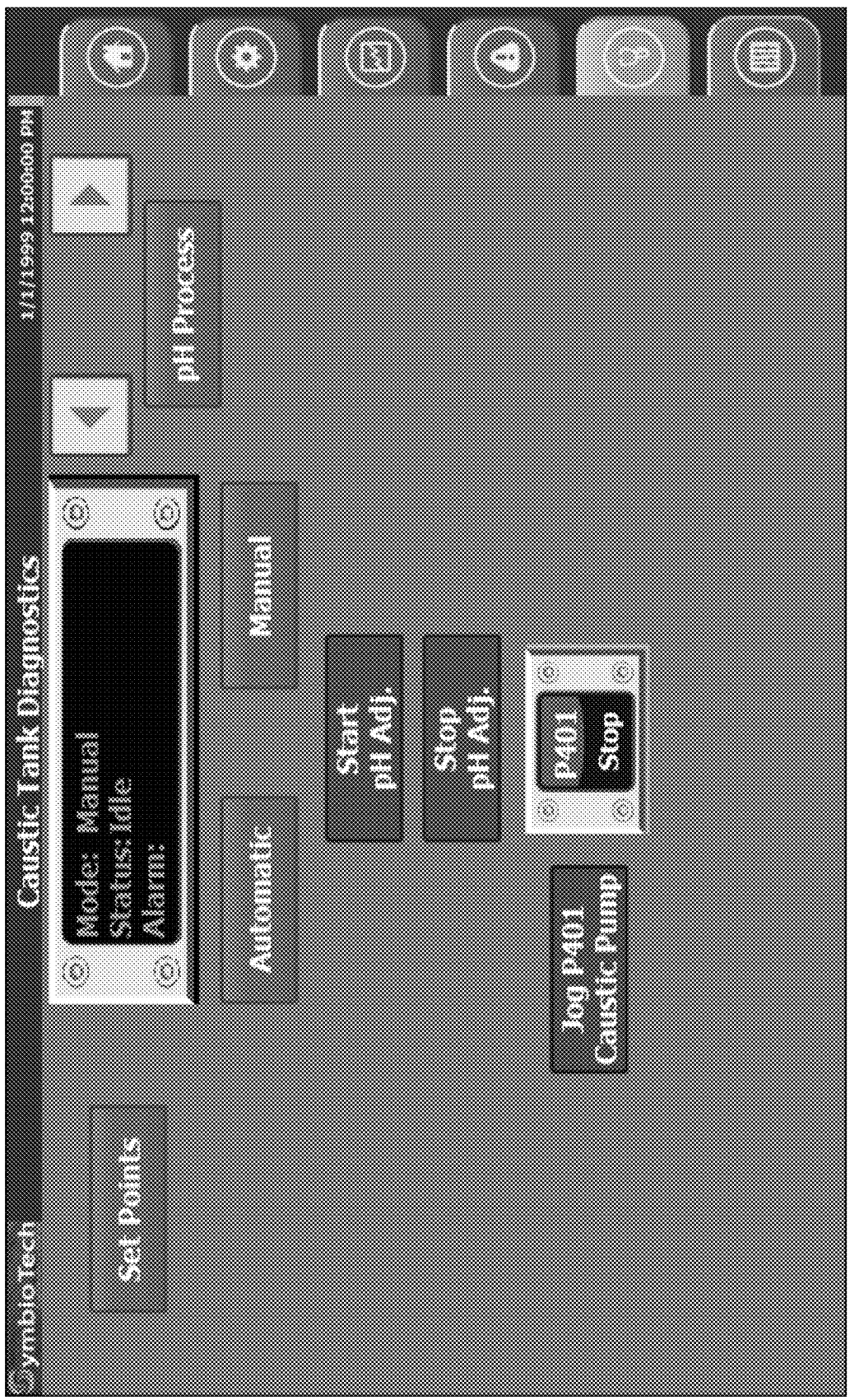
FIG. 36 is the same view shown when the system is in manual mode.
Figure 37:
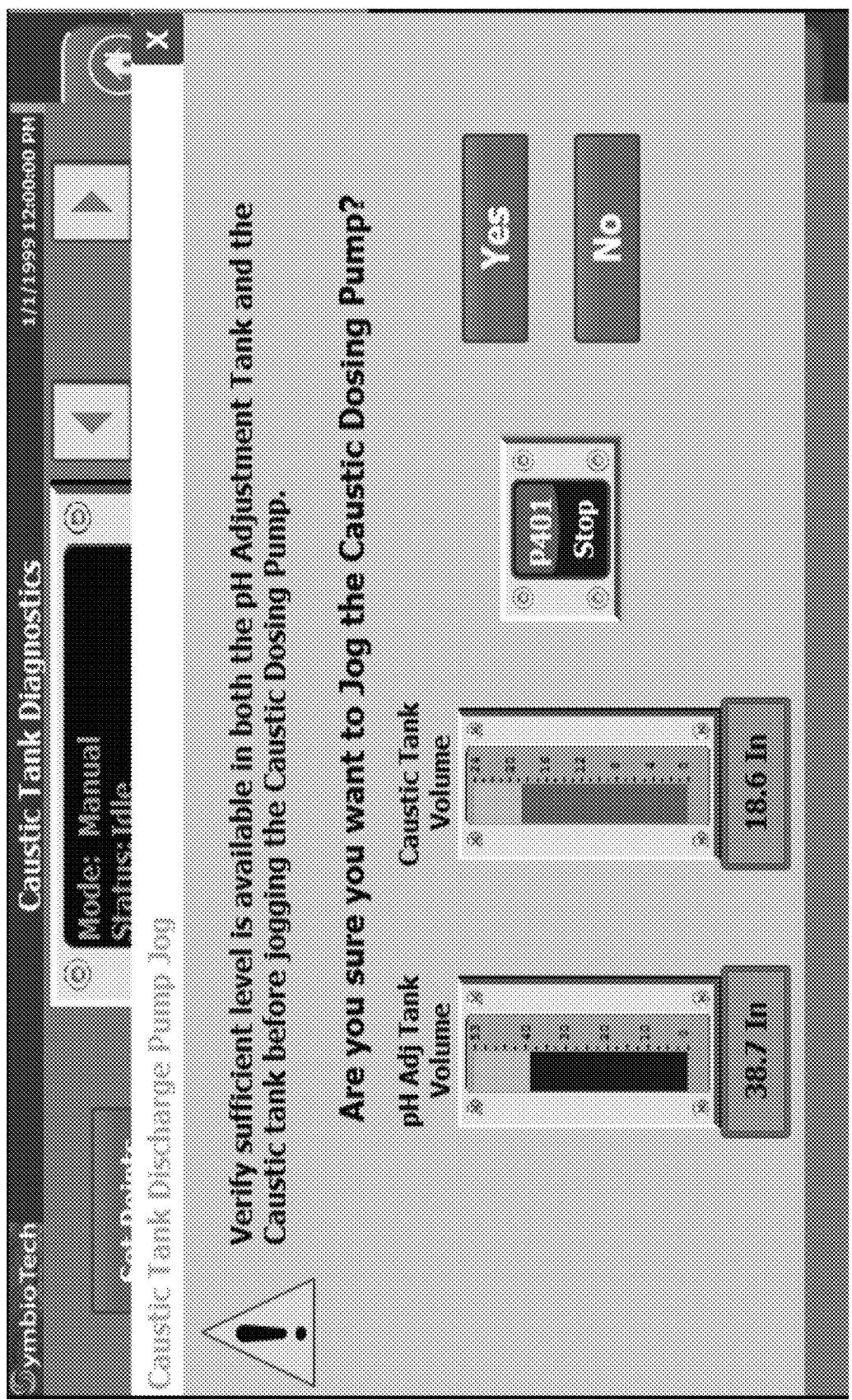
FIG. 37 shows the display when the operator selects YES to call the P301 popup to control the caustic tank discharge pump.
Figure 38:
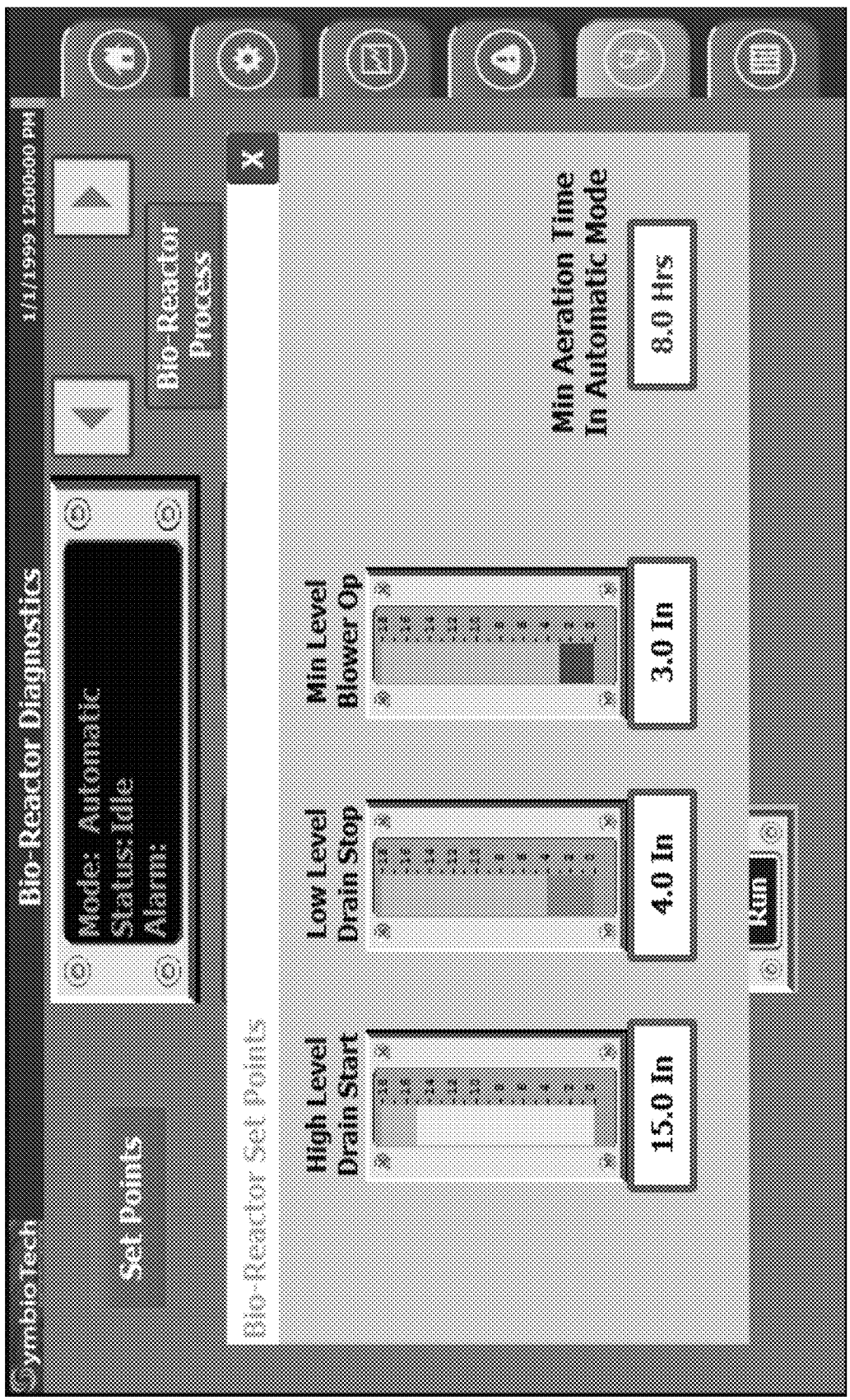
FIG. 38 shows the Bio-Reactor Set Points screen.

Turning now to FIG. 36, when in Manual mode, the Start pH Adj. set point is ignored. If the measured pH in the pH Adjustment Tank is below the Stop pH Adj. set point, selecting the Start pH Adj. button 492 causes the caustic addition cycle to begin. An additional Jog P401 Caustic Pump button 498 is visible in Manual Mode.

Operation of the pH Adjustment Tank Discharge pump is similar to the operation of the other discharge pumps. Pressing the Yes button 500 will call the Caustic Tank Discharge Pump to run regardless of tank levels, measured pH in the pH Adjustment Tank, and active Alarms or Warnings. The pH Adjustment Tank recirculation will not automatically start when the Yes button is pressed. The P401 lamp 502 in this popup 504 monitors the call to run command logic bit. Selecting No 506 closes the popup.

Referring next to FIGS. 38-41, there is shown a set of Bio-Reactor Diagnostics screens 520. Rather than having set points to fill the tanks, the Bio-Reactors each have a set point to drain the tanks. The set points apply to both Bio-Reactor Tanks. The High Level Drain Start set point 522 is the level at which the liquid in the tank must achieve before the corresponding Bio-Reactor Tank drain valve opens. The Low Level Drain Stop set point 524 is the level at which the Bio-Reactor Tank drain valve closes.

The Min Level Blower Op set point 526 is the minimum fluid level that both Bio-Reactor tanks need to achieve before the blower will be called to run in automatic mode. The Min Aeration Time in Automatic Mode set point 528 is the minimum time the blower needs to be running in each tank before the drain valve will open in automatic mode.

The Bio-Reactor Tank drains may get out of sync with one another due to lack of maintenance or needed repairs, such as replacing fouled irrigation nozzles. If this is not a problem, setting the Low Level Drain Stop set point above the Min Level Blower Op set point will keep the Blower in a constant run state, and the Bio-Reactor Tanks will drain individually as the level and time conditions are met. This kind of set up allows the highest throughput for the Worm Farm Process.

Figure 39:
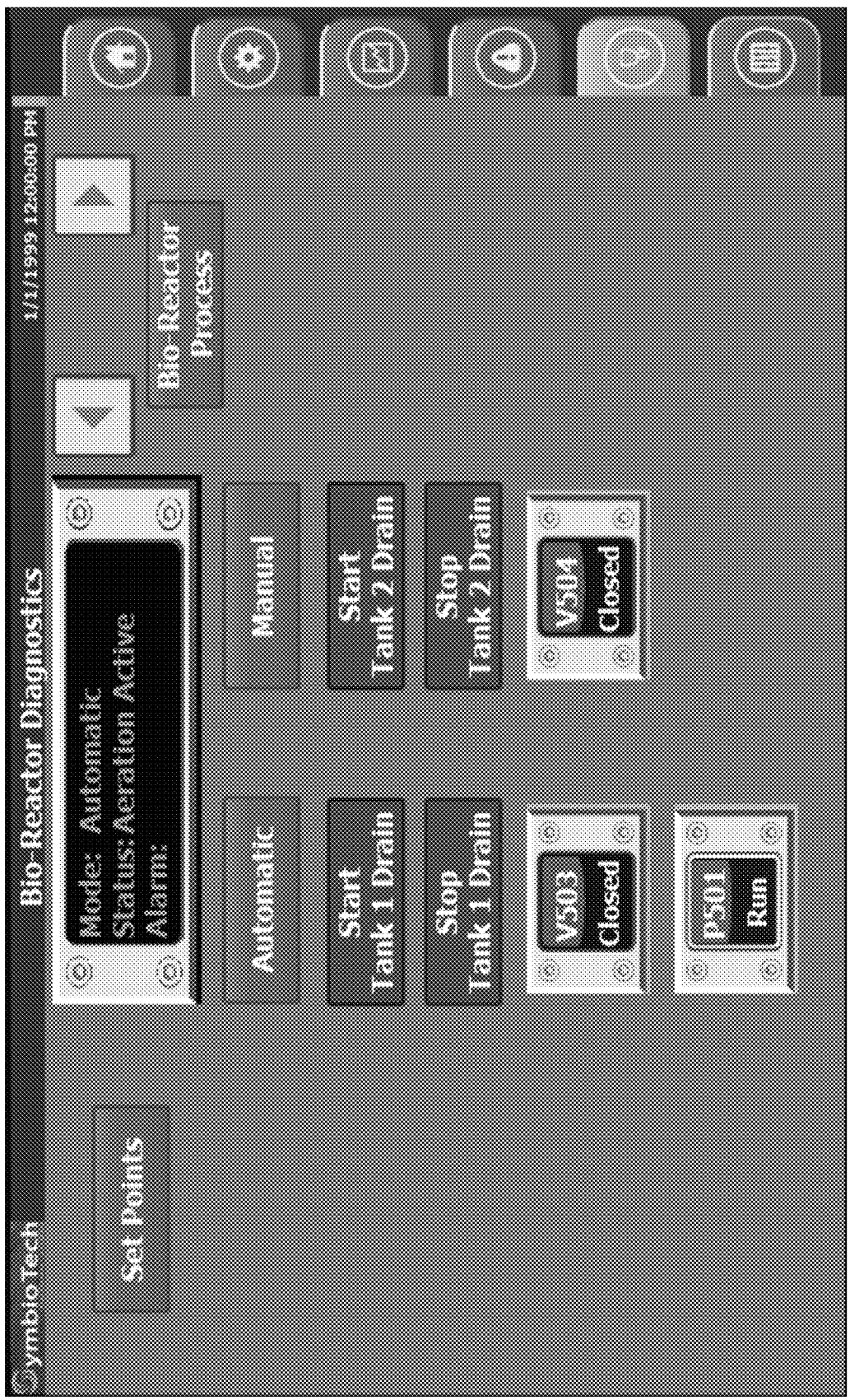
FIG. 39 shows the buttons and lamps displayed on the Bio-Reactor diagnostics screen when the system is operating in automatic mode.

When the Worm Farm Process is started and the Bio-Reactors are in Automatic mode (as seen in FIG. 39), four buttons are displayed, including: a Start Tank 1 Drain button 530, a Stop Tank 1 Drain button 532, a Start Tank 2 Drain button 534, and a Stop Tank 2 Drain button 536, as each Bio-Reactor tank has its drain start and stop. If the Bio-Reactor tank 1 levels are above the Low Level Drain Stop set point, and the Start Tank 1 Drain is selected, the tank discharge valve will open and drain the tank to the Low Level Drain Stop set point. V503 540 is the Bio-Reactor Tank 1 drain valve and V504 542 is the Bio-Reactor Tank 2 drain valve.

Indicating lamp P501 544 indicates the condition of the blower motor contactor.

Figure 40:
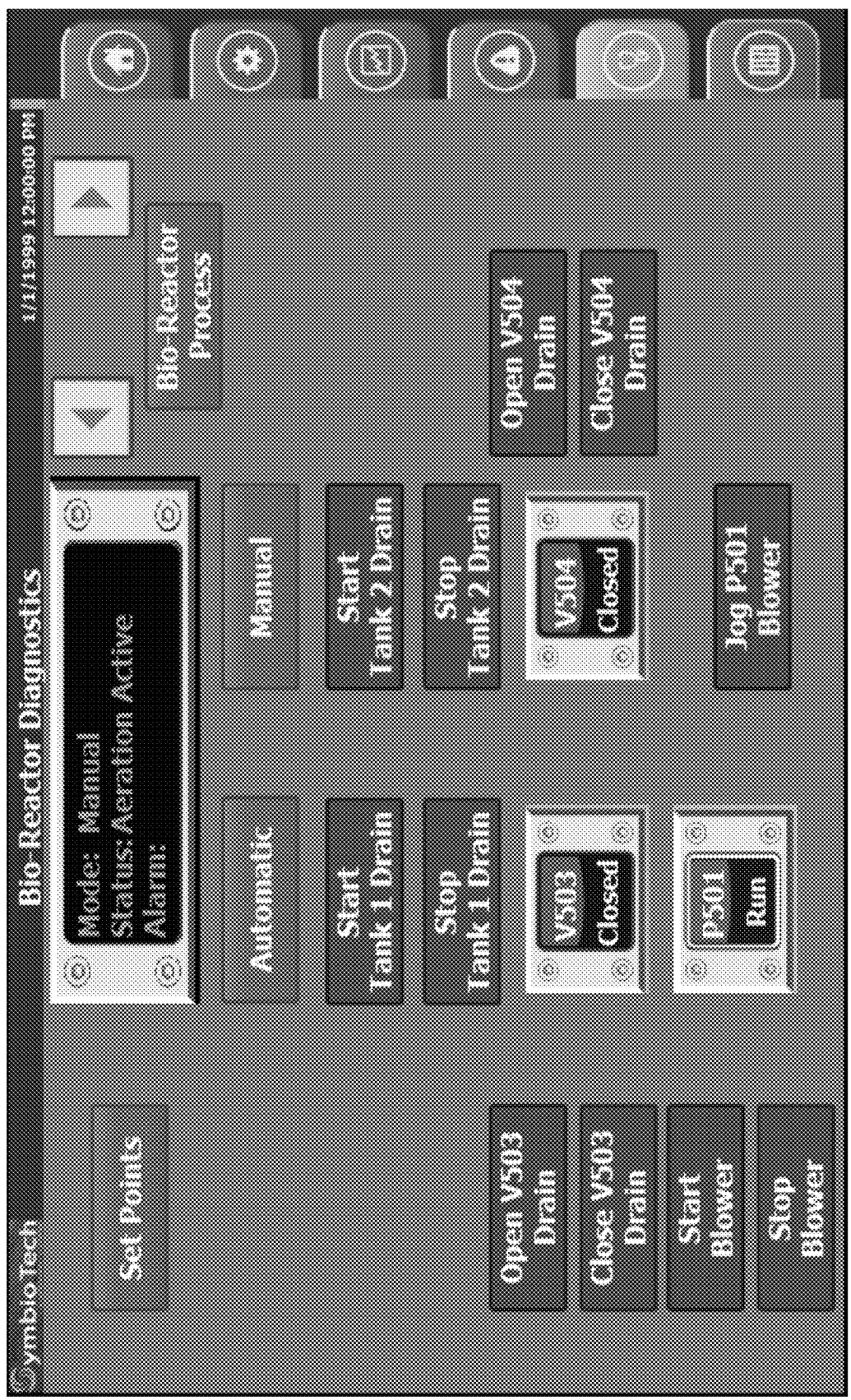
FIG. 40 is the same view when the system is operating in manual mode.
Figure 41:
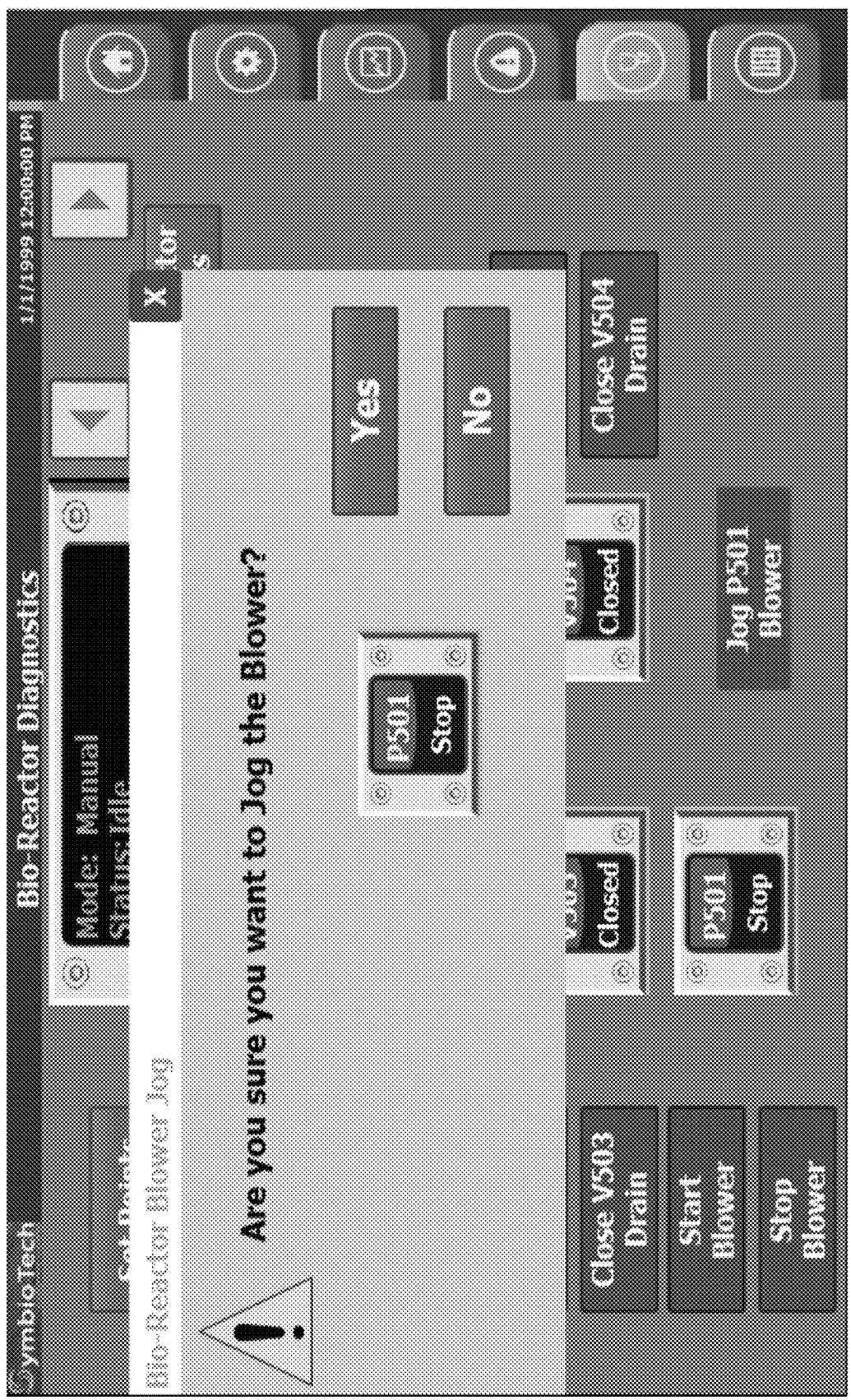
FIG. 41 shows the HMI display when the operator selects "Jog 501 Blower" in FIG. 40.

In Manual mode, FIGS. 40-41, the Min Level Blower Op and Min Aeration Time In Automatic mode are ignored. The blower will only start and stop when commanded by the Start Blower and Stop Blower buttons 550, 552, respectively.

The tank drain valves will continue to open and close per the High Level Drain Start and Low Level Drain Stop set points while in manual mode. In addition there are four buttons for opening and closing the tank drain valves.

Selecting one of the Open Drain buttons, 554, 556, will latch the corresponding valve open. Selecting one of the Close Drain buttons 558, 560, will unlatch and close the corresponding valve. Returning to Automatic mode will unlatch any latched open valves. Valves will then be opened and closed automatically as necessary.

Looking now at FIG. 41, to jog the blower, the operator selects and presses the Yes button 562. When the Yes button is released the blower will stop P501 564. Selecting the No button 566 will close the popup 568.

FIG. 42-46 shows Settings screens intended for use by advanced users. All setting changes require a log in user name and password. The settings are configured during commissioning and should not be changed unless equipment has been changed.

Figure 42:
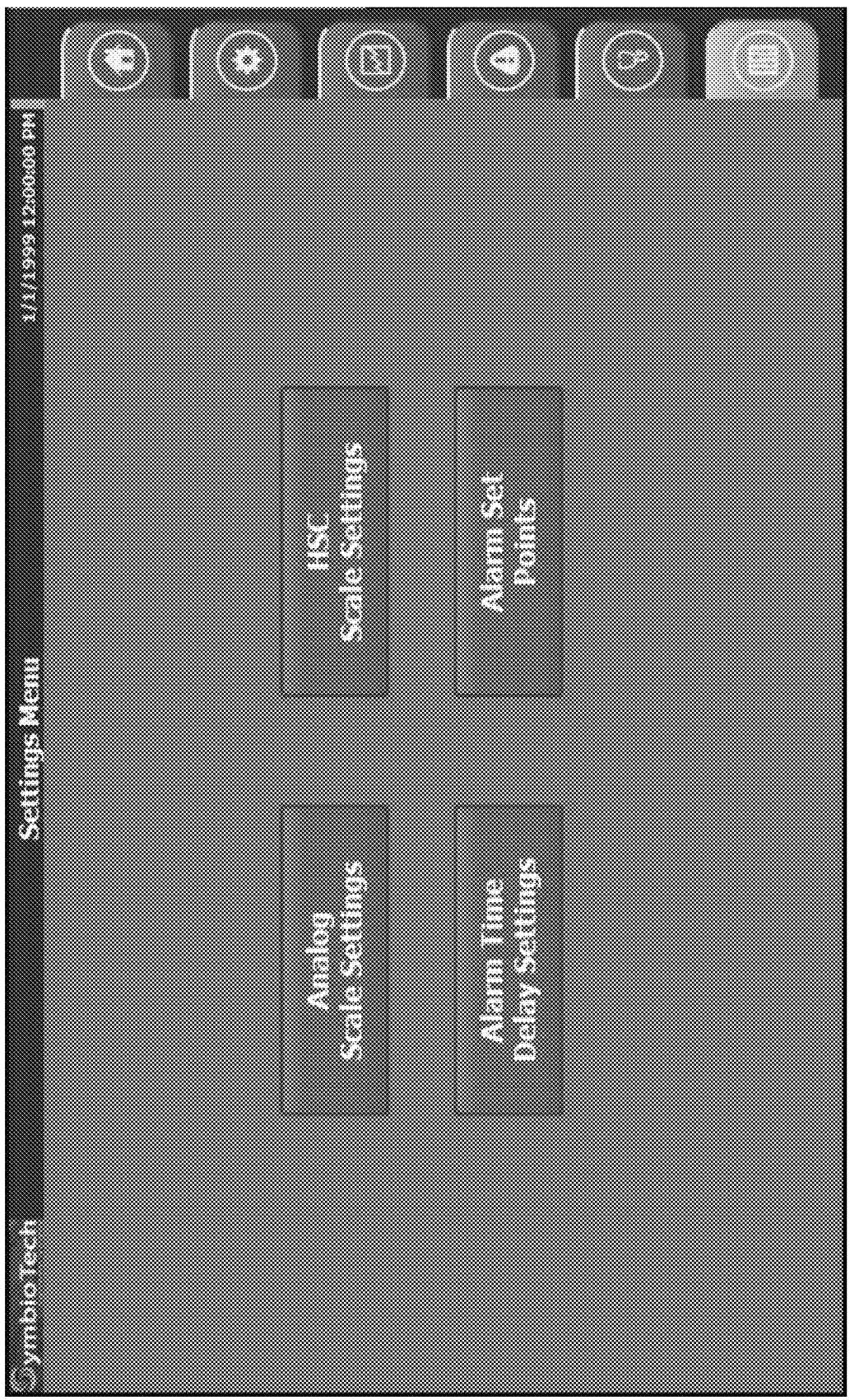
FIG. 42 shows the Settings Screen menu when Settings is selected by the operator among the navigation buttons.
Figure 45:
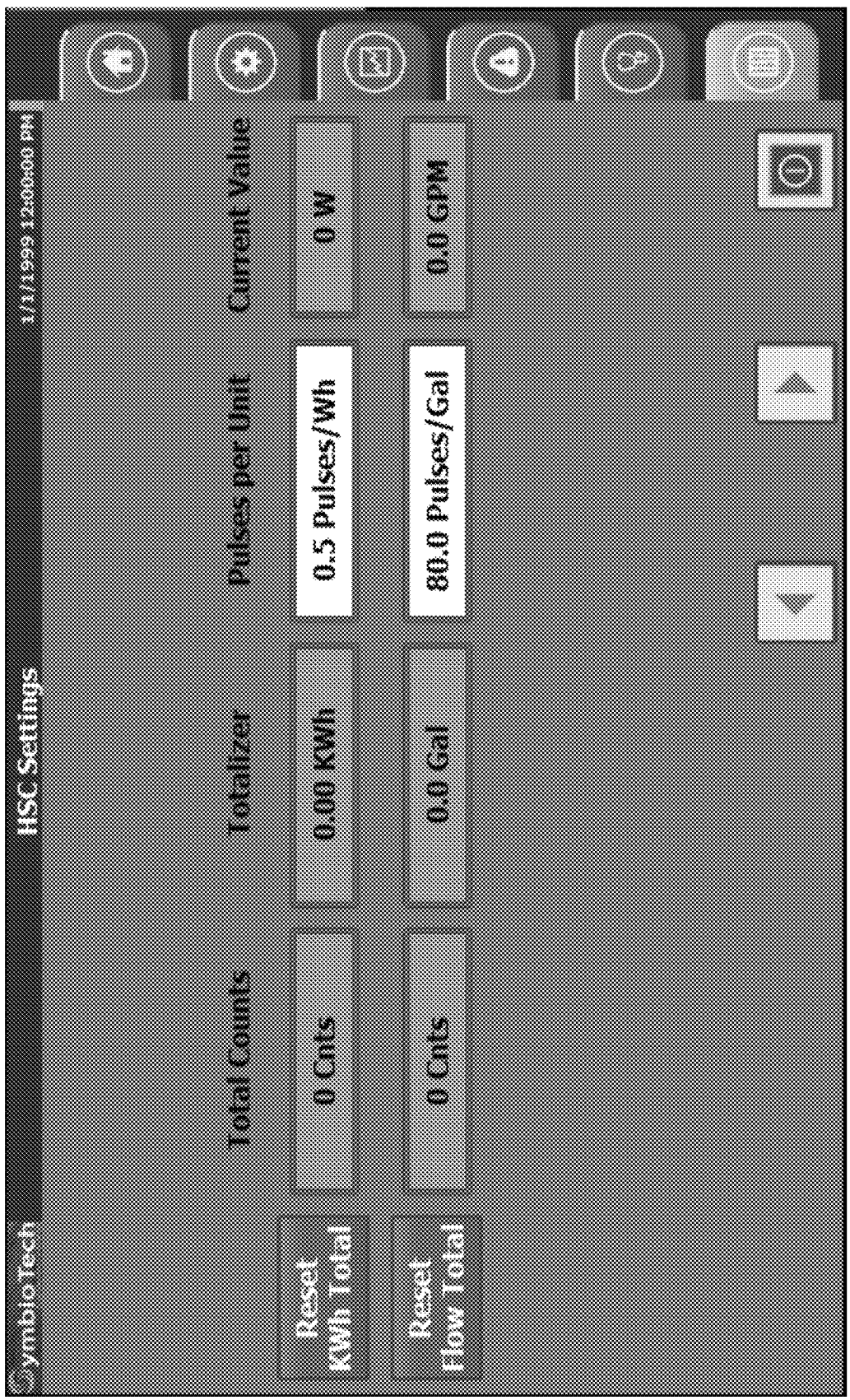
FIG. 45 displays high speed counter indications for power consumption and for total gallons processed.

Referring first to FIG. 42, the Settings Menu 580 has four navigation buttons. The Analog Scale Settings button 582 opens a screen through which to scale the level and pH sensors. The HSC Scale settings button 584 opens a screen that scales the digital High Speed Counters. The Alarm Time Delay Settings button 586 opens a screen that controls how much time will pass for automatic correction before an alarm is triggered. The Alarm Set Points button 588 opens a screen that sets the alarm and warning set points.

There are three common elements on the Settings Screens. The right and left arrows 590, 592 are navigation buttons to scroll through the Settings Screens. The red "power" button 594 exits the Worm Farm Process control screens to show the operating system desktop of the touch screen. The power button is password protected.

Figure 44:
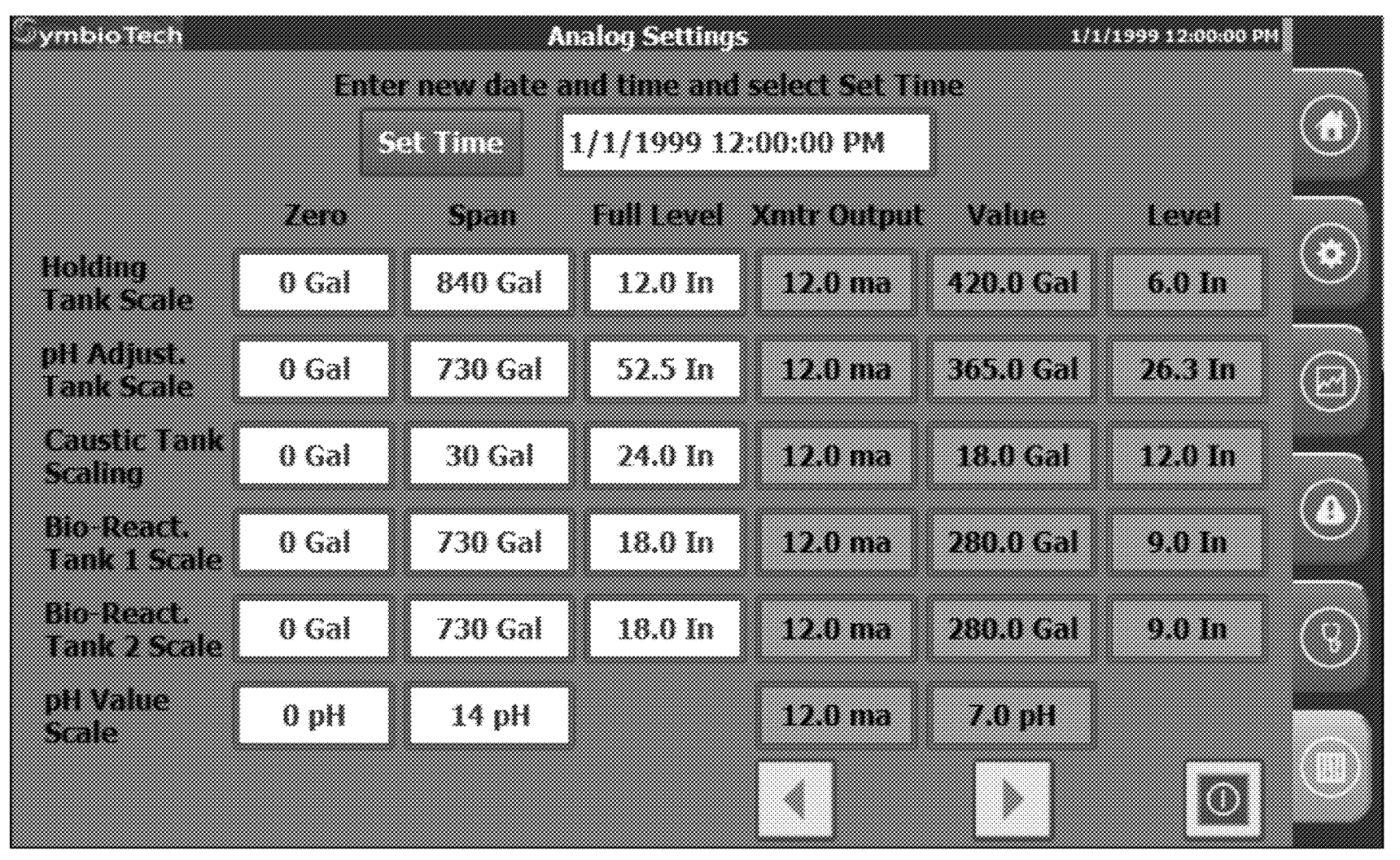

The Analog Settings screen 600, FIG. 44, is the screen through which tank level and pH analog transmitters are scaled. Tank level transmitters may not always have the same scale as the tank. Fields in white are settable and require a login and password. Gray fields are the readings and calculated values.

The top section windows are for setting the date and time 602 of the logic controller and touch screen. A table 604 below the date and time setting field, are the tank levels and pH value settings. Please note: not all tanks are linear and are accounted for in the program for calculating tank levels in gallons vs inches of level. The Span setting is the value of gallons at the Full Level. All of the analog transmitters are calibrated under the 4 ma to 20 ma current loop standard.

The HSC (High Speed Counter) Screen 620 is used to tell the program the equivalent unit per pulse. The Worm Farm Process uses two counters: a first 622 for power consumption totalizer and the other 624 is for a gallons totalizer. From counting the pulses over time, the program can calculate instantaneous values for wattage and flow.

The fields in white are the pulses per unit setting. Totalizers can be reset by selecting the corresponding rest buttons. The white fields and reset buttons require a login and password.

Periodically tracking and resetting the flow and power consumption aid in the fine tuning the Worm Farm Process.

Figure 46:
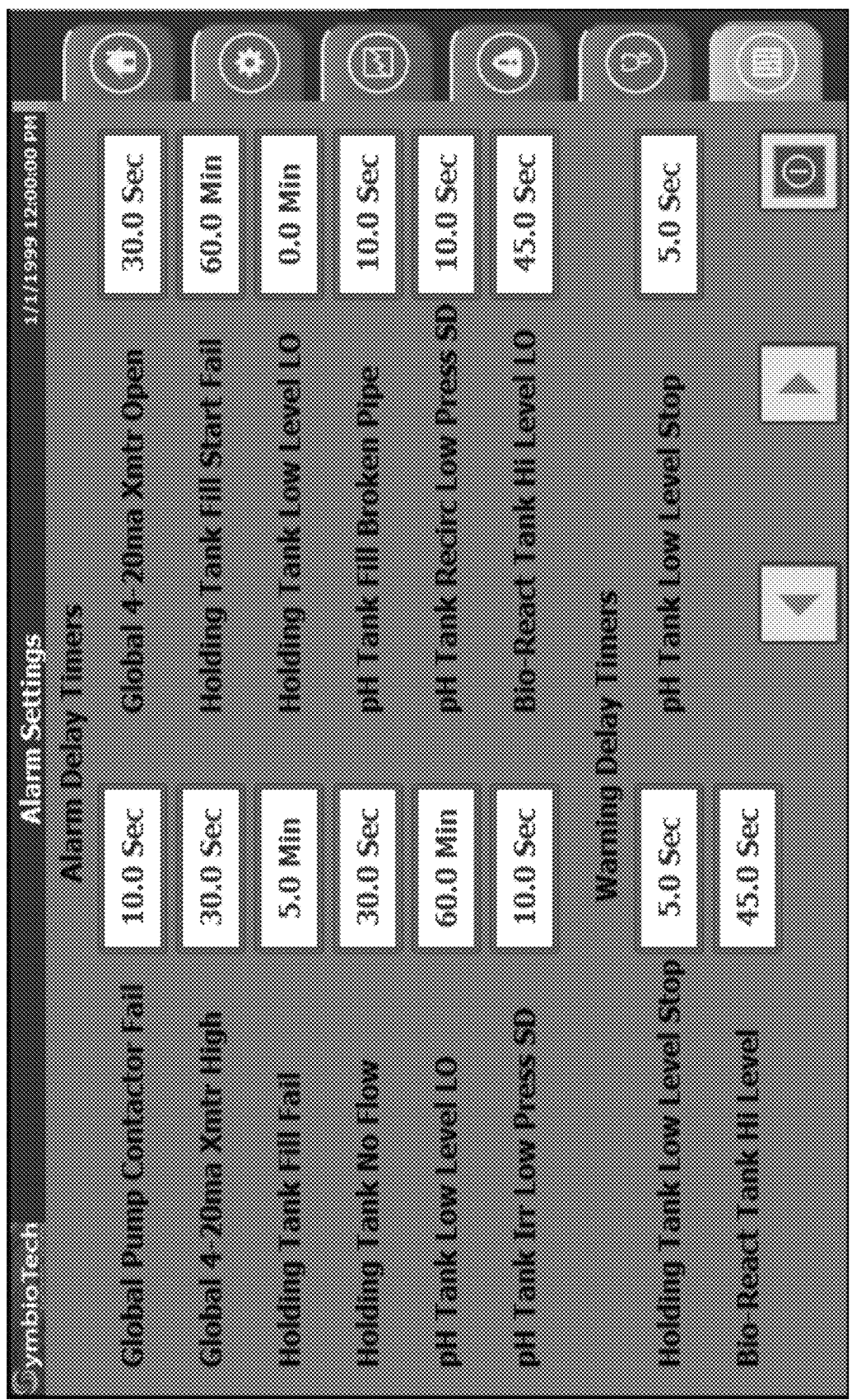
FIG. 46 shows how alarm and warning may be deferred.
Figure 47:
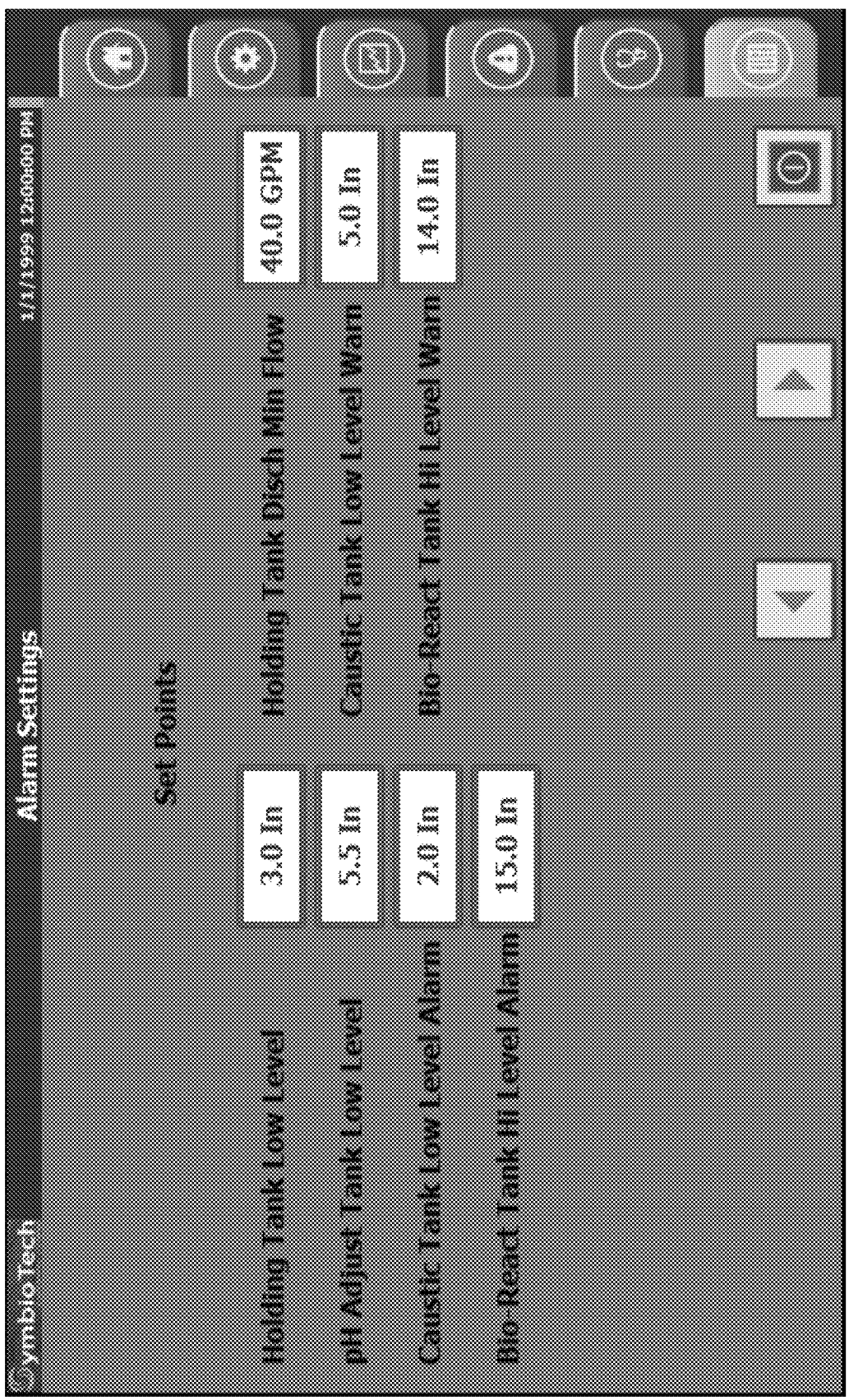
FIG. 47 shows process value set points before a warning or alarm is initiated.

Next, FIGS. 46-47 show the Alarm Settings Screens 640, 650. Alarms and warnings have time delays for two reasons. First, de-bounce: There are occasions where the alarm will bounce around the alarm threshold. To ensure the process is truly in alarm, a short time delay in introduced before the alarm latches on. Second, auto-correction: Some processes may try to correct themselves. First a warning is triggered. If the warning does not clear, then the alarm will latch on.

Global alarm time delays apply to several subsystems, not to a specific subsystem process. The Global alarm time delays apply to all analog transmitters and pump motor contactors. All time delays are set during commissioning and should not be changed unless by knowledgeable personnel. Altering the time delay setting may result in damage to equipment.

FIG. 47 shows the set points screen for Alarm Settings. In conjunction with the warning and alarm time delays, the alarm set points set the process value set points before a warning or alarm is initiated. All set points are set during commissioning and should not be changed except by knowledgeable personnel.

From the foregoing, it will be seen that in its most essential aspect, the inventive system is a vermicomposting method and system for treating an organic waste stream by processing it, first, through a biosolids separator, from which a run-off liquid product is collected and pumped into a holding tank, where it is further pre-treated by testing certain parameters and adjusting the chemical and biological composition, including adjusting pH, adjusting the bacterial flora present in the liquid, and adjusting dissolved oxygen levels, until the liquid is suitable for use as a composting worm feedstock. The feedstock is then distributed over composting worm beds having wood shaving layers that act as a sponge for absorbing the feedstock, as well as any bacterial flora with which it is inoculated. The worms then continue digesting the organic compounds in the feedstock to product worm castings and a nutrient rich compost tea, or leachate, which is collected, further oxygenated and optionally adjusted with other nutrients to make it suitable for use as a fertilizer or other recovered resource.

What is claimed as invention is:

1. A vermicomposting system for treating waste water streams, comprising:
   a pretreatment stage for converting liquid or semi-liquid organic waste streams into a feedstock for vermicomposting;
   a vermicomposting digestion stage having populations of worms and beneficial bacteria which consume and break down organic material and nutrients present in the feedstock from the pretreatment stage to create worm castings, vermicompost, and a liquid runoff including leachate and compost tea that contains plant nutrients, plant growth promoting substances, and beneficial bacteria, wherein said vermicomposting digestion stage includes an anaerobic vermicomposting tank including an upper composting level and a lower anaerobic digesting level, and a filter screen separating said upper composting level from said lower anaerobic digesting level, a pH adjustment tank in fluid communication with said lower anaerobic digesting level and having a pH sensor and pH adjustment means, said buffer tank accepting leachate from said lower anaerobic digesting level, and an aerobic vermicomposting tank in fluid communication with said pH adjustment tank for receiving adjusted leachate from said pH adjustment tank; and
   a post-treatment stage in which the liquid compost tea from said vermicomposting digestion stage is removed for use as a soil amendment or inoculant, or is further treated in a separate containment tank where nutrients and oxygen levels are controlled to increase specific bacterial and fungal populations.

2. The system of claim 1, wherein said pretreatment stage includes a bio-solids separator system that includes containment tanks layered with a worm bed upper layer and an aerobic digester in a lower layer to break down the organic material, assist in separating solids from liquids and to inoculate the waste stream with a population of beneficial bacteria.

3. The system of claim 2, including means to controlling oxygen levels, pH, and the addition of nutrients in said containment tanks so as to select for species of beneficial bacteria.

4. The system of claim 3, further including an oxygen control system operatively coupled to said containment tanks to reduce oxygen levels in said containment tanks to anaerobic conditions so as to shift the biological population to facultative and anaerobic bacteria.

5. The system of claim 3, wherein said system includes an oxygen control system operatively coupled to said containment tanks to cycle between aerobic and anaerobic conditions in said containment tanks.

6. The system of claim 5, further including a pH adjustment tank in fluid communication with said containment tanks and having pH and oxygen measurement and adjustment apparatus, wherein pH and dissolved oxygen in the runoff from said containment tanks are measured and adjusted to render the runoff fit for use as a feedstock for worms.

7. The system of claim 1, wherein the vermicomposting digestion stage includes:
  at least one open vermicomposter digester containment tank containing a solid mineral and high carbon organic substrate, a live worm population, and a beneficial bacterial population; and
  an irrigation system which distributes pre-treated liquid waste stream to the at least one vermicomposting digester containment tank.

8. A vermicomposting system for converting a waste water stream into worm castings and compost tea, comprising:
  a waste water containment tank to store liquid and semi liquid organic waste streams;
  a fluid line connecting said waste water containment tank to at least a vermicomposting containment tank;
  a pump for pumping waste water from said waste water containment tank to said vermicomposting containment tank;
  an anaerobic vermicomposting tank including an upper composting level and a lower anaerobic digesting level, and a filter screen separating said upper composting level from said lower anaerobic digesting level;
  a distribution line with terminal outlets for distributing the waste water from said waste water containment tank over said upper composting level;
  a pH adjustment tank in fluid communication with said lower level and having a pH sensor and pH adjustment means, said buffer tank accepting leachate from said lower level;
  an aerobic vermicomposting tank in fluid communication with said pH adjustment tank for receiving adjusted leachate from said pH adjustment tank; and
  a compost tea storage tank in fluid communication with said aerobic vermicomposting tank through a fluid line.

9. The system of claim 8, wherein said upper composting level comprises an earthworm bed including wood shavings and worms and is configured to capture a portion of solids in the waste stream while allowing leachate to pass through said filter screen into said lower anaerobic digesting level.

10. The system of claim 8, wherein said lower anaerobic digesting level includes a contained culture of anaerobic bacteria and enzymes.

11. The system of claim 10, further including dosing ports in fluid communication with said lower level for introducing or inoculating said lower level with bacterial flora for digesting suspended and dissolved solids and organic compounds.

12. The system of claim 8, wherein said waste water containment tank includes a recirculation system for circulating and oxygenating tank contents prior to introduction into said vermicomposting containment tank.

13. The system of claim 8, further including a dissolved oxygen sensor in said pH adjustment tank and an aeration system disposed in said pH adjustment tank or between said pH adjustment tank and said aerobic vermicomposting tank for adjusting dissolved oxygen levels in fluid from said pH adjustment tank.

14. The system of claim 13, further including an air blower in fluid communication with fluid lines between said waste water containment tank and said anaerobic vermicomposting digester tank, such that said system can cycle between aerobic and anaerobic conditions.

* * * * *